(12) United States Patent
Schiffmann et al.

(10) Patent No.: US 11,615,065 B2
(45) Date of Patent: *Mar. 28, 2023

(54) ENUMERATION OF TREES FROM FINITE NUMBER OF NODES

(71) Applicant: Lower48 IP LLC, Dallas, TX (US)

(72) Inventors: Karl Schiffmann, Santa Barbara, CA (US); Mark Andrews, Pleasant Hill, CA (US); Jack J. LeTourneau, Ventura, CA (US)

(73) Assignee: LOWER48 IP LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,899

(22) Filed: Jun. 23, 2020

(65) Prior Publication Data

US 2020/0394168 A1 Dec. 17, 2020

Related U.S. Application Data

(63) Continuation of application No. 15/802,348, filed on Nov. 2, 2017, now Pat. No. 10,725,989, which is a continuation of application No. 15/214,168, filed on Jul. 19, 2016, now Pat. No. 9,842,130, which is a continuation of application No. 14/625,473, filed on Feb. 18, 2015, now Pat. No. 9,411,841, which is a continuation of application No. 14/086,808, filed on Nov. 21, 2013, now Pat. No. 9,002,862, which is a continuation of application No. 12/627,816, filed on Nov. 30, 2009, now Pat. No. 8,612,461, which is a continuation of application No. 11/006,440, filed on Dec. 6, 2004, now Pat. No. 7,636,727.

(60) Provisional application No. 60/632,203, filed on Nov. 30, 2004.

(51) Int. Cl.
| G06F 16/21 | (2019.01) |
| G06F 16/22 | (2019.01) |
| G06F 16/901 | (2019.01) |

(52) U.S. Cl.
CPC ........ *G06F 16/2246* (2019.01); *G06F 16/211* (2019.01); *G06F 16/2264* (2019.01); *G06F 16/9027* (2019.01); *Y10S 707/99942* (2013.01)

(58) Field of Classification Search
CPC ......... G06F 17/30961; G06F 17/30333; G06F 16/2264; G06F 16/211; G06F 16/2246; G06F 16/9027; Y10S 707/99942
USPC .................. 707/102, 101, 755, 802, 797
See application file for complete search history.

(56) References Cited

U.S. PATENT DOCUMENTS

| 3,201,701 A | 8/1965 | Maitra |
| 3,704,345 A | 11/1972 | Coker |
| 4,001,951 A | 1/1977 | Fasse |
| 4,134,218 A | 1/1979 | Adams |
| 4,156,910 A | 5/1979 | Barton |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |

(Continued)

OTHER PUBLICATIONS

"Core Technology Benchmarks A White Paper" (Jul. 2002), downloaded from the internet Mar. 2, 2004, 11 pages.

(Continued)

*Primary Examiner* — Kuen S Lu

(57) ABSTRACT

Embodiments of methods, apparatuses, devices and/or systems for manipulating hierarchical sets of data are disclosed.

24 Claims, 13 Drawing Sheets

| Index | Binary Edge-Labelled Strings | Binary Edge-Labelled Trees |
|---|---|---|
| 0. | λ | 0 |
| 1. | < > | 1 |
| 2. | <0> | #₀1¹ |
| 3. | <1> | #₁1¹ |
| 4. | <0,0> | #₀1#₀1¹ |
| 5. | <0,1> | #₀#₀1¹¹ |
| 6. | <1,0> | #₁1#₀1¹ |
| 7. | <1,1> | #₁#₀1¹¹ |
| 8. | <0,0,0> | #₀1#₀1#₀1¹ |
| 9. | <0,0,1> | #₁1#₁1¹ |
| 10. | <0,1,0> | #₀#₀1¹#₀1¹ |
| 11. | <0,1,1> | #₀#₁1¹¹ |
| 12. | <1,0,0> | #₁1#₀1#₀1¹ |
| 13. | <1,0,1> | #₁#₁1¹¹ |
| 14. | <1,1,0> | #₁#₀1¹¹#₀1¹ |
| 15. | <1,1,1> | #₀#₀1¹#₁1¹ |

¹ The Greek lower-case symbol lambda denotes the empty string.

(56) References Cited

U.S. PATENT DOCUMENTS

| | | | |
|---|---|---|---|
| 4,745,561 A | 5/1988 | Hirosawa | |
| 4,751,684 A | 6/1988 | Holt | |
| 4,831,525 A | 5/1989 | Saito | |
| 4,867,686 A | 9/1989 | Goldstein | |
| 4,905,138 A | 1/1990 | Bourne | |
| 4,916,655 A | 4/1990 | Ohsone | |
| 4,931,928 A | 6/1990 | Greenfeld | |
| 4,949,388 A | 8/1990 | Bhaskaran | |
| 4,989,132 A | 1/1991 | Mellender | |
| 4,991,087 A | 2/1991 | Burkowski | |
| 5,010,478 A | 4/1991 | Deran | |
| 5,021,943 A | 6/1991 | Grimes | |
| 5,021,992 A | 6/1991 | Kondo | |
| 5,050,071 A | 9/1991 | Harris | |
| 5,136,593 A * | 8/1992 | Moon | H03M 13/39 714/699 |
| 5,191,522 A | 3/1993 | Bosco | |
| 5,235,701 A | 8/1993 | Ohler | |
| 5,265,245 A | 11/1993 | Nordstrom | |
| 5,295,261 A * | 3/1994 | Simonetti | G06F 16/2246 |
| 5,325,531 A | 6/1994 | McKeeman | |
| 5,335,320 A | 8/1994 | Iwata | |
| 5,335,345 A | 8/1994 | Frieder | |
| 5,355,496 A | 10/1994 | Fant | |
| 5,450,581 A | 9/1995 | Bergen | |
| 5,463,777 A | 10/1995 | Bialkowski | |
| 5,493,504 A | 2/1996 | Minato | |
| 5,493,678 A | 2/1996 | Arcuri | |
| 5,497,500 A | 3/1996 | Rogers | |
| 5,509,088 A * | 4/1996 | Robson | H03M 7/425 341/67 |
| 5,511,159 A | 4/1996 | Baker | |
| 5,519,627 A | 5/1996 | Mahmood | |
| 5,522,068 A | 5/1996 | Berkowitz | |
| 5,544,301 A | 8/1996 | Orton | |
| 5,548,755 A | 8/1996 | Leung | |
| 5,577,253 A | 11/1996 | Blickstein | |
| 5,598,350 A | 1/1997 | Kawanishi | |
| 5,606,669 A | 2/1997 | Bertin | |
| 5,636,155 A | 6/1997 | Kabuo | |
| 5,687,362 A | 11/1997 | Bhargava | |
| 5,706,406 A | 1/1998 | Pollock | |
| 5,724,512 A | 3/1998 | Winterbottom | |
| 5,724,576 A | 3/1998 | Letourneau | |
| 5,742,806 A | 4/1998 | Reiner | |
| 5,745,892 A | 4/1998 | Miyata | |
| 5,748,975 A | 5/1998 | Van De Vanter | |
| 5,758,152 A * | 5/1998 | LeTourneau | G06F 9/44 707/741 |
| 5,778,354 A | 7/1998 | Leslie | |
| 5,778,371 A | 7/1998 | Fujihara | |
| 5,781,906 A | 7/1998 | Aggarwal | |
| 5,784,557 A | 7/1998 | Oprescu | |
| 5,787,415 A | 7/1998 | Jacobson | |
| 5,787,432 A | 7/1998 | Letourneau | |
| 5,796,356 A | 8/1998 | Okada | |
| 5,802,370 A | 9/1998 | Sitbon | |
| 5,822,593 A | 10/1998 | Lamping | |
| 5,826,262 A | 10/1998 | Bui | |
| 5,838,319 A * | 11/1998 | Guzak | G06F 9/451 715/854 |
| 5,848,159 A | 12/1998 | Collins | |
| 5,930,805 A | 7/1999 | Marquis | |
| 5,937,181 A | 8/1999 | Godefroid | |
| 5,940,619 A * | 8/1999 | Abadi | G06F 9/45508 717/156 |
| 5,960,425 A | 8/1999 | Buneman | |
| 5,970,490 A | 10/1999 | Morgenstern | |
| 5,978,790 A | 11/1999 | Buneman | |
| 5,987,449 A | 11/1999 | Suciu | |
| 5,999,926 A | 12/1999 | Suciu | |
| 6,002,879 A | 12/1999 | Radigan | |
| 6,003,033 A | 12/1999 | Amano | |
| 6,022,879 A | 2/2000 | Crow | |
| 6,028,987 A | 2/2000 | Hirairi | |
| 6,055,537 A | 4/2000 | Letourneau | |
| 6,076,087 A | 6/2000 | Suciu | |
| 6,088,691 A | 7/2000 | Bhargava | |
| 6,141,655 A | 10/2000 | Johnson | |
| 6,199,059 B1 | 3/2001 | Dahan | |
| 6,199,103 B1 | 3/2001 | Sakuguchi | |
| 6,236,410 B1 | 5/2001 | Politis | |
| 6,240,418 B1 | 5/2001 | Shadmon | |
| 6,243,859 B1 | 6/2001 | Chen-Kuang | |
| 6,272,495 B1 | 8/2001 | Hetherington | |
| 6,279,007 B1 | 8/2001 | Uppala | |
| 6,289,354 B1 | 9/2001 | Aggarwal | |
| 6,292,938 B1 | 9/2001 | Sarkar | |
| 6,314,559 B1 | 11/2001 | Sollich | |
| 6,336,812 B1 | 1/2002 | Cooper | |
| 6,341,372 B1 | 1/2002 | Datig | |
| 6,377,953 B1 | 4/2002 | Gawlick | |
| 6,411,957 B1 | 6/2002 | Dijkstra | |
| 6,442,584 B1 | 8/2002 | Kolli | |
| 6,446,256 B1 | 9/2002 | Hymen | |
| 6,466,240 B1 | 10/2002 | Maslov | |
| 6,480,857 B1 | 11/2002 | Chandler | |
| 6,499,036 B1 | 12/2002 | Gurevich | |
| 6,505,205 B1 | 1/2003 | Kothuri | |
| 6,542,899 B1 | 4/2003 | Saulpaugh | |
| 6,550,024 B1 | 4/2003 | Pagurek | |
| 6,556,983 B1 | 4/2003 | Altschuler | |
| 6,598,052 B1 | 7/2003 | Saulpaugh | |
| 6,598,502 B1 | 7/2003 | Rosa | |
| 6,606,632 B1 | 8/2003 | Saulpaugh | |
| 6,606,741 B2 | 8/2003 | Kojima | |
| 6,609,130 B1 | 8/2003 | Saulpaugh | |
| 6,610,106 B1 | 8/2003 | Jenks | |
| 6,611,844 B1 | 8/2003 | Saulpaugh | |
| 6,640,218 B1 | 10/2003 | Golding | |
| 6,658,649 B1 | 12/2003 | Bates | |
| 6,665,664 B2 | 12/2003 | Paulley | |
| 6,687,734 B1 | 2/2004 | Sellink | |
| 6,691,301 B2 | 2/2004 | Bowen | |
| 6,714,939 B2 * | 3/2004 | Saldanha | G06F 40/143 |
| 6,728,953 B1 | 4/2004 | Walster | |
| 6,742,054 B1 | 5/2004 | Upton | |
| 6,745,384 B1 | 6/2004 | Biggerstaff | |
| 6,748,378 B1 | 6/2004 | Lavender | |
| 6,763,515 B1 | 7/2004 | Vazquez | |
| 6,785,673 B1 | 8/2004 | Fernandez | |
| 6,795,868 B1 | 9/2004 | Dingman | |
| 6,804,677 B2 | 10/2004 | Shadmon | |
| 6,817,865 B2 | 11/2004 | Charbonneau | |
| 6,829,695 B1 | 12/2004 | Ross | |
| 6,847,979 B2 | 1/2005 | Allemang | |
| 6,854,976 B1 | 2/2005 | Suhr | |
| 6,874,005 B2 | 3/2005 | Fortenberry | |
| 6,880,148 B1 | 4/2005 | Raph | |
| 6,941,511 B1 | 9/2005 | Hind | |
| 6,965,990 B2 | 11/2005 | Barsness | |
| 6,968,330 B2 | 11/2005 | Edwards | |
| 6,978,271 B1 * | 12/2005 | Hoffman | G06F 16/13 |
| 7,043,555 B1 | 5/2006 | McClain | |
| 7,051,033 B2 | 5/2006 | Agarwal | |
| 7,072,904 B2 * | 7/2006 | Najork | G06F 16/9027 |
| 7,103,838 B1 | 9/2006 | Krishnamurthy | |
| 7,107,265 B1 | 9/2006 | Calvignac | |
| 7,111,016 B2 | 9/2006 | Gurevich | |
| 7,117,196 B2 | 10/2006 | Gaur | |
| 7,117,479 B2 | 10/2006 | Van De Vanter | |
| 7,127,704 B2 | 10/2006 | Van De Vanter | |
| 7,134,075 B2 | 11/2006 | Hind | |
| 7,139,765 B1 | 11/2006 | Balkany | |
| 7,140,006 B2 | 11/2006 | Harrison | |
| 7,162,485 B2 | 1/2007 | Gottlob | |
| 7,167,856 B2 | 1/2007 | Lawder | |
| 7,190,376 B1 | 3/2007 | Tonisson | |
| 7,191,182 B2 | 3/2007 | Anonsen | |
| 7,203,680 B2 | 4/2007 | Parida | |
| 7,203,774 B1 * | 4/2007 | Zhou | G06F 9/4411 710/17 |
| 7,225,183 B2 | 5/2007 | Gardner | |

(56) References Cited

U.S. PATENT DOCUMENTS

| | | |
|---|---|---|
| 7,225,199 B1 | 5/2007 | Green |
| 7,287,026 B2 | 10/2007 | Oommen |
| 7,313,563 B2 | 12/2007 | Bordawekar |
| 7,318,066 B2 | 1/2008 | Kaufman |
| 7,318,215 B1 | 1/2008 | Krishnan |
| 7,337,163 B1 | 2/2008 | Srinivasan |
| 7,356,802 B2 | 4/2008 | de Sutter |
| 7,360,202 B1 | 4/2008 | Seshadri |
| 7,392,239 B2 | 6/2008 | Fontoura |
| 7,409,673 B2 | 8/2008 | Kuo |
| 7,419,376 B2 | 9/2008 | Sarvazyan |
| 7,421,648 B1 | 9/2008 | Davis |
| 7,437,666 B2 | 10/2008 | Ramarao |
| 7,475,070 B2 | 1/2009 | Fan |
| 7,496,892 B2 | 2/2009 | Nuss |
| 7,512,932 B2 | 3/2009 | Davidov |
| 7,536,675 B2 | 5/2009 | Gallagher |
| 7,536,676 B2 | 5/2009 | Baker |
| 7,544,062 B1 | 6/2009 | Hauschild |
| 7,561,927 B2 | 7/2009 | Oyama |
| 7,571,156 B1 | 8/2009 | Gupta |
| 7,571,169 B2 | 8/2009 | Jones |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | Letourneau |
| 7,630,995 B2 | 12/2009 | Letourneau |
| 7,636,727 B2 | 12/2009 | Schiffmann |
| 7,650,592 B2 | 1/2010 | Eckels |
| 7,669,183 B2 | 2/2010 | Bowman |
| 7,681,177 B2 | 3/2010 | Letourneau |
| 7,720,830 B2 | 5/2010 | Wen |
| 7,761,847 B2 | 7/2010 | Kornerup |
| 7,761,858 B2 | 7/2010 | Chang |
| 7,765,183 B2 | 7/2010 | Williams, Jr. |
| 7,779,396 B2 | 8/2010 | Meijer |
| 7,801,923 B2 | 9/2010 | Letourneau |
| 7,827,523 B2 | 11/2010 | Ahmed |
| 7,861,304 B1 | 12/2010 | Nachenberg |
| 7,882,147 B2 | 2/2011 | Letourneau |
| 7,890,471 B2 | 2/2011 | Fan |
| 7,890,927 B2 | 2/2011 | Eldridge |
| 7,890,928 B2 | 2/2011 | Patrudu |
| 7,899,821 B1 | 3/2011 | Schiffmann |
| 7,962,494 B2 | 6/2011 | Furusho |
| 8,005,869 B2 | 8/2011 | Corl |
| 8,020,145 B2 | 9/2011 | Fant |
| 8,032,860 B2 | 10/2011 | Piehler |
| 8,037,102 B2 | 10/2011 | Letourneau |
| 8,060,868 B2 | 11/2011 | Meijer |
| 8,086,998 B2 | 12/2011 | Bansal |
| 8,112,740 B2 | 2/2012 | Meijer |
| 8,151,276 B2 | 4/2012 | Grechanik |
| 8,181,155 B2 | 5/2012 | Pinto |
| 8,203,972 B2 | 6/2012 | Sauermann |
| 8,230,526 B2 | 7/2012 | Holland |
| 8,250,526 B2 | 8/2012 | Anderson |
| 8,307,102 B2 | 11/2012 | Skog |
| 8,316,059 B1 | 11/2012 | Schiffmann |
| 8,332,428 B2 | 12/2012 | Bonneau |
| 8,356,040 B2 | 1/2013 | Letourneau |
| 8,365,137 B2 | 1/2013 | Fant |
| 8,438,534 B2 | 5/2013 | Thomson |
| 8,443,339 B2 | 5/2013 | Letourneau |
| 8,458,191 B2 | 6/2013 | Bhattacharjee |
| 8,484,236 B1 | 7/2013 | Andrews |
| 8,606,794 B2 | 12/2013 | Amer-Yahia |
| 8,612,461 B2 | 12/2013 | Schiffmann |
| 8,615,530 B1 | 12/2013 | Letourneau |
| 8,626,777 B2 | 1/2014 | Letourneau |
| 8,645,346 B2 | 2/2014 | Dumitru |
| 8,650,201 B2 | 2/2014 | Letourneau |
| 8,683,431 B2 | 3/2014 | Thomson |
| 8,745,070 B2 | 6/2014 | Krishnamurthy |
| 8,762,942 B2 | 6/2014 | Langworthy |
| 8,868,621 B2 | 10/2014 | D'Onofrio, II |
| 8,869,106 B2 | 10/2014 | Jazdzewski |
| 8,930,896 B1 | 1/2015 | Wiggins |
| 8,935,232 B2 | 1/2015 | Abadi |
| 8,990,769 B2 | 3/2015 | Letourneau |
| 9,002,862 B2 | 4/2015 | Schiffmann |
| 9,015,202 B2 | 4/2015 | Letourneau |
| 9,020,961 B2 | 4/2015 | Letourneau |
| 9,043,347 B2 | 5/2015 | Letourneau |
| 9,077,515 B2 | 7/2015 | Letourneau |
| 9,167,579 B2 | 10/2015 | Fettweis |
| 9,177,003 B2 | 11/2015 | Letourneau |
| 9,245,050 B2 | 1/2016 | Schiffmann |
| 9,330,128 B2 | 5/2016 | Schiffmann |
| 9,411,841 B2 | 8/2016 | Schiffmann |
| 9,425,951 B2 | 8/2016 | Letourneau |
| 9,430,512 B2 | 8/2016 | Letourneau |
| 9,563,653 B2 | 2/2017 | Letourneau |
| 9,563,663 B2 | 2/2017 | Shukla |
| 9,646,034 B2 | 5/2017 | Schiffmann |
| 9,646,107 B2 | 5/2017 | Letourneau |
| 9,842,130 B2 | 12/2017 | Schiffmann |
| 10,055,438 B2 | 8/2018 | Schiffmann |
| 10,068,003 B2 | 9/2018 | Letourneau |
| 10,140,349 B2 | 11/2018 | Letourneau |
| 10,255,311 B2 | 4/2019 | Letourneau |
| 10,275,489 B1 | 4/2019 | Muniswamy Reddy |
| 10,325,031 B2 | 6/2019 | Letourneau |
| 10,380,039 B2 | 8/2019 | Cooray |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews |
| 10,713,274 B2 | 7/2020 | Letourneau |
| 10,725,989 B2 | 7/2020 | Schiffmann |
| 10,733,234 B2 | 8/2020 | Letourneau |
| 11,100,070 B2 | 8/2021 | Schiffmann |
| 11,100,137 B2 | 8/2021 | Letourneau |
| 11,194,777 B2 | 12/2021 | Letourneau |
| 11,204,906 B2 | 12/2021 | Letourneau |
| 11,243,975 B2 | 2/2022 | Letourneau |
| 2001/0003211 A1 | 6/2001 | Bera |
| 2001/0037496 A1 | 11/2001 | Simonyi |
| 2002/0023166 A1 | 2/2002 | Bar-Noy |
| 2002/0040292 A1 | 4/2002 | Marcu |
| 2002/0059281 A1 | 5/2002 | Watanabe |
| 2002/0062259 A1 | 5/2002 | Katz |
| 2002/0091676 A1 | 7/2002 | Agrawal |
| 2002/0107860 A1 | 8/2002 | Gobeille |
| 2002/0129129 A1 | 9/2002 | Bloch |
| 2002/0130796 A1 | 9/2002 | Tsuchido |
| 2002/0130907 A1* | 9/2002 | Chi ............... G06F 16/954 715/853 |
| 2002/0133347 A1 | 9/2002 | Schoneburg |
| 2002/0133497 A1 | 9/2002 | Draper |
| 2002/0149604 A1 | 10/2002 | Wilkinson |
| 2002/0169563 A1 | 11/2002 | de Carvalho |
| 2002/0194163 A1 | 12/2002 | Hopeman |
| 2003/0041088 A1* | 2/2003 | Wilson ............ G06F 9/4411 718/104 |
| 2003/0065659 A1 | 4/2003 | Agarwal |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su |
| 2003/0195885 A1 | 10/2003 | Emmick |
| 2003/0195890 A1 | 10/2003 | Oommen |
| 2003/0236787 A1 | 12/2003 | Burges |
| 2003/0236794 A1 | 12/2003 | Hostetter |
| 2004/0003028 A1 | 1/2004 | Emmett |
| 2004/0010752 A1 | 1/2004 | Chan |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd |
| 2004/0054692 A1 | 3/2004 | Seyrat |
| 2004/0060006 A1 | 3/2004 | Lindblad |
| 2004/0060007 A1 | 3/2004 | Gottlob |
| 2004/0068498 A1 | 4/2004 | Patchet |

(56) References Cited

U.S. PATENT DOCUMENTS

| | | |
|---|---|---|
| 2004/0075677 A1 | 4/2004 | Loyall |
| 2004/0103105 A1 | 5/2004 | Lindblad |
| 2004/0122844 A1* | 6/2004 | Malloy .................. G06F 16/283 |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron |
| 2004/0239674 A1 | 12/2004 | Ewald |
| 2004/0254909 A1 | 12/2004 | Testa |
| 2004/0260683 A1 | 12/2004 | Chan |
| 2004/0260684 A1 | 12/2004 | Agarwal |
| 2004/0267958 A1 | 12/2004 | Reed |
| 2004/0268236 A1 | 12/2004 | Chidlovskii |
| 2005/0021548 A1 | 1/2005 | Bohannon |
| 2005/0021683 A1 | 1/2005 | Newton |
| 2005/0023524 A1 | 2/2005 | Beatty |
| 2005/0027495 A1 | 2/2005 | Matichuk |
| 2005/0027743 A1* | 2/2005 | O'Neil .................. G06F 16/86 |
| 2005/0028091 A1 | 2/2005 | Bordawekar |
| 2005/0050016 A1 | 3/2005 | Stanoi |
| 2005/0050066 A1 | 3/2005 | Hughes |
| 2005/0055369 A1 | 3/2005 | Gorelik |
| 2005/0058976 A1 | 3/2005 | Vernon |
| 2005/0060320 A1 | 3/2005 | Bostrom |
| 2005/0060332 A1 | 3/2005 | Bernstein |
| 2005/0065964 A1 | 3/2005 | Ziemann |
| 2005/0065965 A1 | 3/2005 | Ziemann |
| 2005/0097084 A1 | 5/2005 | Balmin |
| 2005/0102636 A1 | 5/2005 | McKeon |
| 2005/0125432 A1 | 6/2005 | Lin |
| 2005/0138073 A1 | 6/2005 | Zhou |
| 2005/0149471 A1 | 7/2005 | Lassalle |
| 2005/0154979 A1 | 7/2005 | Chidlovskii |
| 2005/0156761 A1 | 7/2005 | Oh |
| 2005/0165732 A1 | 7/2005 | Burges |
| 2005/0514265 | 7/2005 | Miro |
| 2005/0171962 A1 | 8/2005 | Martin |
| 2005/0187900 A1 | 8/2005 | Letourneau |
| 2005/0195741 A1 | 9/2005 | Doshi |
| 2005/0210014 A1 | 9/2005 | Asano |
| 2005/0214727 A1 | 9/2005 | Stoianovici |
| 2005/0216445 A1 | 9/2005 | Rao |
| 2005/0267908 A1 | 12/2005 | Letourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | Letourneau |
| 2006/0053122 A1 | 3/2006 | Korn |
| 2006/0074838 A1 | 4/2006 | Srivastava |
| 2006/0095442 A1 | 5/2006 | Letourneau |
| 2006/0095455 A1 | 5/2006 | Letourneau |
| 2006/0123029 A1 | 6/2006 | Letourneau |
| 2006/0129582 A1 | 6/2006 | Schiffmann |
| 2006/0209351 A1 | 9/2006 | Saito |
| 2006/0259533 A1 | 11/2006 | Letourneau |
| 2006/0271573 A1 | 11/2006 | Letourneau |
| 2007/0003917 A1 | 1/2007 | Kitching |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | Andrews |
| 2010/0094908 A1 | 4/2010 | Letourneau |
| 2010/0114969 A1 | 4/2010 | Letourneau |
| 2010/0191775 A1 | 7/2010 | Schiffmann |
| 2010/0205581 A1 | 8/2010 | Letourneau |
| 2010/0318521 A1 | 12/2010 | Letourneau |
| 2011/0131259 A1 | 6/2011 | Letourneau |
| 2011/0282898 A1 | 11/2011 | Schiffmann |
| 2011/0320499 A1 | 12/2011 | Letourneau |
| 2012/0144388 A1 | 6/2012 | Schiffmann |
| 2013/0151566 A1 | 6/2013 | Letourneau |
| 2013/0198239 A1 | 8/2013 | Letourneau |
| 2014/0040293 A1 | 2/2014 | Letourneau |
| 2014/0184430 A1 | 7/2014 | Jiang |
| 2014/0289266 A1 | 9/2014 | Letourneau |
| 2014/0289278 A1 | 9/2014 | Schiffmann |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann |
| 2016/0162528 A1 | 6/2016 | Letourneau |
| 2016/0283611 A1 | 9/2016 | Letourneau |
| 2016/0328431 A1 | 11/2016 | Schiffmann |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Letourneau |
| 2018/0107698 A1 | 4/2018 | Schiffmann |
| 2019/0026326 A1 | 1/2019 | Schiffmann |
| 2019/0034510 A1 | 1/2019 | Letourneau |
| 2019/0121795 A1 | 4/2019 | Schiffmann |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews |
| 2020/0218707 A1 | 7/2020 | Letourneau |
| 2020/0372041 A1 | 11/2020 | Letourneau |
| 2020/0394168 A1 | 12/2020 | Schiffmann |
| 2020/0394224 A1 | 12/2020 | Letourneau |
| 2021/0149860 A1 | 5/2021 | Letourneau |
| 2021/0349871 A1 | 11/2021 | Letourneau |
| 2022/0043793 A1 | 2/2022 | Letourneau |
| 2022/0043832 A1 | 2/2022 | Letourneau |

OTHER PUBLICATIONS

"Origin Data, Inc. White Paper"(1999) pp. 1-13, 14 pages.
ACM Portal Search—"The Art of Computer Programming", Fundamental Algorithms, 1 (1973), ACM Portal Search Results conducted by Examiner on Jul. 18, 2009, 6 pages.
ACM Portal Search—"The Associative Model of Data White Paper", Lazy Software (2000), ACM Portal Search Results conducted by Examiner on Jul. 18, 2009, 1 page.
Alderson, "Toward An Optimization Driven Framework for Designing and Generating Realistic Internet Topologies", Journal of the Association for Computing Machinery SIGCOMM Computer Communications Review 41, 33(1) (2003) pp. 41-46, 6 pages.
Apostol, "A Centennial History of the Prime Number Theorem", Engineering and Science, 4, (1996), 10 pages.
Benedikt, "Definable Relations and First-Order Query Languages over Strings", Journal of the Journal of the Association for Computing Machinery, 50 (2003) pp. 694-751, 58 pages.
Boppana, "Full Fault Dictionary Storage Based on Labeled Tree Encoding", 14th VLSI Test Symposium (1996) pp. 174-179, 6 pages.
Borodin, "A Tradeoff Between Search and Update Time for the Implicit Dictionary Problem", Theoretical Computer Science, 1(4) (1990), pp. 425-447, 12 pages.
Cano, "Lazy Evaluation in Penniless Propagation Over Join Trees", Networks, 39(4) (2002), pp. 175-185, 11 pages.
Caviness, "Simplification of Radical Expressions", Journal of the Association for Computing Machinery (1976), pp. 329-338, 10 pages.
Coenen, "T-Trees, Vertical Partitioning and Distributed Association Rule Mining", IEEE (2003), 4 pages.
Cole—"Tree Pattern Matching and Subset Matching in Deterministic O(n log 3 n)-time", Proceedings of the Tenth Annual Association for Computing Machinery—SIAM Symposium on Discrete Algorithms, (1999) pp. 1-10, 10 pages.
Cooper, "Oh! Pascal!", Arrays for Random Access (1982) pp. 295-327, 18 pages.

(56) References Cited

OTHER PUBLICATIONS

Dubiner—"Faster Tree Pattern Matching", Journal of the Association for Computing Machinery, 41(2) (1994) pp. 205-213, 9 pages.
Durango Bill's—"Enumeration of Trees", http://web.archive.org/web/20021028184112/http://www.durangobill.com/Trees.html (1998), 3 pages.
Er, "Enumerating Ordered Trees Lexicographically", Computation Journal, 28 (1985) pp. 538-542, 5 pages.
Ferragina, "The String B-Tree: A New Data Structure for String Search in External Memory and Its Applications", Journal of the Association for Computing Machinery, 46(2) (1999) pp. 236-280, 45 pages.
Google search (Kleene prime number enumeration operation natural numerals sequences "Kleene prime") conducted by Examiner on Jul. 18, 2009, 2 pages.
Google search (Kleene prime number enumeration operation natural numerals sequences "enumeration operation") conducted by Examiner on Jul. 18, 2009, 2 pages.
Google search (Kleene prime enumeration operation) conducted by Examiner on Jul. 18, 2009, 2 pages.
Hirschberg, "Algorithm for Computing Maximal Common Subsequences", Journal of the Association for Computing Machinery, 18(6) (1975) pp. 341-343, 3 pages.
Hoffmann, "Pattern Matching in Trees" 29(1) (1982) pp. 68-95 28 pages.
Iacob, "Xpath Extension for Querying Concurrent XML Markup," Technical Report #TR-394-04, Department of Computer Science, University of Kentucky (2004), 15 pages.
IEEE Explore Digital Library Search Result on Jul. 18, 2009, 1 page.
Jaiswal, "Local Pattern Transformation Based Feature Extraction Techniques for Classification of Epileptic EEG Signals", Biomedical Signal Processing and Control (2017) pp. 81-92, 12 pages.
Johnston, "Advances in Dataflow Programming Languages", Journal of the Association for Computing Machinery Computing Surveys, 36 (2004) pp. 1-34, 34 pages.
Katajainen, "Tree Compression and Optimization with Applications", International Journal of Foundations of Computer Science, 1(4) 1990, pp. 425-447, 24 pages.
Kharbutli, "Using Prime Numbers for Cache Indexing to Eliminate Conflict Misses" North Carolina State University Dept. of Electronical and Computer Engineering (2004) 24 pages.
Kilpelainen, "Tree Matching Problems with Applications to Structured Text Databases," University of Helsinki Ph. D. Dissertation, Report A-1992-6 (1992) pp. 1-109, 113 pages.
Knott—"A Balanced Tree Storage and Retrieval Algorithm" ACM pp. 175-196, 1971.
Knuth—"The Art of Computer Programming", Fundamental Algorithms, 1 (1973), pp. 162-163, 3 pages.
Leinonen, "Automation of Document Structure Transformations", University of Kuopio (2004) 68 pages.
Lerman, "Learning the Common Structure of Data," American Association for Artificial Intelligence, AAAI-00 Proceedings (2000) 6 pages.
Letourneau, "The Elementary Theory of Object Oriented Arithmetic" (1990) pp. 1-9, 9 pages.
Li—"An Immediate Approach to Balancing Nodes in Binary Search Trees" ACM, pp. 238-245, 2006.
Malhotra "A Methodology for Formal Expression of Hierarchy in Model Solution", IEEE (1983) pp. 258-267, 10 pages.
Minn, "Linear Transformation of Multi-Level Signal Set in Multi-Code CDMA", IEEE (2001) pp. 1239-1243, 5 pages.
Murray, "Code Transformation and Instruction Set Extension", Journal of the Association for Computing Machinery (2009) pp. 1-31, 32 pages.
Navarro, "A Guided Tour to Approximate String Matching", Journal of the Association for Computing Machinery Computing Surveys, 33 (2001) pp. 31-88, 58 pages.
Neven, "Expressive and Efficient Pattern Languages for Tree-Structured Data," Proceedings of the 19th Association for Computing Machinery SIGACT-SIGMOD-SIGART Symposium on Principles of Database Systems (2000), 12 pages.
Paik, "Mining Association Rules in Tree Structured XML Data" ACM, pp. 807-811, 2009, 5 pages.
Prasad, "Efficient Bit-Parallel Multi-Patterns String Matching Algorithms for Limited Expression", Journal of the Association for Computing Machinery (2010) pp. 1-6, 6 pages.
Ramesh—"Nonlinear Pattern Matching in Trees", Journal of the Association for Computer Machinery, 39 (1992) pp. 295-316, 22 pages.
Reiss, "Semantics-Based Code Search", IEEE ICSE (2009) pp. 243-253, 11 pages.
Rizum, "Code Transformation by Direct Transformation of ASTs", Journal of the Association for Computing Machinery (2015) pp. 1-7, 7 pages.
Schmidt, "Comparison of Tree and Graph Encodings as Function of Problem Complexity", Journal of the Association for Computing Machinery (2007) pp. 1674-1679, 6 pages.
Securest, "Blending Hierarchical and Attribute-Based File Naming", Distributed Computing System of the 12th International Conference (1992), pp. 572-580, 9 pages.
Shanmugasundaram, "Querying SML Views of Relational Data" 27th VLDB Conference (2001), 9 pages.
Siegel, "All Searches Are Divided into Three Parts String Searches Using Ternary Trees", Journal of the Association for Computing Machinery (1988) pp. 57-68, 12 pages.
Sinha, "Efficient Trie Based Sorting of Large Sets of Strings", Journal of the Association for Computing Machinery (2003) pp. 1-8, 8 pages.
Krishna, "A VLSI Architecture for Object Recognition Using Tree Matching", IEEE International Conference on Application-Specific Systems, Architecture and Processors (2000), 78 pages.
Smorynski, "Logical Number Theory 1: An Introduction", Springer-Verlag (1991) pp. 14-23, 305, 16 pages.
Somani, "Phased-Mission System Analysis Using Boolean Algebraic Methods" 22(1) (1994), 10 pages.
Spinellis, "Declarative Peephole Optimization Using String Pattern Matching", Journal of the Association for Computing Machinery (1999) pp. 47-51, 5 pages.
Sproat, "Compilation of Weighted Finite-State Transducers from Decision Trees", Journal of the Association for Computing Machinery (1996) pp. 215-222, 8 pages.
Stanat, "Discrete Mathematics in Computer Science," (1977) pp. 131-145, 16 pages.
Stefanov "Algorithmic Transformation Techniques for Efficient Exploration of Alternative Application Instances" Journal for the Association for Computing Machinery (ACM) (2002) pp. 7-12, 6 pages.
Talukdar, "Learning to Create Data-Integrating Queries", Journal of the Association for Computing Machinery PVLDB (2008) pp. 785-796, 12 pages.
Thiemann, "Grammar Based Analysis of String Expressions", Journal of the Association for Computing Machinery (2005) pp. 59-70, 12 pages.
Valiente, "Algorithms on Trees and Graphs", Tree Isomorphism (2002) pp. 151-251, 100 pages.
Valiente, "Tree Isomorphism", Algorithms on Trees and Graphs (2002), 51 pages.
Wagner, "The String-to-String Correction Problem", Journal of the Association for Computing Machinery, 21(1) (1974) pp. 168-173, 9 pages.
Wu, "A Prime Number Labeling Scheme for Dynamic Ordered XML Trees", IEEE (2004) 13 pages.
Xie, "S-Looper: Automatic Summarization for Multipath String Loops", Journal of the Association for Computing Machinery, (2015) pp. 188-198, 11 pages.
Yates, "A New Approach to Text Searching", Communication of the Journal of the Association for Computing Machinery, 35(1) (1992) pp. 74-82, 9 pages.
Zaks, "Lexicographic Generation of Ordered Trees," The Journal of Theoretical Computer Science, 10(1) (1980) pp. 63-82, 11 pages.
U.S. Appl. No. 16/209,872: Issue Notification dated Dec. 1, 2021, 1 page.

(56) References Cited

OTHER PUBLICATIONS

U.S. Appl. No. 17/381,142: Notice of Publication dated Nov. 11, 2021, 1 page.
U.S. Appl. No. 16/379,674: Notice of Allowance/Allowability dated Dec. 8, 2021, 28 pages.
U.S. Appl. No. 16/909,899: Response to Non-final Office Action filed Nov. 11, 2021, 27 pages.
U.S. Appl. No. 16/909,899: Non-final Office Action dated Jan. 27, 2022, 27 pages.
U.S. Appl. No. 16/459,930: Notice of Allowance/Allowability dated Dec. 29, 2021, 8 pages.
U.S. Appl. No. 16/513,021: Response to Final Office Action filed Feb. 2, 2022, 31 pages.
U.S. Appl. No. 16/513,021: Advisory Action dated Feb. 22, 2022, pages.
U.S. Appl. No. 17/396,488: Notice of Publication dated Feb. 10, 2022, 1 page.
U.S. Appl. No. 16/898,134: Issue Fee and 312 Response filed Dec. 22, 2021, 7 pages.
U.S. Appl. No. 16/898,134: Issue Fee Notification dated Jan. 19, 2022, 1 page.
U.S. Appl. No. 17/565,326, filed Dec. 29, 2021, 84 pages.
U.S. Appl. No. 17/565,326: Filing Receipt date Jan. 13, 2022, 4 pages.
U.S. Appl. No. 17/565,326: Notice to File Missing Parts dated Jan. 13, 2022, 2 pages.
U.S. Appl. No. 16/164,535: Issue Notification dated Nov. 17, 2021, 1 page.
U.S. Appl. No. 17/378,119: Notice of Publication dated Feb. 10, 2022, 1 page.
U.S. Appl. No. 11/005,859, filed Dec. 6, 2004, 124 pages.
U.S. Appl. No. 11/005,859: Notice to File Missing Parts, dated Jan. 10, 2002, 2 pages.
U.S. Appl. No. 11/005,859: Response to Notice to File Missing Parts, dated Mar. 29, 2005, 9 pages.
U.S. Appl. No. 11/005,859: Preliminary Amendment, dated Apr. 28, 2005, 193 pages.
U.S. Appl. No. 11/005,859: Restriction Requirement, dated 12/12/007, 7 pages.
U.S. Appl. No. 11/005,859: Response to Restriction Requirement, dated Jan. 14, 2008, 82 pages.
U.S. Appl. No. 11/005,859: Office Action, dated Mar. 21, 2008, 21 pages.
U.S. Appl. No. 11/005,859: Response to Office Action, dated Jul. 21, 2008, 89 pages.
U.S. Appl. No. 11/005,859: Final Office Action, dated Oct. 30, 2008, 14 pages.
U.S. Appl. No. 11/005,859: Response to Final Office Action, dated Dec. 30, 2008, 84 pages.
U.S. Appl. No. 11/005,859: Advisory Action, dated Jan. 13, 2009, 3 pages.
U.S. Appl. No. 11/005,859: RCE Amendment, dated Apr. 30, 2009, 88 pages.
U.S. Appl. No. 11/005,859: Final Office Action, dated Jul. 8, 2009, 8 pages.
U.S. Appl. No. 11/005,859: Interview Summary, dated Oct. 27, 2009, 3 pages.
U.S. Appl. No. 11/005,859: Response to Final Office Action, dated Dec. 8, 2009, 85 pages.
U.S. Appl. No. 11/005,859: Advisory Action, dated Dec. 22, 2009, 2 pages.
U.S. Appl. No. 11/005,859: RCE Amendment, dated Jan. 7, 2010, 87 pages.
U.S. Appl. No. 11/005,859: Office Action, dated Jan. 21, 2010, 17 pages.
U.S. Appl. No. 11/005,859: Response to Office Action, dated Feb. 25, 2020, 85 pages.
U.S. Appl. No. 11/005,859: Final Office Action, dated Jun. 8, 2010, 9 pages.
U.S. Appl. No. 11/005,859: Response to Final Office Action, dated Sep. 1, 2010, 91 pages.
U.S. Appl. No. 11/005,859: Advisory Action, dated Sep. 14, 2010, 7 pages.
U.S. Appl. No. 11/005,859: Notice of Appeal, dated Sep. 29, 2010, 3 pages.
U.S. Appl. No. 11/005,859: Office Action, dated Oct. 15, 2010, 5 pages.
U.S. Appl. No. 11/005,859: Response to Office Action, dated Jan. 18, 2011, 97 pages.
U.S. Appl. No. 11/005,859: Final Office Action, dated Mar. 30, 2011, 8 pages.
U.S. Appl. No. 11/005,859: Proposed Examiner's Amendment, dated May 4, 2011, 4 pages.
U.S. Appl. No. 11/005,859: Clarification of Examiner's Amendment, dated May 11, 2011, 4 pages.
U.S. Appl. No. 11/005,859: Notice of Allowance, dated Jun. 9, 2011, 19 pages.
U.S. Appl. No. 11/005,859: Issue Fee, Sep. 9, 2011, 6 pages.
U.S. Appl. No. 11/005,859: Issue Notification, dated Sep. 21, 2011, 1 page.
U.S. Appl. No. 13/229,624, filed Sep. 9, 2011, 137 pages.
U.S. Appl. No. 13/229,624, Filing Receipt, Sep. 21, 2011, 3 pages.
U.S. Appl. No. 13/229,624, Office Action, dated Nov. 23, 2011, 8 pages.
U.S. Appl. No. 13/229,624, Notice of Publication, dated Dec. 29, 2011, 1 page.
U.S. Appl. No. 13/229,624, Response to Office Action, dated Feb. 23, 2012, 24 pages.
U.S. Appl. No. 13/229,624, Final Office Action, dated Mar. 20, 2012, 10 pages.
U.S. Appl. No. 13/229,624, Response to Final Office Action, dated Jun. 13, 2012, 25 pages.
U.S. Appl. No. 13/229,624, Advisory Action, dated Jun. 20, 2012, 3 pages.
U.S. Appl. No. 13/229,624, RCE Amendment, dated Jul. 20, 2012, 28 pages.
U.S. Appl. No. 13/229,624, Office Action, dated Oct. 2, 2013, 38 pages.
U.S. Appl. No. 13/229,624, Response to Office Action, dated Dec. 27, 2013, 13 pages.
U.S. Appl. No. 13/229,624, Office Action, dated Apr. 4, 2014, 9 pages.
U.S. Appl. No. 13/229,624, Response to Office Action, dated Aug. 1, 2014, 11 pages.
U.S. Appl. No. 13/229,624, Final Office Action, dated Oct. 30, 2014, 9 pages.
U.S. Appl. No. 13/229,624, Response to Final Office Action, dated Jan. 30, 2015, 13 pages.
U.S. Appl. No. 13/229,624, Advisory Action, dated Mar. 11, 2015, 3 pages.
U.S. Appl. No. 13/229,624, Interview Summary, dated Mar. 19, 2015, 3 pages.
U.S. Appl. No. 13/229,624, Interview Summary, dated Mar. 27, 2015, 4 pages.
U.S. Appl. No. 13/229,624, Response to Advisory Action & Final Office Action, dated Mar. 27, 2015, 18 pages.
U.S. Appl. No. 13/229,624, Advisory Action, dated Apr. 15, 2015, 6 pages.
U.S. Appl. No. 13/229,624, RCE Amendment, dated Apr. 27, 2015, 19 pages.
U.S. Appl. No. 13/229,624, Notice of Allowance, dated Jul. 6, 2015, 10 pages.
U.S. Appl. No. 13/229,624, Issue Fee, Sep. 28, 2015, 6 pages.
U.S. Appl. No. 13/229,624, Issue Notification, Oct. 14, 2015, 1 page.
U.S. Appl. No. 14/870,744, filed Sep. 30, 2015, 131 pages.
U.S. Appl. No. 14/870,744, Preliminary Amendment, dated Oct. 6, 2015, 12 pages.
U.S. Appl. No. 14/870,744, Filing Receipts Notice to File Missing Parts, dated Oct. 16, 2015, 5 pages.
U.S. Appl. No. 14/870,744, Response to Notice to File Missing Parts, dated Feb. 19, 2016, 6 pages.

(56) References Cited

OTHER PUBLICATIONS

U.S. Appl. No. 14/870,744, Updated Filing Receipts Informational Notice, dated Mar. 2, 2016, 4 pages.
U.S. Appl. No. 14/870,744, Notice of Publication, dated Jun. 9, 2016, 1 page.
U.S. Appl. No. 14/870,744, Response to Informational Notice, dated Jun. 22, 2016, 5 pages.
U.S. Appl. No. 14/870,744, Office Action, dated Aug. 24, 2017, 58 pages.
U.S. Appl. No. 14/870,744, Response to Office Action, dated Nov. 24, 2017, 32 pages.
U.S. Appl. No. 14/870,744, Final Office Action, dated Mar. 30, 2018, 30 pages.
U.S. Appl. No. 14/870,744, Response to Final Office Action, dated May 30, 2018, 35 pages.
U.S. Appl. No. 14/870,744, Advisory Action, dated Jul. 3, 2018, 7 pages.
U.S. Appl. No. 14/870,744, RCE Amendment, dated Jul. 27, 2018, 35 pages.
U.S. Appl. No. 14/870,744, Notice of Allowance, dated Sep. 6, 2018, 11 pages.
U.S. Appl. No. 14/870,744, Issue Fee, Dec. 4, 2018, 21 pages.
U.S. Appl. No. 14/870,744, Interview Summary, dated Mar. 8, 2019, 2 pages.
U.S. Appl. No. 14/870,744, Issue Notification, dated Mar. 20, 2019, 1 page.
U.S. Appl. No. 16/209,872, filed Dec. 4, 2018, 134 pages.
U.S. Appl. No. 16/209,872, Filing Receipt & Notice to File Missing Parts, dated Dec. 28, 2018, 5 pages.
U.S. Appl. No. 16/209,872, Preliminary Amendment and Response to Notice to File Missing Parts, dated Feb. 21, 2019, 20 pages.
U.S. Appl. No. 16/209,872, Update Filing Receipt, Feb. 26, 2019, 3 pages.
U.S. Appl. No. 16/209,872, Notice of Publication, dated Jun. 6, 2019, 1 page.
U.S. Appl. No. 16/209,872, Office Action, dated Sep. 17, 2020, 63 pages.
U.S. Appl. No. 16/209,872, Response to Office Action, dated Sep. 17, 2020, 63 pages.
U.S. Appl. No. 16/209,872, Terminal Disclaimer, Sep. 17, 2020, 6 pages.
U.S. Appl. No. 16/209,872: Notice of Allowance and Allowability dated Mar. 26, 2021, 17 pages.
U.S. Appl. No. 16/209,872: 312 Amendment After filed Apr. 30, 2021, 11 pages.
U.S. Appl. No. 16/209,872: Notice of Allowance/Allowability dated Jun. 10, 2021, 4 pages.
U.S. Appl. No. 16/209,872: Request for Continued Examination and Amendment filed Jun. 25, 2021, 17 pages.
U.S. Appl. No. 16/820,457, Application and Preliminary Amendment filed Mar. 16, 2020, 148 pages.
U.S. Appl. No. 16/820,457, Filing Receipt, Mar. 31, 2020, 3 pages.
U.S. Appl. No. 16/820,457, Notice of Publication, dated Jul. 9, 2020, 1 page.
U.S. Appl. No. 17/158,804: Patent Application filed Jan. 26, 2021, 146 pages.
U.S. Appl. No. 17/158,804: Filing Receipt dated Feb. 9, 2021, 5 pages.
U.S. Appl. No. 17/158,804: Notice of Publication dated Feb. 9, 2021, 1 page.
U.S. Appl. No. 11/007,139, filed Dec. 7, 2004, 90 pages.
U.S. Appl. No. 11/007,139, Notice to File Missing Parts dated Jan. 19, 2005, 2 pages.
U.S. Appl. No. 11/007,139, Response to Notice to File Missing Parts dated Mar. 29, 2005, 9 pages.
U.S. Appl. No. 11/007,139, Preliminary Amendment dated Apr. 28, 2005, 146 pages.
U.S. Appl. No. 11/007,139, Office Action, dated May 14, 2007, 2 pages.
U.S. Appl. No. 11/007,139, Response to Office Action dated Oct. 15, 2007, 29 pages.
U.S. Appl. No. 11/007,139, Supplemental Amendment dated Oct. 17, 2007, 6 pages.
U.S. Appl. No. 11/007,139, Office Action dated Jan. 2, 2008, 15 pages.
U.S. Appl. No. 11/007,139, Response to Office Action dated Apr. 2, 2008, 29 pages.
U.S. Appl. No. 11/007,139, Final Office Action dated Aug. 15, 2008, 22 pages.
U.S. Appl. No. 11/007,139, Response to Final Office Action dated Oct. 15, 2008, 25 pages.
U.S. Appl. No. 11/007,139, Advisory Action dated Oct. 22, 2008, 3 pages.
U.S. Appl. No. 11/007,139, RCE Amendment dated Nov. 14, 2008, 29 pages.
U.S. Appl. No. 11/007,139, Office Action, dated Dec. 8, 2008, 17 pages.
U.S. Appl. No. 11/007,139, Response to Office Action dated May 8, 2009, 28 pages.
U.S. Appl. No. 11/007,139, Final Office Action dated Aug. 4, 2009, 18 pages.
U.S. Appl. No. 11/007,139, Response to Final Office Action dated Dec. 4, 2009, 25 pages.
U.S. Appl. No. 11/007,139, Advisory Action dated Dec. 14, 2009, 3 pages.
U.S. Appl. No. 11/007,139, RCE Amendment dated Jan. 4, 2010, 3 pages.
U.S. Appl. No. 11/007,139, Office Action dated Jan. 27, 2010, 31 pages.
U.S. Appl. No. 11/007,139, Response to Office Action dated Apr. 27, 2010, 30 pages.
U.S. Appl. No. 11/007,139, Final Office Action dated Jul. 20, 2010, 22 pages.
U.S. Appl. No. 11/007,139, Response to Final Office Action dated Oct. 20, 2010, 35 pages.
U.S. Appl. No. 11/007,139, Advisory Action dated Oct. 25, 2010, 2 pages.
U.S. Appl. No. 11/007,139, Response to Final Office Action and Advisory Action dated Nov. 18, 2010, 26 pages.
U.S. Appl. No. 11/007,139, Advisory Action dated Dec. 1, 2010, 4 pages.
U.S. Appl. No. 11/007,139, Notice of Appeal dated Dec. 20, 2010, 3 pages.
U.S. Appl. No. 11/007,139, Response to Final Office Action and Advisory Action, dated Dec. 20, 2010, 30 pages.
U.S. Appl. No. 11/007,139, Office Action dated Jan. 3, 2011, 24 pages.
U.S. Appl. No. 11/007,139, Response to Office Action dated May 3, 2011, 29 pages.
U.S. Appl. No. 11/007,139, Final Office Action dated Jul. 18, 2011, 23 pages.
U.S. Appl. No. 11/007,139, Response to Final Office Action dated Oct. 18, 2011, 32 pages.
U.S. Appl. No. 11/007,139, Advisory Office Action dated Nov. 4, 2011, 12 pages.
U.S. Appl. No. 11/007,139, Notice of Appeal dated Nov. 16, 2011, 4 pages.
U.S. Appl. No. 11/007,139, Appeal Brief dated May 1, 2012, 91 pages.
U.S. Appl. No. 11/007,139, Notice of Non-Compliant Appeal Brief dated May 7, 2012, 3 pages.
U.S. Appl. No. 11/007,139, Response to Notice of Non-Compliant Appeal Brief dated May 15, 2012, 9 pages.
U.S. Appl. No. 11/007,139, Examiner's Answer dated Aug. 20, 2012, 35 pages.
U.S. Appl. No. 11/007,139, Reply Brief dated Oct. 22, 2012, 29 pages.
U.S. Appl. No. 11/007,139, Patent Trial and Appeal Board Docketing Notice dated Nov. 6, 2012, 2 pages.
U.S. Appl. No. 11/007,139, Decision on Appeal dated Jul. 24, 2015, 8 pages.

(56) References Cited

OTHER PUBLICATIONS

U.S. Appl. No. 11/007,139, RCE and Amendment dated Aug. 19, 2015, 21 pages.
U.S. Appl. No. 11/007,139, Office Action dated Dec. 31, 2015, 24 pages.
U.S. Appl. No. 11/007,139, Response to Office Action dated Mar. 28, 2016, 21 pages.
U.S. Appl. No. 11/007,139, Final Office Action dated Jun. 20, 2016, 13 pages.
U.S. Appl. No. 11/007,139, Response to Final Office Action dated Jul. 29, 2016, 19 pages.
U.S. Appl. No. 11/007,139, Notice of Allowance dated Aug. 23, 2016, 12 pages.
U.S. Appl. No. 11/007,139, Corrected Filing Receipt, Sep. 2, 2016, 3 pages.
U.S. Appl. No. 11/007,139, Application Data Sheet dated Oct. 24, 2016, 10 pages.
U.S. Appl. No. 11/007,139, Notice of Allowance dated Dec. 29, 2016, 14 pages.
U.S. Appl. No. 11/007,139, Issue Fee dated Mar. 23, 2017, 6 pages.
U.S. Appl. No. 11/007,139, Issue Notification dated Apr. 19, 2017, 1 page.
U.S. Appl. No. 15/043,267, filed Feb. 12, 2016, 104 pages.
U.S. Appl. No. 15/043,267, Filing Receipt dated Mar. 7, 2016, 3 pages.
U.S. Appl. No. 15/043,267, Informational Notice dated Mar. 7, 2016, 1 page.
U.S. Appl. No. 15/043,267, Request to Submit Priority Claim and Preliminary Amendment dated Jun. 10, 2016, 11 pages.
U.S. Appl. No. 15/043,267, Response to Informational Notice dated Oct. 14, 2016, 5 pages.
U.S. Appl. No. 15/043,267, Corrected Filing Receipt dated Oct. 25, 2016, 3 pages.
U.S. Appl. No. 15/043,267, Notice of Publication dated Feb. 2, 2017, 1 page.
U.S. Appl. No. 15/043,267, Office Action dated Apr. 2, 2019, 80 pages.
U.S. Appl. No. 15/043,267, Response to Office Action dated Jul. 2, 2019, 24 pages.
U.S. Appl. No. 15/043,267, Final Office Action dated Oct. 18, 2019, 14 pages.
U.S. Appl. No. 15/043,267, Response to Final Office Action dated Jan. 21, 2020, 20 pages.
U.S. Appl. No. 15/043,267, Advisory Action dated Jan. 29, 2020, 12 pages.
U.S. Appl. No. 15/043,267, RCE Amendment dated Mar. 3, 2020, 21 pages.
U.S. Appl. No. 15/043,267, Notice of Allowance dated Mar. 23, 2020, 9 pages.
U.S. Appl. No. 15/043,267, Issue Fee Payment, dated Jun. 23, 2020, 18 pages.
U.S. Appl. No. 15/043,267, Issue Notification dated Jul. 15, 2020, 1 page.
U.S. Appl. No. 16/911,282, filed Jun. 24, 2020, 98 pages.
U.S. Appl. No. 16/911,282, Filing Receipt and Notice to File Missing Parts dated Jul. 7, 2020, 7 pages.
U.S. Appl. No. 16/911,282, Preliminary Amendment and Response to Notice to File Missing Parts filed Sep. 8, 2020, 18 pages.
U.S. Appl. No. 16/911,282, Updated Filing Receipt dated Sep. 10, 2020, 5 pages.
U.S. Appl. No. 16/911,282, Notice of Publication dated Dec. 17, 2020, 1 page.
U.S. Appl. No. 11/006,320, filed Dec. 6, 2004, 75 pages.
U.S. Appl. No. 11/006,320, Notice to File Missing Parts dated Feb. 7, 2005, 2 pages.
U.S. Appl. No. 11/006,320, Response to Notice to File Missing Parts dated May 6, 2005, 140 pages.
U.S. Appl. No. 11/006,320, Notice of Publication dated Jan. 19, 2006, 1 page.
U.S. Appl. No. 11/006,320, Restriction Requirement dated Mar. 26, 2007, 6 pages.
U.S. Appl. No. 11/006,320, Response to Restriction Requirement dated Apr. 27, 2007, 32 pages.
U.S. Appl. No. 11/006,320, Notice of Non-Compliant Amendment dated Jul. 6, 2007, 3 pages.
U.S. Appl. No. 11/006,320, Response to Notice of Non-Compliant Amendment dated Jul. 25, 2007, 32 pages.
U.S. Appl. No. 11/006,320, Office Action dated Oct. 1, 2007, 19 pages.
U.S. Appl. No. 11/006,320, Response to Office Action dated Jan. 29, 2008, 42 pages.
U.S. Appl. No. 11/006,320, Notice of Non-Compliant Amendment dated Apr. 8, 2008, 4 pages.
U.S. Appl. No. 11/006,320, Response to Notice of Non-Compliant Amendment dated May 5, 2008, 43 pages.
U.S. Appl. No. 11/006,320, Office Action dated Aug. 15, 2008, 28 pages.
U.S. Appl. No. 11/006,320, Response to Office Action dated Nov. 14, 2008, 39 pages.
U.S. Appl. No. 11/006,320, Office Communication dated Jan. 27, 2009, 2 pages.
U.S. Appl. No. 11/006,320, Response to Office Communication dated Apr. 27, 2009, 43 pages.
U.S. Appl. No. 11/006,320, Final Office Action dated Jul. 29, 2009, 7 pages.
U.S. Appl. No. 11/006,320, Response to Final Office Action dated Nov. 30, 2009, 8 pages.
U.S. Appl. No. 11/006,320, Office Action, dated Dec. 4, 2009, 12 pages.
U.S. Appl. No. 11/006,320, Response to Office Action filed Feb. 23, 2010, 11 pages.
U.S. Appl. No. 11/006,320, Response to Final Office Action dated May 24, 2010, 11 pages.
U.S. Appl. No. 11/006,320, Response to Final Office Action filed Aug. 24, 2010, 17 pages.
U.S. Appl. No. 11/006,320, Notice of Allowance dated Sep. 17, 2010, 18 pages.
U.S. Appl. No. 11/006,320, Issue Fee dated Dec. 17, 2010, 12 pages.
U.S. Appl. No. 11/006,320, Issue Notification dated Jan. 12, 2011, 1 page.
U.S. Appl. No. 12/972,326, filed Dec. 17, 2010, 76 pages.
U.S. Appl. No. 12/972,326: Filing Receipt and Notice to File Missing Parts dated Jan. 6, 2011, 5 pages.
U.S. Appl. No. 12/972,326: Preliminary Amendment and Response to Notice to File Missing Parts dated Jan. 26, 2011, 16 pages.
U.S. Appl. No. 12/972,326: Preliminary Amendment filed May 20, 2011, 17 pages.
U.S. Appl. No. 12/972,326: Notice of Non-compliant Amendment dated Jun. 2, 2011, 2 pages.
U.S. Appl. No. 12/972,326: Notice of Publication dated Jun. 2, 2011, 1 page.
U.S. Appl. No. 12/972,326: Substitute Preliminary Amendment filed Jul. 5, 2011, 23 pages.
U.S. Appl. No. 12/972,326: Preliminary Amendment filed Aug. 10, 2011, 9 pages.
U.S. Appl. No. 12/972,326: Non-final Office Action dated Feb. 23, 2011, 9 pages.
U.S. Appl. No. 12/972,326: Advisory Action dated Jun. 26, 2012, 3 pages.
U.S. Appl. No. 12/972,326: Notice of Abandonment dated Sep. 18, 2012, 2 pages.
U.S. Appl. No. 11/006,848, filed Dec. 7, 2004, 61 pages.
U.S. Appl. No. 11/006,848: Notice to File Missing Parts dated Mar. 18, 2005, 2 pages.
U.S. Appl. No. 11/006,848: Response to Notice to File Missing Parts dated Apr. 28, 2005, 101 pages.
U.S. Appl. No. 11/006,848: Office Action dated Apr. 4, 2007, 38 pages.
U.S. Appl. No. 11/006,848: Response to Office Action filed Oct. 3, 2007, 22 pages.
U.S. Appl. No. 11/006,848: Supplemental Amendment filed Nov. 13, 2007, 6 pages.

(56) References Cited

OTHER PUBLICATIONS

U.S. Appl. No. 11/006,848: Office Action dated Feb. 5, 2008, 47 pages.
U.S. Appl. No. 11/006,848: Response to Office Action dated Aug. 4, 2008, 30 pages.
U.S. Appl. No. 11/006,848: Final Office Action dated Dec. 2, 2008, 30 pages.
U.S. Appl. No. 11/006,848: RCE and Amendment filed May 4, 2009.
U.S. Appl. No. 11/006,848: Notice of Allowance dated Jun. 11, 2009, 8 pages.
U.S. Appl. No. 11/006,848: Issue Fee Payment filed Sep. 11, 2009, 16 pages.
U.S. Appl. No. 11/006,848: Issue Notification dated 10/28/009, 1 page.
U.S. Appl. No. 11/006,848: Request to Correct Inventorship and for a Certificate of Correction filed Sep. 12, 2016, 14 pages.
U.S. Appl. No. 11/006,848: Certificate of Correction dated Aug. 8, 2017, 1 page.
U.S. Appl. No. 12/573,829, filed Oct. 5, 2009, 67 pages.
U.S. Appl. No. 12/573,829: Notice to File Missing Parts Oct. 20, 2009, 2 pages.
U.S. Appl. No. 12/573,829: Filing Receipt Oct. 20, 2009, 3 pages.
U.S. Appl. No. 12/573,829: Preliminary Amendment filed Dec. 21, 2009, 17 pages.
U.S. Appl. No. 12/573,829: Filing Receipt Jan. 4, 2010, 3 pages.
U.S. Appl. No. 12/573,829: Notice of Publication Apr. 15, 2020, 1 page.
U.S. Appl. No. 12/573,829: Non-Final Rejection dated Jun. 28, 2010, 49 pages.
U.S. Appl. No. 12/573,829: Amendment/Request for Reconsideration After Non-Final Rejection filed Sep. 28, 2010, 25 pages.
U.S. Appl. No. 12/573,829: Final Office Action dated Nov. 1, 2010, 53 pages.
U.S. Appl. No. 12/573,829: Response After Final Action filed Jan. 3, 2011, 32 pages.
U.S. Appl. No. 12/573,829: Advisory Action dated Jan. 7, 2011, 3 pages.
U.S. Appl. No. 12/573,829: Notice of Appeal filed Jan. 11, 2011, 5 pages.
U.S. Appl. No. 12/573,829: Appeal Brief filed May 4, 2011, 72 pages.
U.S. Appl. No. 12/573,829: Examiner's Answer to Appeal Brief, 31 pages.
U.S. Appl. No. 12/573,829: Reply Brief filed Sep. 21, 2011, 19 pages.
U.S. Appl. No. 12/573,829: Reply Brief Noted—Patent Board dated Oct. 5, 2011, 2 pages.
U.S. Appl. No. 12/573,829: Appeal Docketing Notice dated Oct. 11, 2011, 2 pages.
U.S. Appl. No. 12/573,829: Patent Board Decision—Examiner Affirmed May 9, 2014, 10 pages.
U.S. Appl. No. 12/573,829: Request for Continued Examination filed Jul. 9, 2014, 25 pages.
U.S. Appl. No. 12/573,829: Non-Final Office Action dated Apr. 28, 2015, 52 pages.
U.S. Appl. No. 12/573,829: Request for Consideration after Non-Final Rejection filed Jul. 27, 2015, 24 pages.
U.S. Appl. No. 12/573,829: Final Rejection dated Sep. 15, 2015, 24 pages.
U.S. Appl. No. 12/573,829: Response After Final Action filed Nov. 16, 2015, 21 pages.
U.S. Appl. No. 12/573,829: Advisory Action dated Dec. 2, 2015, 4 pages.
U.S. Appl. No. 12/573,829: Request for Continued Examination filed Dec. 14, 2015, 24 pages.
U.S. Appl. No. 12/573,829: Non-Final Rejection Jun. 13, 2016, 25 pages.
U.S. Appl. No. 12/573,829: Request for Corrected Filing Receipt to Correct Inventorship filed Sep. 13, 2016, 30 pages.
U.S. Appl. No. 12/573,829: Updated Filing Receipt and Notice of Acceptance of Request to Correct Inventorship dated Sep. 15, 2016, 5 pages.
U.S. Appl. No. 12/573,829: Non-Final Rejection dated Dec. 16, 2016, 21 pages.
U.S. Appl. No. 12/573,829: Request for Reconsideration After Non-Final Request filed Mar. 16, 2017, 21 pages.
U.S. Appl. No. 12/573,829: Final Rejection dated May 2, 2017, 24 pages.
U.S. Appl. No. 12/573,829: Response After Final Action filed Jul. 5, 2017, 23 pages.
U.S. Appl. No. 12/573,829: Advisory Action, Applicant Initiated Review Summary, Amendment After Final Action, After Final Consideration Program Decision dated Aug. 29, 2017, 8 pages.
U.S. Appl. No. 12/573,829: Request for Continued Examination filed Sep. 5, 2017, 29 pages.
U.S. Appl. No. 12/573,829: Non-Final Rejection dated Dec. 27, 2017, 24 pages.
U.S. Appl. No. 12/573,829: Request for Reconsideration After Non-Final Rejection filed Mar. 27, 2018, 25 pages.
U.S. Appl. No. 12/573,829: Final Rejection dated Jul. 11, 2018, 26 pages.
U.S. Appl. No. 12/573,829: Request for Consideration After Final Consideration filed Sep. 7, 2018, 25 pages.
U.S. Appl. No. 12/573,829: Advisory Action dated Sep. 24, 2018, 6 pages.
U.S. Appl. No. 12/573,829: Request for Continued Examination filed Oct. 9, 2018.
U.S. Appl. No. 12/573,829: Notice of Allowance dated May 21, 2019, 32 pages.
U.S. Appl. No. 12/573,829: Issue Fee & Terminal Disclaimer filed Aug. 21, 2019, 12 pages.
U.S. Appl. No. 12/573,829: Issue Notification dated Sep. 18, 2019, 1 page.
U.S. Appl. No. 16/549,185, filed Sep. 23, 2019, 73 pages.
U.S. Appl. No. 16/549,185: Filing Receipt and Notice to File Missing Parts dated Sep. 4, 2019, 6 pages.
U.S. Appl. No. 16/549,185: Response to Notice to File Missing Parts and Preliminary Amendment filed Sep. 5, 2019, 18 pages.
U.S. Appl. No. 16/549,185: Notice of Publication dated Dec. 19, 2019, 1 page.
U.S. Appl. No. 16/549,185: Updated Filing Receipt Sep. 6, 2019, 4 pages.
U.S. Appl. No. 11/006,841, filed Dec. 7, 2004, 67 pages.
U.S. Appl. No. 11/006,841: Pre-Exam Formalities Notice dated Jan. 10, 2005, 2 pages.
U.S. Appl. No. 11/006,841: Applicant Response to Pre-Exam Formalities Notice filed Apr. 14, 2005, 105 pages.
U.S. Appl. No. 11/006,841: Examiner's Search Strategies and Results dated Mar. 30, 2007, 14 pages.
U.S. Appl. No. 11/006,841: Non-Final Rejection dated Apr. 6, 2007, 18 pages.
U.S. Appl. No. 11/006,841: Response to Non-Final Rejection filed Sep. 6, 2007, 67 pages.
U.S. Appl. No. 11/006,841: Requirement for Restriction/Election dated Nov. 27, 2007, 5 pages.
U.S. Appl. No. 11/006,841: Request for Reconsideration after Non-Final Rejection filed Dec. 27, 2007, 41 pages.
U.S. Appl. No. 11/006,841: Requirement for Restriction/Election dated Mar. 17, 2008, 9 pages.
U.S. Appl. No. 11/006,841: Response to Election/Restriction filed Jul. 17, 2008, 38 pages.
U.S. Appl. No. 11/006,841: Final Office Action dated Oct. 29, 2008, 79 pages.
U.S. Appl. No. 11/006,841: RCE and Amendment filed Dec. 29, 2008, 48 pages.
U.S. Appl. No. 11/006,841: Advisory Action dated Jan. 6, 2009, 3 pages.
U.S. Appl. No. 11/006,841: Request for Continued Examination filed Apr. 23, 2009.
U.S. Appl. No. 11/006,841: Information Disclosure Statement and Remarks in an Amendment filed Jun. 26, 2009, 43 pages.

(56) References Cited

OTHER PUBLICATIONS

U.S. Appl. No. 11/006,841: Notice of Allowance and Fees Due dated Jun. 29, 2009, 69 pages.
U.S. Appl. No. 11/006,841: Issue Fee Payment; Information Disclosure Statement; Amendment After Notice of Allowance filed Sep. 29, 2009, 17 pages.
U.S. Appl. No. 11/006,841: Miscellaneous Communication to Applicant dated Oct. 21, 2009, 5 pages.
U.S. Appl. No. 11/006,841: Issue Notification dated Nov. 11, 2009, 1 page.
U.S. Appl. No. 12/578,411: Application filed Oct. 13, 2009, 75 pages.
U.S. Appl. No. 12/578,411: Notice to File Missing Parts dated Oct. 28, 2009, 6 pages.
U.S. Appl. No. 12/578,411: Applicant Response to Pre-Exam Formalities Notice filed Dec. 28, 2009, 27 pages.
U.S. Appl. No. 12/578,411: Filing Receipt Jan. 7, 2010, 3 pages.
U.S. Appl. No. 12/578,411: Requirement for Restriction/Election dated Jun. 8, 2011, 6 pages.
U.S. Appl. No. 12/578,411: Response to Election/Restriction filed Jul. 6, 2011, 20 pages.
U.S. Appl. No. 12/578,411: Non-Final Rejection dated Aug. 23, 2011, 25 pages.
U.S. Appl. No. 12/578,411: Amendment After Non-Final Rejection filed Dec. 22, 2011, 42 pages.
U.S. Appl. No. 12/578,411: Search Results by Examiner dated Jan. 20, 2012, 57 pages.
U.S. Appl. No. 12/578,411: Applicant Amendment submitted/Entered with Filing of CPA/RCE filed May 21, 2012, 28 pages.
U.S. Appl. No. 12/578,411: Refund Request filed May 24, 2012, 4 pages.
U.S. Appl. No. 12/578,411: Advisory Action dated May 31, 2012, 4 pages.
U.S. Appl. No. 12/578,411: Request for Continued Examination filed Jun. 12, 2012, 38 pages.
U.S. Appl. No. 12/578,411: Notice of Allowance and Fees Due, dated Aug. 19, 2012, 35 pages.
U.S. Appl. No. 12/578,411: Amendment After Notice of Allowance dated Nov. 14, 2013, 16 pages.
U.S. Appl. No. 12/578,411: Amendment After Final and Response to Amendment dated Nov. 19, 2013, 2 pages.
U.S. Appl. No. 12/578,411: Response to Amendment dated Dec. 3, 2013, 8 pages.
U.S. Appl. No. 12/578,411: Issue Notification dated Dec. 18, 2013, 1 page.
U.S. Appl. No. 12/578,411: Terminal Disclaimer dated Nov. 8, 2017, 7 pages.
U.S. Appl. No. 14/086,837, filed Nov. 21, 2013, 70 pages.
U.S. Appl. No. 14/086,837: Filing Receipt dated Dec. 12, 2013, 3 pages.
U.S. Appl. No. 14/086,837: Notice to File Missing Parts dated Dec. 12, 2013, 2 pages.
U.S. Appl. No. 14/086,837: Preliminary Amendment and Response to Notice to File Missing Parts filed Jun. 11, 2013, 28 pages.
U.S. Appl. No. 14/086,837: Notice of Publication dated Sep. 25, 2014, 1 page.
U.S. Appl. No. 14/086,837: Two Terminal Disclaimers filed Nov. 14, 2014, 4 pages.
U.S. Appl. No. 14/086,837: Notice of Allowance/Allowability dated Dec. 2, 2014, 19 pages.
U.S. Appl. No. 14/086,837: Issue Fee and 312 Amendment filed Feb. 27, 2015, 12 pages.
U.S. Appl. No. 14/086,837: Issue Notification dated May 6, 2015, 1 page.
U.S. Appl. No. 14/635,836, filed Mar. 2, 2015, 75 pages.
U.S. Appl. No. 14/635,836: Filing Receipt dated Mar. 12, 2015, 3 pages.
U.S. Appl. No. 14/635,836: Notice to File Missing Parts dated Mar. 12, 2015, 2 pages.
U.S. Appl. No. 14/635,836: Preliminary Amendment and Response to Notice to File Missing Parts filed May 12, 2015, 42 pages.
U.S. Appl. No. 14/635,836: Notice of Publication dated Aug. 27, 2015, 1 page.
U.S. Appl. No. 14/635,836: Terminal Disclaimer filed Nov. 13, 2015, 5 pages.
U.S. Appl. No. 14/635,836: Notice of Allowance/Allowability dated Apr. 18, 2016, 65 pages.
U.S. Appl. No. 14/635,836: Issue Fee and 312 Amendment filed Jul. 15, 2016, 17 pages.
U.S. Appl. No. 14/635,836: Issue Notification dated Aug. 16, 2016, 1 page.
U.S. Appl. No. 15/250,118: Application filed Aug. 29, 2016, 96 pages.
U.S. Appl. No. 15/250,118: Notice to File Corrected Application Papers dated Sep. 9, 2016, 2 pages.
U.S. Appl. No. 15/250,118: Filing Receipt dated Sep. 9, 2016, 3 pages.
U.S. Appl. No. 15/250,118: Response to Notice to File Corrected Application Papers and Revised Figures filed Nov. 8, 2016, 23 pages.
U.S. Appl. No. 15/250,118: Notice of Publication dated Feb. 23, 2017, 1 page.
U.S. Appl. No. 15/250,118: Non-final Office Action dated Jun. 15, 2017, 30 pages.
U.S. Appl. No. 15/250,118: Response to Non-final Office Action filed Sep. 14, 2017, 46 pages.
U.S. Appl. No. 15/250,118: Final Office Action dated Dec. 15, 2017, 69 pages.
U.S. Appl. No. 15/250,118: RCE and Amendment filed Dec. 15, 2017, 48 pages.
U.S. Appl. No. 15/250,118: Terminal Disclaimer filed Dec. 11, 2017, 6 pages.
U.S. Appl. No. 15/250,118: Notice of Allowance/Allowability filed Jan. 8, 2019, 41 pages.
U.S. Appl. No. 15/250,118: 312 Amendment filed Jan. 23, 2019, 20 pages.
U.S. Appl. No. 15/250,118: Issue Fee and 312 Amendment filed Apr. 5, 2019, 22 pages.
U.S. Appl. No. 15/250,118: Issue Notification dated Apr. 5, 2019, 1 page.
U.S. Appl. No. 16/379,674, filed Apr. 9, 2019, 88 pages.
U.S. Appl. No. 16/379,674: Filing Receipt Apr. 24, 2019, 4 pages.
U.S. Appl. No. 16/379,674: Notice of Publication dated Aug. 1, 2019, 1 page.
U.S. Appl. No. 16/379,674: Office Action, dated Oct. 19, 2020, 69 pages.
U.S. Appl. No. 16/379,674: Response to Office Action filed Feb. 19, 2021, 21 pages.
U.S. Appl. No. 16/379,674: Final Office Action dated Apr. 5, 2021, 21 pages.
U.S. Appl. No. 16/379,674: Final Office Action dated Apr. 9, 2021, 21 pages.
U.S. Appl. No. 16/379,674: Request for Continued Examination, Amendment and Terminal Disclaimer filed Jul. 1, 2021, 25 pages.
U.S. Appl. No. 11/006,440, filed Dec. 6, 2004, 87 pages.
U.S. Appl. No. 11/006,440: Pre-Exam Formalities Notice dated Jan. 11, 2005, 2 pages.
U.S. Appl. No. 11/006,440: Preliminary Amendment filed May 2, 2005, 140 pages.
U.S. Appl. No. 11/006,440: Preliminary Amendment filed Oct. 10, 2006, 139 pages.
U.S. Appl. No. 11/006,440: Requirement for Restriction/Election dated Mar. 29, 2007, 5 pages.
U.S. Appl. No. 11/006,440: Response to Election/Restriction filed Apr. 30, 2007, 43 pages.
U.S. Appl. No. 11/006,440: Examiner's Search Strategies and Results dated Jun. 19, 2007, 5 pages.
U.S. Appl. No. 11/006,440: Non-Final Rejection dated Jun. 21, 2007, 21 pages.
U.S. Appl. No. 11/006,440: Request for Reconsideration After Non-Final Rejection filed Nov. 20, 2007, 47 pages.

(56) References Cited

OTHER PUBLICATIONS

U.S. Appl. No. 11/006,440: Examiner's Search Strategies and Results, dated Feb. 1, 2008, 11 pages.
U.S. Appl. No. 11/006,440: Final Rejection dated Feb. 6, 2008, 18 pages.
U.S. Appl. No. 11/006,440: Response After Final Action dated Apr. 7, 2008, 37 pages.
U.S. Appl. No. 11/006,440: Notice of Appeal filed Aug. 4, 2008, 6 pages.
U.S. Appl. No. 11/006,440: Request for Continued Examination filed Nov. 4, 2008, 43 pages.
U.S. Appl. No. 11/006,440: Non-Final Rejection dated Jan. 23, 2009, 69 pages.
U.S. Appl. No. 11/006,440: Request for Reconsideration After Non-Final Rejection filed Apr. 23, 2009, 36 pages.
U.S. Appl. No. 11/006,440: Supplemental Response or Supplemental Amendment filed Jul. 17, 2009, 31 pages.
U.S. Appl. No. 11/006,440: Notice of Allowance and Fees Due dated Jul. 31, 2009, 58 pages.
U.S. Appl. No. 11/006,440: Amendment After Notice of Allowance and Issue Fee Payment filed Nov. 2, 2009, 14 pages.
U.S. Appl. No. 11/006,440: Issue Notification dated Dec. 2, 2009, 1 page.
U.S. Appl. No. 12/627,816: Claims Worksheet filed Nov. 24, 2009, 1 page.
U.S. Appl. No. 12/627,816: Preliminary Amendment, Application and Declaration filed Nov. 30, 2009, 94 pages.
U.S. Appl. No. 12/627,816: Notice to File Missing Parts, dated Dec. 15, 2009, 5 pages.
U.S. Appl. No. 12/627,816: Applicant Response to Pre-Exam Formalities Notice filed Apr. 12, 2010, 25 pages.
U.S. Appl. No. 12/627,816: Filing Receipt Apr. 20, 2010, 3 pages.
U.S. Appl. No. 12/627,816: Notice of Publication dated Jul. 29, 2010, 1 page.
U.S. Appl. No. 12/627,816: Non-Final Rejection dated May 5, 2011, 94 pages.
U.S. Appl. No. 12/627,816: Response to Final Office Action filed Nov. 7, 2011, 17 pages.
U.S. Appl. No. 12/627,816: Final Rejection dated Nov. 17, 2011, 21 pages.
U.S. Appl. No. 12/627,816: Terminal Disclaimer Review Decision Feb. 7, 2012, 1 page.
U.S. Appl. No. 12/627,816: Request for Continued Examination filed Feb. 17, 2012, 21 pages.
U.S. Appl. No. 12/627,816: Notice of Allowance and Fees Due dated Aug. 1, 2013, 51 pages.
U.S. Appl. No. 12/627,816: Issue Fee Payment and Amendment After Notice of Allowance dated Nov. 1, 2013, 16 pages.
U.S. Appl. No. 12/627,816: Miscellaneous Communication to Applicant dated Nov. 5, 2013, 4 pages.
U.S. Appl. No. 12/627,816: Amendment After Final Initialed by Examiner dated Nov. 9, 2013, 2 pages.
U.S. Appl. No. 12/627,816: Response to Amendment Under Rule 312 Nov. 12, 2013, 3 pages, Doc 1423.
U.S. Appl. No. 12/627,816: Issue Notification dated Nov. 26, 2013, 1 page.
U.S. Appl. No. 14/086,808, filed Nov. 21, 2013, 89 pages.
U.S. Appl. No. 14/086,808: Notice to File Missing Parts dated Dec. 11, 2013, 6 pages.
U.S. Appl. No. 14/086,808: Applicant Response to Pre-Exam Formalities Notice and Declaration and Preliminary Amendment filed Jun. 11, 2014, 71 pages.
U.S. Appl. No. 14/086,808: Filing Receipt Jun. 17, 2014, 4 pages.
U.S. Appl. No. 14/086,808: Notice of Publication dated Sep. 25, 2014, 1 page.
U.S. Appl. No. 14/086,808: Terminal Disclaimer filed Oct. 24, 2014, 6 page.
U.S. Appl. No. 14/086,808: Terminal Disclaimer Review Decision dated Oct. 29, 2014, 1 page.
U.S. Appl. No. 14/086,808: Terminal Disclaimer and Power of Attorney filed Nov. 4, 2014, 6 pages.
U.S. Appl. No. 14/086,808: Terminal Disclaimer Review Decision dated Nov. 13, 2014, 1 page.
U.S. Appl. No. 14/086,808: Notice of Allowance and Fees Due dated Nov. 17, 2014, 68 pages.
U.S. Appl. No. 14/086,808: Amendment After Notice of Allowance and Issue Fee Payment dated Feb. 17, 2015, 25 pages.
U.S. Appl. No. 14/086,808: Response to Amendment under Rule 312 and Miscellaneous Communication to Applicant dated Feb. 20, 2015, 2 pages.
U.S. Appl. No. 14/086,808: Amendment After Final, Initialed by Examiner and Response to Amendment Under Rule 312 dated Feb. 25, 2015, 10 pages.
U.S. Appl. No. 14/086,808: Issue Notification dated Mar. 18, 2015, 1 page.
U.S. Appl. No. 14/625,473: Application, Declaration and Power of Attorney filed Feb. 18, 2015, 97 pages.
U.S. Appl. No. 14/625,473: Notice to File Missing Parts dated Mar. 18, 2015, 6 pages.
U.S. Appl. No. 14/625,473: Applicant Response to Pre-Exam Formalities Notice and Applicant Arguments/ Remarks Made in an Amendment filed May 18, 2015, 33 pages.
U.S. Appl. No. 14/625,473: Filing Receipt May 20, 2015, 4 pages.
U.S. Appl. No. 14/625,473: Notice of Publication dated Aug. 27, 2015, 1 page.
U.S. Appl. No. 14/625,473: Terminal Disclaimer filed Nov. 13, 2015, 7 pages.
U.S. Appl. No. 14/625,473: Notice of Allowance and Fees Due and List of References Cited by Applicant and Considered By Examiner dated Mar. 28, 2016, 91 pages.
U.S. Appl. No. 14/625,473: Amendment After Notice of Allowance and Issue Fee Paid filed Jun. 28, 2016, 28 pages.
U.S. Appl. No. 14/625,473: Response to Amendment Under Rule 312 dated Jun. 30, 2016, 1 page.
U.S. Appl. No. 14/625,473: Response to Amendment Under Rule 312 dated Jul. 6, 2016, 3 pages.
U.S. Appl. No. 14/625,473: Issue Notification dated Jul. 20, 2016, 1 page.
U.S. Appl. No. 15/214,168: Application, Declaration and Preliminary Amendment filed Jul. 19, 2016, 124 pages.
U.S. Appl. No. 15/214,168: Filing Receipt and Response Re: Informal Power of Attorney Aug. 3, 2016, 6 pages.
U.S. Appl. No. 15/214,168: Request for Corrected Filing Receipt and Power of Attorney filed Oct. 7, 2016, 14 pages.
U.S. Appl. No. 15/214,168: Filing Receipt Oct. 12, 2016, 5 pages.
U.S. Appl. No. 15/214,168: Notice of Publication dated Nov. 10, 2016, 1 page.
U.S. Appl. No. 15/214,168: Non-Final Rejection dated Mar. 2, 2017, 38 pages.
U.S. Appl. No. 15/214,168: Amendment / Request for Reconsideration After Non-Final Rejection filed Jun. 2, 2017, 42 pages.
U.S. Appl. No. 15/214,168: Terminal Disclaimer filed Jul. 17, 2017, 8 pages.
U.S. Appl. No. 15/214,168: Notice of Allowance and Fees Due dated Aug. 1, 2017, 124 pages.
U.S. Appl. No. 15/214,168: Amendment After Notice of Allowance and Issue Fee Payment filed Nov. 1, 2017, 27 pages.
U.S. Appl. No. 15/214,168: Miscellaneous Communication to Applicant and Amendment After Final or Under 37CFR 1.312, Initialed by Examiner dated Nov. 6, 2017, 5 pages.
U.S. Appl. No. 15/214,168: Issue Notification dated Nov. 21, 2017, 1 page.
U.S. Appl. No. 16/710,577: US Reissue Patent Application and Preliminary Amendment filed Dec. 11, 2019, 88 pages.
U.S. Appl. No. 16/710,577: Filing Receipt dated Jan. 10, 2020, 4 pages.
U.S. Appl. No. 16/710,577: Non-final Office Action dated Mar. 19, 2021, 11 pages.
U.S. Appl. No. 15/802,348: Application, Preliminary Amendment and Declaration filed Nov. 2, 2017, 134 pages.
U.S. Appl. No. 15/802,348: Notice to File Corrected Application Papers dated Nov. 30, 2017, 7 pages.

(56) References Cited

OTHER PUBLICATIONS

U.S. Appl. No. 15/802,348: Applicant Response to Pre-Exam Formalities Notice filed Jan. 9, 2018, 19 pages.
U.S. Appl. No. 15/802,348: Filing Receipt Jan. 11, 2018, 5 pages.
U.S. Appl. No. 15/802,348: Notice of Publication dated Apr. 19, 2018, 1 page.
U.S. Appl. No. 15/802,348: Preliminary Amendment filed Oct. 26, 2018, 27 pages.
U.S. Appl. No. 15/802,348: Non-Final Rejection dated Feb. 11, 2019, 174 pages.
U.S. Appl. No. 15/802,348: Amendment / Request for Reconsideration After Non-Final Rejection filed May 13, 2019, 25 pages.
U.S. Appl. No. 15/802,348: Final Office Action dated Jul. 9, 2019, 24 pages.
U.S. Appl. No. 15/802,348: Response to Final Office Action filed Aug. 20, 2019, 29 pages.
U.S. Appl. No. 15/802,348: Advisory Action dated Sep. 4, 2019, 3 pages.
U.S. Appl. No. 15/802,348: RCE and Amendment filed Sep. 16, 2019, 30 pages.
U.S. Appl. No. 15/802,348: Terminal Disclaimer filed Mar. 18, 2020, 9 pages.
U.S. Appl. No. 15/802,348: Notice of Allowance and Fees Due dated Mar. 27, 2020, 178 pages.
U.S. Appl. No. 15/802,348: Issue Fee Payment filed Jun. 19, 2020, 9 pages.
U.S. Appl. No. 15/802,348: Issue Notification dated Jul. 8, 2020, 1 page.
U.S. Appl. No. 16/909,899, filed Jun. 23, 2020, 98 pages.
U.S. Appl. No. 16/909,899: Filing Receipt and Notice to File Missing Parts dated Jul. 6, 2020, 8 pages.
U.S. Appl. No. 16/909,899: Preliminary Amendment and Response to Missing Parts filed Sep. 8, 2020, 31 pages.
U.S. Appl. No. 16/909,899: Updated Filing Receipt Sep. 10, 2020, 6 pages.
U.S. Appl. No. 16/909,899: Notice of Publication dated Dec. 17, 2020, 6 pages.
U.S. Appl. No. 11/006,446: New Application filed Dec. 6, 2004, 91 pages.
U.S. Appl. No. 11/006,446: Pre-Exam Formalities Notice dated Jan. 24, 2005, 3 pages.
U.S. Appl. No. 11/006,446: Preliminary Amendment filed May 2, 2005, 118 pages.
U.S. Appl. No. 11/006,446: Requirement for Restriction / Election dated Apr. 4, 2007, 5 pages.
U.S. Appl. No. 11/006,446: Response to Election / Restriction filed May 3, 2007, 6 pages.
U.S. Appl. No. 11/006,446: Non-Final Rejection dated Jul. 26, 2007, 34 pages.
U.S. Appl. No. 11/006,446: Amendment, Request for Reconsideration After Non-Final Rejection filed Nov. 26, 2007, 37 pages.
U.S. Appl. No. 11/006,446: Examiner's Search Strategies and Results dated Feb. 7, 2008, 1 page.
U.S. Appl. No. 11/006,446: Non-Final Rejection dated Feb. 20, 2008, 58 pages.
U.S. Appl. No. 11/006,446: Amendment / Request for Reconsideration After Non-Final Rejection dated Jul. 21, 2008, 33 pages.
U.S. Appl. No. 11/006,446: Final Rejection dated Oct. 28, 2008, 49 pages.
U.S. Appl. No. 11/006,446: Amendment Submitted / Entered with Filing of CPA/RCE filed Dec. 29, 2008, 33 pages.
U.S. Appl. No. 11/006,446: Advisory Action dated Jan. 7, 2009, 4 pages.
U.S. Appl. No. 11/006,446: Request for Continued Examination dated Apr. 28, 2009, 38 pages.
U.S. Appl. No. 11/006,446: Non-Final Rejection dated Jul. 7, 2009, 41 pages.
U.S. Appl. No. 11/006,446: Examiner Interview Summary Record and Examiner's Search Strategy and Results dated Oct. 26, 2009, 6 pages.
U.S. Appl. No. 11/006,446: Amendment / Request for Reconsideration After Non-Final Rejection dated Dec. 7, 2009, 33 pages.
U.S. Appl. No. 11/006,446: Notice of Allowance and Fees Due dated Mar. 19, 2010, 135 pages.
U.S. Appl. No. 11/006,446: Amendment After Notice of Allowance and Issue Fee Payment filed Jun. 21, 2010, 25 pages.
U.S. Appl. No. 11/006,446: Response to Amendment After Rule 312 dated Aug. 19, 2010, 3 pages.
U.S. Appl. No. 11/006,446: Drawings filed Aug. 25, 2010, 31 pages.
U.S. Appl. No. 11/006,446: Issue Notification dated Sep. 1, 2010, 1 page.
U.S. Appl. No. 12/830,236: Application, Declaration and Preliminary Amendment filed Jul. 2, 2010, 106 pages.
U.S. Appl. No. 12/830,236: Fee Worksheet filed Jul. 15, 2010, 1 page.
U.S. Appl. No. 12/830,236: Notice to File Corrected Application Papers dated Jul. 16, 2010, 5 pages.
U.S. Appl. No. 12/830,236: Applicant Response to Pre-Exam Formalities Notice filed Aug. 25, 2010, 34 pages.
U.S. Appl. No. 12/830,236: Filing Receipt Sep. 3, 2010, 3 pages.
U.S. Appl. No. 12/830,236: Notice of Publication dated Dec. 16, 2010, 1 page.
U.S. Appl. No. 12/830,236: Requirement for Restriction / Election dated Mar. 18, 2011, 6 pages.
U.S. Appl. No. 12/830,236: Response to Election / Restriction filed Apr. 18, 2011, 8 pages.
U.S. Appl. No. 12/830,236: Non-Final Rejection dated May 11, 2011, 29 pages.
U.S. Appl. No. 12/830,236: Amendment / Request for Reconsideration After Non-Final Rejection filed Jul. 6, 2011, 20 pages.
U.S. Appl. No. 12/830,236: Final Rejection dated Oct. 14, 2011, 54 pages.
U.S. Appl. No. 12/830,236: Response After Final Action filed Jan. 17, 2012, 26 pages.
U.S. Appl. No. 12/830,236: Advisory Action dated Feb. 8, 2012, 6 pages.
U.S. Appl. No. 12/830,236: Notice of Appeal filed Mar. 8, 2012, 6 pages.
U.S. Appl. No. 12/830,236: Request for Continued Examination filed Jun. 5, 2012, 24 pages.
U.S. Appl. No. 12/830,236: Non-Final Rejection dated Jul. 31, 2012, 28 pages.
U.S. Appl. No. 12/830,236: Amendment / Request for Reconsideration After Non-Final Rejection filed Nov. 1, 2012, 28 pages.
U.S. Appl. No. 12/830,236: Final Rejection dated Feb. 27, 2013, 42 pages.
U.S. Appl. No. 12/830,236: Response After Final Action dated Jun. 27, 2013, 42 pages.
U.S. Appl. No. 12/830,236: Advisory Action and Amendment After Final dated Jul. 12, 2013, 4 pages.
U.S. Appl. No. 12/830,236: Notice of Appeal Filed Jul. 19, 2013, 6 pages.
U.S. Appl. No. 12/830,236: Appeal Brief filed Sep. 18, 2013, 44 pages.
U.S. Appl. No. 12/830,236: Examiner's Answer to Appeal Brief dated Dec. 18, 2013, 35 pages.
U.S. Appl. No. 12/830,236: Reply Brief filed Feb. 18, 2014, 18 pages.
U.S. Appl. No. 12/830,236: Appeal Docketing Notice filed Mar. 21, 2014, 2 pages.
U.S. Appl. No. 12/830,236: Patent Board Decision—Examiner Affirmed dated Mar. 9, 2016, 6 pages.
U.S. Appl. No. 12/830,236: Request for Continued Examination filed Apr. 27, 2016, 20 pages.
U.S. Appl. No. 12/830,236: Non-Final Rejection dated Jun. 29, 2016, 113 pages.
U.S. Appl. No. 12/830,236: Applicant Initiated Review Summary dated Aug. 30, 2016, 6 pages.
U.S. Appl. No. 12/830,236: Amendment / Request for Reconsideration After Non-Final Rejection filed Sep. 6, 2016, 15 pages.
U.S. Appl. No. 12/830,236: Applicant Initiated Interview Summary dated Sep. 9, 2016, 5 pages.

(56) References Cited

OTHER PUBLICATIONS

U.S. Appl. No. 12/830,236: Final Rejection dated Dec. 14, 2016, 98 pages.
U.S. Appl. No. 12/830,236: Response After Final Action filed Feb. 13, 2017, 17 pages.
U.S. Appl. No. 12/830,236: Amendment After Final Action or under 37CFR 1.312 dated Mar. 3, 2017, 3 pages.
U.S. Appl. No. 12/830,236: Request for Continued Examination filed Apr. 4, 2017, 23 pages.
U.S. Appl. No. 12/830,236: Non-Final Rejection dated Jun. 21, 2017, 90 pages.
U.S. Appl. No. 12/830,236: Applicant Initiated Review Summary dated Oct. 5, 2017, 9 pages.
U.S. Appl. No. 12/830,236: Amendment / Request for Reconsideration After Non-Final Rejection filed Oct. 23, 2017, 23 pages.
U.S. Appl. No. 12/830,236: Non-Final Rejection dated Feb. 6, 2018, 91 pages.
U.S. Appl. No. 12/830,236: Amendment / Request for Reconsideration After Non-Final Rejection filed May 4, 2018, 29 pages.
U.S. Appl. No. 12/830,236: Final Rejection dated Sep. 5, 2018, 65 pages.
U.S. Appl. No. 12/830,236: After Final Consideration Program Request filed Nov. 5, 2018, 27 pages.
U.S. Appl. No. 12/830,236: Advisory Action dated Nov. 19, 2018, 7 pages.
U.S. Appl. No. 12/830,236: Request for Continued Examination filed Dec. 31, 2018, 30 pages.
U.S. Appl. No. 12/830,236: Notice of Allowance and Fees Due dated Apr. 2, 2019, 53 pages.
U.S. Appl. No. 12/830,236: Supplemental Notice of Allowability dated May 21, 2019, 24 pages.
U.S. Appl. No. 12/830,236: Issue Fee Payment dated Jul. 1, 2019, 3 pages.
U.S. Appl. No. 12/830,236: Supplemental Allowability dated Jul. 9, 2019, 8 pages.
U.S. Appl. No. 12/830,236: Issue Notification dated Jul. 24, 2019, 1 page.
U.S. Appl. No. 16/459,930: U.S. Appl. No. 16/459,930, filed Jul. 2, 2019, 99 pages.
U.S. Appl. No. 16/459,930: Filing Receipt and Notice to File Missing Parts and Filing Receipt dated Jul. 18, 2019, 7 pages.
U.S. Appl. No. 16/459,930: Response to Notice to File Missing Parts and Preliminary Amendment dated Sep. 4, 2019, 19 pages.
U.S. Appl. No. 16/459,930: Updated Filing Receipt Sep. 6, 2019, 4 pages.
U.S. Appl. No. 16/459,930: Notice of Publication dated Dec. 12, 2019, 1 page.
U.S. Appl. No. 16/459,930: Non-Final Rejection dated Oct. 6, 2020, 43 pages.
U.S. Appl. No. 16/459,930: Response to Non-Final Rejection filed Mar. 8, 2021, 19 pages.
U.S. Appl. No. 16/459,930: Non-final Office Action dated Jun. 9, 2021, 17 pages.
U.S. Appl. No. 11/385,257: New Application Filed Mar. 20, 2006, 118 pages.
U.S. Appl. No. 11/385,257: Pre-Exam Formalities Notice dated May 3, 2006, 2 pages.
U.S. Appl. No. 11/385,257: Applicant Response to Pre-Exam Formalities Notice filed Aug. 3, 2006, 46 pages.
U.S. Appl. No. 11/385,257: Notice of Publication dated Nov. 30, 2006, 1 page.
U.S. Appl. No. 11/385,257: Non-Final Rejection dated Apr. 29, 2008, 44 pages.
U.S. Appl. No. 11/385,257: Transmittal Letter dated May 23, 2008, 2 pages.
U.S. Appl. No. 11/385,257: Amendment / Request for Reconsideration After Non-Final Rejection filed Jul. 29, 2008, 29 pages.
U.S. Appl. No. 11/385,257: Final Rejection dated Dec. 9, 2008, 47 pages.
U.S. Appl. No. 11/385,257: Request for Continued Examination filed May 11, 2009, 36 pages.
U.S. Appl. No. 11/385,257: Supplemental Response or Supplemental Amendment filed May 26, 2009, 3 pages.
U.S. Appl. No. 11/385,257: Notice to the Applicant Regarding a Non-Compliant or Non-Responsive Amendment dated Jun. 1, 2009, 3 pages.
U.S. Appl. No. 11/385,257: Amendment / Request for Reconsideration After Non-Final Rejection filed Jun. 30, 2009, 34 pages.
U.S. Appl. No. 11/385,257: Non-Final Rejection dated Sep. 14, 2009, 47 pgs.
U.S. Appl. No. 11/385,257: Amendment / Request After Non-Final Rejection filed Jan. 13, 2010, 37 pages.
U.S. Appl. No. 11/385,257: Final Rejection dated Apr. 12, 2010, 55 pages.
U.S. Appl. No. 11/385,257: Request for Continued Examination filed Aug. 12, 2010, 40 pages.
U.S. Appl. No. 11/385,257: Non-Final Rejection dated Sep. 30, 2010, 56 pages.
U.S. Appl. No. 11/385,257: Amendment / Request for Reconsideration After Non-Final Rejection filed Mar. 29, 2011, 36 pages.
U.S. Appl. No. 11/385,257: Final Rejection dated Jun. 1, 2011, 47 pages.
U.S. Appl. No. 11/385,257: Request for Continued Examination dated Nov. 1, 2011, 37 pages.
U.S. Appl. No. 11/385,257: Non-Final Rejection dated Jan. 9, 2012, 53 pages.
U.S. Appl. No. 11/385,257: Amendment / Request for Reconsideration After Non-Final Rejection filed Apr. 6, 2012, 30 pages.
U.S. Appl. No. 11/385,257: Notice of Allowance and Fees Due dated Jun. 22, 2012, 45 pages.
U.S. Appl. No. 11/385,257: Notice of Allowance and Fees Due dated Oct. 4, 2012, 4 pages.
U.S. Appl. No. 11/385,257: Amendment After Notice of Allowance filed Dec. 12, 2012, 8 pages.
U.S. Appl. No. 11/385,257: Issue Notification dated Dec. 22, 2012, 1 page.
U.S. Appl. No. 13/625,812, filed Sep. 24, 2012, 123 pages.
U.S. Appl. No. 13/625,812: Notice to File Missing Parts and Filing Receipt dated Oct. 15, 2012, 6 pages.
U.S. Appl. No. 13/625,812: Preliminary Amendment dated Mar. 8, 2013, 50 pages.
U.S. Appl. No. 13/625,812: Notice of Incomplete Reply dated Mar. 15, 2013, 3 pages.
U.S. Appl. No. 13/625,812: Applicant Response to Pre-Exam Formalities Notice filed Apr. 2, 2013, 5 pages.
U.S. Appl. No. 13/625,812: Notice of Incomplete Reply dated Apr. 10, 2013, 3 pages.
U.S. Appl. No. 13/625,812: Filing Receipt and Miscellaneous Communication to Applicant dated Apr. 22, 2013, 5 pages.
U.S. Appl. No. 13/625,812: General Transmittal of Replacement Application Data Sheet filed May 10, 2013, 8 pages.
U.S. Appl. No. 13/625,812: Non-Final Rejection dated Jul. 26, 2013, 64 pages.
U.S. Appl. No. 13/625,812: Notice of Publication dated Aug. 1, 2013, 1 page.
U.S. Appl. No. 13/625,812: Amendment / Request for Reconsideration After Non-Final Rejection filed Oct. 9, 2013, 18 pages.
U.S. Appl. No. 13/625,812: Final Rejection dated Dec. 3, 2013, 35 pages.
U.S. Appl. No. 13/625,812: Response After Final Action filed Apr. 1, 2014, 25 pages.
U.S. Appl. No. 13/625,812: Advisory Action dated Apr. 9, 2014, 3 pages.
U.S. Appl. No. 13/625,812: Notice of Appeal filed May 5, 2014, 6 pages.
U.S. Appl. No. 13/625,812: Request for Continued Examination filed Aug. 4, 2014, 25 pages.
U.S. Appl. No. 13/625,812: Request for Corrected Filing Receipt filed Aug. 21, 2014, 9 pages.
U.S. Appl. No. 13/625,812: Filing Receipt Aug. 27, 2014, 3 pages.
U.S. Appl. No. 13/625,812: Notice of Allowance and Fees Due dated Dec. 9, 2014, 36 pages.

(56) References Cited

OTHER PUBLICATIONS

U.S. Appl. No. 13/625,812: Filing Receipt Feb. 2, 2015, 3 pages.
U.S. Appl. No. 13/625,812: Filing Receipt Feb. 6, 2015, 3 pages.
U.S. Appl. No. 13/625,812: Terminal Disclaimer filed Mar. 2, 2015, 5 pages.
U.S. Appl. No. 13/625,812: Post-Allowance Communication—Incoming filed Mar. 6, 2015, 8 pages.
U.S. Appl. No. 13/625,812: Issue Fee Payment and Amendment After Notice of Allowance filed Mar. 9, 2015, 8 pages.
U.S. Appl. No. 13/625,812: Terminal Disclaimer Review Decision dated Mar. 12, 2015, 1 page.
U.S. Appl. No. 13/625,812: Issue Notification dated Apr. 8, 2015, 1 page.
U.S. Appl. No. 13/625,812: Terminal Disclaimer filed Apr. 14, 2015, 14 pages.
U.S. Appl. No. 13/625,812: Terminal Disclaimer Review Apr. 17, 2015, 1 page.
U.S. Appl. No. 14/641,735: Application, Declaration and Power of Attorney filed Mar. 9, 2015, 128 pages.
U.S. Appl. No. 14/641,735: Notice to File Missing Parts dated Mar. 20, 2015, 6 pages.
U.S. Appl. No. 14/641,735: Preliminary Amendment filed Jun. 22, 2015, 41 pages.
U.S. Appl. No. 14/641,735: Notice of Incomplete Reply dated Jun. 26, 2015, 3 pages.
U.S. Appl. No. 14/641,735: Applicant Response to Pre-Exam Formalities Notice filed Jul. 8, 2015, 36 pages.
U.S. Appl. No. 14/641,735: Filing Receipt Jul. 22, 2015, 4 pages.
U.S. Appl. No. 14/641,735: Terminal Disclaimer filed 8/27/25, 7 pages.
U.S. Appl. No. 14/641,735: Notice of Publication dated Oct. 29, 2015, 1 page.
Jan. 14, 2016 U.S. Appl. No. 14/641,735: Preliminary Amendment filed Jan. 14, 2016, 11 pages.
U.S. Appl. No. 14/641,735: Non-Final Rejection dated Jul. 14, 2017, 103 pages.
U.S. Appl. No. 14/641,735: Letter Restarting Period for Response and Examiner's Search Strategy and Results dated Aug. 24, 2017, 34 pages.
U.S. Appl. No. 14/641,735: Amendment / Request for Reconsideration After Non-Final Rejection filed Nov. 24, 2017, 30 pages.
U.S. Appl. No. 14/641,735: Final Rejection dated Mar. 15, 2018, 30 pages.
U.S. Appl. No. 14/641,735: Response After Final Action filed May 15, 2018, 31 pages.
U.S. Appl. No. 14/641,735: Advisory Action dated Jun. 8, 2018, 5 pages.
U.S. Appl. No. 14/641,735: Applicant Initiated Review Summary dated Jul. 10, 2018, 5 pages.
U.S. Appl. No. 14/641,735: Request for Continued Examination filed Jul. 16, 2018, 39 pages.
U.S. Appl. No. 14/641,735: Preliminary Amendment filed Oct. 26, 2018, 13 pages.
U.S. Appl. No. 14/641,735: Non-Final Rejection dated Nov. 2, 2018, 46 pages.
U.S. Appl. No. 14/641,735: Amendment / Request for Reconsideration After Non-Final Rejection filed Feb. 4, 2019, 30 pages.
U.S. Appl. No. 14/641,735: Notice of Allowance and Fees Due dated Apr. 15, 2019, 37 pages.
U.S. Appl. No. 14/641,735: Issue Fee Payment and Response under 37 CFR § 1.312 dated Jul. 12, 2019, 8 pages.
U.S. Appl. No. 14/641,735: Notice of Allowance and Fees Due dated Jul. 26, 2019, 7 pages.
U.S. Appl. No. 14/641,735: Supplemental Notice of Allowability dated Jul. 26, 2019, 7 pages.
U.S. Appl. No. 14/641,735: Issue Notification dated Aug. 7, 2019, 1 page.
U.S. Appl. No. 16/513,021: U.S. Appl. No. 16/513,021, filed Jul. 16, 2019, 130 pages.
U.S. Appl. No. 16/513,021: Filing Receipt and Notice to File Missing Parts dated Jul. 30, 2019, 7 pages.
U.S. Appl. No. 16/513,021: Response to Notice to File Missing Parts and Preliminary Amendment dated Sep. 11, 2019, 45 pages.
U.S. Appl. No. 16/513,021: Updated Filing Receipt dated Sep. 12, 2019, 4 pages.
U.S. Appl. No. 16/513,021: Notice of Publication dated Dec. 19, 2019, 1 page.
U.S. Appl. No. 16/513,021: Non-final Office Action dated May 5, 2021, 36 pages.
U.S. Appl. No. 11/319,758: Transmittal of New Application filed Dec. 27, 2005, 79 pages.
U.S. Appl. No. 11/319,758: Pre-Exam Formalities Notice dated Feb. 1, 2006, 2 pages.
U.S. Appl. No. 11/319,758: Applicant Response to Pre-Exam Formalities Notice filed Jul. 3, 2006, 15 pages.
U.S. Appl. No. 11/319,758: Non-Final Rejection dated Nov. 12, 2008, 46 pages.
U.S. Appl. No. 11/319,758: Amendment / Request for Reconsideration After Non-Final Rejection dated May 12, 2009, 40 pages.
U.S. Appl. No. 11/319,758: Final Rejection dated Aug. 3, 2009, 39 pages.
U.S. Appl. No. 11/319,758: Non-Final Rejection dated Mar. 30, 2010, 58 pages.
U.S. Appl. No. 11/319,758: Final Rejection dated Oct. 28, 2010, 58 pages.
U.S. Appl. No. 11/319,758: Request for Continued Examination filed Mar. 28, 2011, 37 pages.
U.S. Appl. No. 11/319,758: Non-Final Rejection dated Jun. 3, 2011, 57 pages.
U.S. Appl. No. 11/319,758: Amendment / Request for Reconsideration After Non-Final Rejection filed Nov. 3, 2011, 35 pages.
U.S. Appl. No. 11/319,758: Final Rejection dated Jan. 17, 2012, 41 pages.
U.S. Appl. No. 11/319,758: Response After Final Action dated May 17, 2012, 35 pages.
U.S. Appl. No. 11/319,758: Advisory Action dated Jun. 20, 2012, 3 pages.
U.S. Appl. No. 11/319,758: Response After Final Action filed Jun. 28, 2012, 30 pages.
U.S. Appl. No. 11/319,758: Notice of Allowance and Fees Due dated Jul. 17, 2012, 48 pages.
U.S. Appl. No. 11/319,758: Amendment After Notice of Allowance and Issue Fee Payment filed Oct. 12, 2012, 12 pages.
U.S. Appl. No. 11/319,758: Issue Notification dated Oct. 31, 2012, 4 pages.
U.S. Appl. No. 13/632,581: Preliminary Amendment and Application filed Oct. 1, 2012, 90 pages.
U.S. Appl. No. 13/632,581: Notice to File Missing Parts and Filing Receipt dated Oct. 2, 2012, 6 pages.
U.S. Appl. No. 13/632,581: Applicant Response to Pre-Exam Formalities Notice filed Feb. 22, 2013, 26 pages.
U.S. Appl. No. 13/632,581: Filing Receipt Mar. 5, 2013, 4 pages.
U.S. Appl. No. 13/632,581: Notice of Publication dated Jun. 13, 2013, 1 page.
U.S. Appl. No. 13/632,581: Non-Final Rejection dated Jul. 3, 2013, 43 pages.
U.S. Appl. No. 13/632,581: Amendment / Request for Reconsideration After Non-Final Rejection filed Sep. 11, 2013, 48 pages.
U.S. Appl. No. 13/632,581: Final Rejection dated Dec. 18, 2013, 47 pages.
U.S. Appl. No. 13/632,581: Response After Final Action filed Mar. 18, 2014, 40 pages.
U.S. Appl. No. 13/632,581: Advisory Action dated Apr. 3, 2014, 15 pages.
U.S. Appl. No. 13/632,581: Notice of Appeal filed Apr. 17, 2014, 6 pages.
U.S. Appl. No. 13/632,581: Request for Continued Examination filed Jul. 16, 2014, 28 pages.
U.S. Appl. No. 13/632,581: Notice of Informal or Non-Responsive CPA Amendment dated Oct. 20, 2014, 5 pages.
U.S. Appl. No. 13/632,581: Amendment / Request for Reconsideration After Non-Final Rejection filed Nov. 4, 2014, 19 pages.

(56) References Cited

OTHER PUBLICATIONS

U.S. Appl. No. 13/632,581: Non-Final Rejection dated Jan. 27, 2015, 81 pages.
U.S. Appl. No. 13/632,581: Amendment / Request for Reconsideration After Non-Final Rejection filed Apr. 20, 2015, 27 pages.
U.S. Appl. No. 13/632,581: Final Rejection dated Jul. 20, 2015, 47 pages.
U.S. Appl. No. 13/632,581: After Final Consideration Program Request filed Sep. 21, 2015, 31 pages.
U.S. Appl. No. 13/632,581: Advisory Action and After Final Consideration Program Decision dated Oct. 2, 2015, 18 pages.
U.S. Appl. No. 13/632,581: Request for Continued Examination filed Nov. 30, 2015, 60 pages.
U.S. Appl. No. 13/632,581: Notice of Allowance and Fees Due dated Dec. 17, 2015, 89 pages.
U.S. Appl. No. 13/632,581: Filing Receipt Jan. 22, 2016, 4 pages.
U.S. Appl. No. 13/632,581: Terminal Disclaimer filed Mar. 7, 2016, 8 pages.
U.S. Appl. No. 13/632,581: Issue Fee Payment and Amendment After Notice of Allowance filed Mar. 6, 2016, 24 pages.
U.S. Appl. No. 13/632,581: Response to Amendment Under Rule 312 dated Mar. 22, 2016, 18 pages.
U.S. Appl. No. 13/632,581: Issue Notification dated Apr. 13, 2016, 1 page.
U.S. Appl. No. 15/081,612: Application, Declaration, and Power of Attorney filed Mar. 25, 2016, 91 pages.
U.S. Appl. No. 15/081,612: Notice to File Missing Parts dated Apr. 11, 2016, 8 pages.
U.S. Appl. No. 15/081,612: Preliminary Amendment filed Jun. 13, 2016, 38 pages.
U.S. Appl. No. 15/081,612: Preliminary Amendment filed Jun. 14, 2016, 6 pages.
U.S. Appl. No. 15/081,612: Filing Receipt Jun. 21, 2016, 4 pages.
U.S. Appl. No. 15/081,612: Non-Final Rejection dated Jul. 27, 2016, 91 pages.
U.S. Appl. No. 15/081,612: Terminal Disclaimer Sep. 23, 2016, 7 pages.
U.S. Appl. No. 15/081,612: Notice of Publication dated Sep. 29, 2016, 1 page.
U.S. Appl. No. 15/081,612: Notice of Allowance and Fees Due dated Oct. 17, 2016, 38 pages.
U.S. Appl. No. 15/081,612: Notice of Allowance and Fees Due dated Jan. 4, 2017, 4 pages.
U.S. Appl. No. 15/081,612: Request for Continued Examination, Amendment After Notice of Allowance and Issue Fee Payment filed Jan. 30, 2017, 11 pages.
U.S. Appl. No. 15/081,612: Notice of Allowance and Fees Due dated Jan. 30, 2017, 3 pages.
U.S. Appl. No. 15/081,612: Notice of Allowance and Fees Due dated Feb. 13, 2017, 51 pages.
U.S. Appl. No. 15/081,612: Amendment After Notice of Allowance and Issue Fee Payment Filed Mar. 20, 2017, 8 pages.
U.S. Appl. No. 15/081,612: Issue Notification dated Apr. 20, 2017, 1 page.
U.S. Appl. No. 15/464,205: Application, Power of Attorney and Declarations filed 3/202/017, 122 pages.
U.S. Appl. No. 15/464,205: Notice to File Missing Parts dated Mar. 28, 2017, 10 pages.
U.S. Appl. No. 15/464,205: Applicant Response to Pre-Exam Formalities Notice dated May 31, 2017, 99 pages.
U.S. Appl. No. 15/464,205: Filing Receipt Jun. 2, 2017, 5 pages.
U.S. Appl. No. 15/464,205: Notice of Publication dated Sep. 7, 2017, 1 page.
U.S. Appl. No. 15/464,205: Preliminary Amendment filed Feb. 22, 2019, 14 pages.
U.S. Appl. No. 15/464,205: Non-final Office Action dated Jul. 25, 2019, 64 pages.
U.S. Appl. No. 15/464,205: Response to Non-Final Rejection filed Oct. 22, 2019, 21 pages.
U.S. Appl. No. 15/464,205: Terminal Disclaimer filed Oct. 22, 2019, 5 pages.
U.S. Appl. No. 15/464,205: Final Office Action dated Nov. 14, 2019, 11 pages.
U.S. Appl. No. 15/464,205: Response to Final Office Action dated Feb. 12, 2020, 11 pages.
U.S. Appl. No. 15/464,205: Advisory Action dated Feb. 25, 2020, 5 pages.
U.S. Appl. No. 15/464,205: Request for Continued Examination and Amendment filed Mar. 5, 2020, 20 pages.
U.S. Appl. No. 15/464,205: Non-Final Rejection dated Mar. 27, 2020, 52 pages.
U.S. Appl. No. 15/464,205: Final Rejection dated Sep. 3, 2020, 100 pages.
U.S. Appl. No. 15/464,205: Interview Summary dated Oct. 26, 2020, 8 pages.
U.S. Appl. No. 15/464,205: Response to Final Rejection filed Nov. 3, 2020, 21 pages.
U.S. Appl. No. 15/464,205: Advisory Action dated Nov. 16, 2020, 10 pages.
U.S. Appl. No. 15/464,205: Request for Continued Examination filed Nov. 20, 2020, 24 pages.
U.S. Appl. No. 15/464,205: Notice of Allowance/Allowability filed May 26, 2020, 20 pages.
U.S. Appl. No. 11/006,842: Transmittal of New Application filed Dec. 7, 2004, 86 pages.
U.S. Appl. No. 11/006,842: Pre-Exam Formalities Notice dated Jan. 10, 2005, 2 pages.
U.S. Appl. No. 11/006,842: Applicant Response to Pre-Exam Formalities Notice filed Apr. 1, 2005, 9 pages.
U.S. Appl. No. 11/006,842: Preliminary Amendment filed May 2, 2005, 94 pages.
U.S. Appl. No. 11/006,842: Requirement for Restriction / Election dated Jan. 23, 2008, 5 pages.
U.S. Appl. No. 11/006,842: Response to Election / Restriction filed Feb. 25, 2008, 28 pages.
U.S. Appl. No. 11/006,842: Requirement for Restriction / Election dated May 13, 2008, 5 pages.
U.S. Appl. No. 11/006,842: Miscellaneous Communication to Applicant dated May 15, 2008, 4 pages.
U.S. Appl. No. 11/006,842: Amendment / Request for Reconsideration After Non-Final Rejection filed Aug. 13, 2008, 29 pages.
U.S. Appl. No. 11/006,842: Non-Final Rejection dated Nov. 3, 2008, 28 pages.
U.S. Appl. No. 11/006,842: Amendment / Request for Reconsideration After Non-Final Rejection filed May 4, 2009, 40 pages.
U.S. Appl. No. 11/006,842: Supplemental Response or Supplemental Amendment filed Jul. 17, 2009, 25 pages.
U.S. Appl. No. 11/006,842: Notice of Allowance and Fees Due dated Jul. 27, 2009, 37 pages.
U.S. Appl. No. 11/006,842: Amendment After Notice of Allowance and Issue Fee Payment filed Oct. 27, 2009, 4 pages.
U.S. Appl. No. 11/006,842: Miscellaneous Communication to Applicant and Bibliographic Data Sheet dated Nov. 3, 2009, 2 pages.
U.S. Appl. No. 11/006,842: Issue Notification dated Nov. 18, 2009, 1 page.
U.S. Appl. No. 11/006,842: Request for Certificate of Correction filed Jun. 1, 2015, 5 pages.
U.S. Appl. No. 11/006,842: Certificate of Correction dated Sep. 15, 2015, 1 page.
U.S. Appl. No. 12/613,450: Application, Declaration and Power of Attorney filed Nov. 5, 2009, 63 pages.
U.S. Appl. No. 12/613,450: Notice to File Missing Parts dated Nov. 18, 2009, 6 pages.
U.S. Appl. No. 12/613,450: Applicant Response to Pre-Exam Formalities Notice and Preliminary Amendment filed Jan. 19, 2010, 19 pages.
U.S. Appl. No. 12/613,450: Filing Receipt Jan. 27, 2010, 3 pages.
U.S. Appl. No. 12/613,450: Notice of Publication dated May 6, 2010, 1 page.
U.S. Appl. No. 12/613,450: Requirement for Restriction / Election dated Jun. 10, 2011, 5 pages.

(56) References Cited

OTHER PUBLICATIONS

U.S. Appl. No. 12/613,450: Response to Election / Restriction filed Jul. 6, 2011, 20 pages.
U.S. Appl. No. 12/613,450: Non-Final Rejection dated Aug. 25, 2011, 20 pages.
U.S. Appl. No. 12/613,450: Amendment / Request for Reconsideration After Non-Final Rejection filed Dec. 27, 2011, 33 pages.
U.S. Appl. No. 12/613,450: Final Rejection dated Feb. 14, 2012, 18 pages.
U.S. Appl. No. 12/613,450: Response After Final Action filed Jun. 8, 2012, 24 pages.
U.S. Appl. No. 12/613,450: Advisory Action and Amendment After Final or Under 37CFR 1.312 dated Jun. 20, 2012, 4 pages.
U.S. Appl. No. 12/613,450: Request for Continued Examination filed Jul. 12, 2012, 26 pages.
U.S. Appl. No. 12/613,450: Notice of Allowance and Fees Due filed Oct. 7, 2013, 70 pages.
U.S. Appl. No. 12/613,450: Terminal Disclaimer filed Jan. 2, 2014, 7 pages.
U.S. Appl. No. 12/613,450: Miscellaneous Communication to Applicant dated Jan. 14, 2014, 6 pages.
U.S. Appl. No. 12/613,450: Issue Notification dated Jan. 22, 2014, 1 page.
U.S. Appl. No. 14/149,749, filed Jan. 7, 2014, 61 pages.
U.S. Appl. No. 14/149,749: Notice to File Missing Parts dated Jan. 23, 2014, 7 pages.
U.S. Appl. No. 14/149,749: Applicant Response to Pre-Exam Formalities Notice filed May 23, 2014, 18 pages.
U.S. Appl. No. 14/149,749: Notice of Incomplete Reply dated May 29, 2014, 3 pages.
U.S. Appl. No. 14/149,749: Applicant Response to Pre-Exam Formalities Notice filed Aug. 25, 2014, 108 pages.
U.S. Appl. No. 14/149,749: Filing Receipt Sep. 4, 2014, 4 pages.
U.S. Appl. No. 14/149,749: Notice of Publication dated Dec. 11, 2014, 1 page.
U.S. Appl. No. 14/149,749: Terminal Disclaimer filed Feb. 23, 2015, 5 pages.
U.S. Appl. No. 14/149,749: Terminal Disclaimer—Electronic-Approved dated Feb. 23, 2015, 1 page.
U.S. Appl. No. 14/149,749: Examiner Initiated Interview Summary dated Feb. 24, 2015, 2 pages.
U.S. Appl. No. 14/149,749: Notice of Allowance and Fees Due dated Apr. 17, 2015, 113 pages.
U.S. Appl. No. 14/149,749: e-Terminal Disclaimer filed and approved, and Issue Fee Payment filed May 27, 2015, 22 pages.
U.S. Appl. No. 14/149,749: Response to Amendment Under Rule 312 dated May 29, 2015, 1 page.
U.S. Appl. No. 14/149,749: Response to Amendment Under Rule 312 dated Jun. 1, 2015, 6 pages.
U.S. Appl. No. 14/149,749: Issue Notification dated Jun. 17, 2015, 1 page.
U.S. Appl. No. 14/149,749: Fee Worksheet dted Aug. 12, 2015, 1 page.
U.S. Appl. No. 14/726,192: Application, Declaration and Power of Attorney filed May 29, 2015, 65 pages.
U.S. Appl. No. 14/726,192: Notice to File Missing Parts dated Jun. 9, 2015, 6 pages.
U.S. Appl. No. 14/726,192: Preliminary Amendment filed Aug. 12, 2015, 119 pages.
U.S. Appl. No. 14/726,192: Filing Receipt Aug. 20, 2015, 4 pages.
U.S. Appl. No. 14/726,192: Terminal Disclaimer filed Nov. 20, 2015, 6 pages.
U.S. Appl. No. 14/726,192: Terminal Disclaimer—Electronic-Approved Nov. 20, 2015, 1 page.
U.S. Appl. No. 14/726,192: Notice of Publication dated Nov. 27, 2015, 1 page.
U.S. Appl. No. 14/726,192: Notice of Allowance and Fees Due dated May 2, 2016, 139 pages.
U.S. Appl. No. 14/726,192: Issue Fee Payment and Amendment After Notice of Allowance filed Jul. 18, 2016, 17 pages.
U.S. Appl. No. 14/726,192: Response to Amendment Under Rule 312 dated Jul. 21, 2016, 1 page.
U.S. Appl. No. 14/726,192: Response to Amendment Under Rule 312 and Amendment After Final filed Jul. 22, 2016, 3 pages.
U.S. Appl. No. 14/726,192: Issue Notification dated Aug. 3, 2016, 1 page.
U.S. Appl. No. 15/240,964: Preliminary Amendment, Declaration and Power of Attorney filed Aug. 31, 2016, 80 pages.
U.S. Appl. No. 15/240,964: Filing Receipt and Response Re: Informal Power of Attorney dated Aug. 31, 2016, 5 pages.
U.S. Appl. No. 15/240,964: Notice of Publication dated Dec. 8, 2016, 1 page.
U.S. Appl. No. 15/240,964: Non-Final Rejection dated Mar. 14, 2017, 58 pages.
U.S. Appl. No. 15/240,964: Amendment / Request for Reconsideration After Non-Final Rejection filed Jun. 14, 2017, 30 pages.
U.S. Appl. No. 15/240,964: Final Rejection dated Aug. 9, 2017, 185 pages.
U.S. Appl. No. 15/240,964: Response After Final Action filed Oct. 10, 2017, 33 pages.
U.S. Appl. No. 15/240,964: Advisory Action dated Oct. 30, 2017, 3 pages.
U.S. Appl. No. 15/240,964: Request for Continued Examination filed Nov. 9, 2017, 36 pages.
U.S. Appl. No. 15/240,964: Non-Final Rejection dated Jul. 30, 2018, 267 pages.
U.S. Appl. No. 15/240,964: Response to Non-Final Rejection filed Oct. 30, 2018, 45 pages.
U.S. Appl. No. 15/240,964: e-Terminal Disclaimer Filed and Approved Feb. 8, 2019, 8 pages.
U.S. Appl. No. 15/240,964: Notice of Allowance dated Feb. 21, 2019, 276 pages.
U.S. Appl. No. 15/240,964: Issue Fee Payment and Response Under 37 CFR § 1.312 filed May 16, 2019, 16 pages.
U.S. Appl. No. 15/240,964: Notice to File Corrected Application Papers dated May 16, 2019, 3 pages.
U.S. Appl. No. 15/240,964: Response to Notice to File Corrected Application Papers filed Jul. 22, 2019, 11 pages.
U.S. Appl. No. 15/240,964: Issue Notification dated Aug. 21, 2019, 1 page.
U.S. Appl. No. 16/427,054: U.S. Appl. No. 16/427,054, filed May 30, 2019, 68 pages.
U.S. Appl. No. 16/427,054: Filing Receipt and Notice to File Missing Parts dated Jun. 6, 2019, 7 pages.
U.S. Appl. No. 16/427,054: Response to Notice to File Missing Parts and Preliminary Amendment filed Aug. 8, 2019, 19 pages.
U.S. Appl. No. 16/427,054: Updated Filing Receipt dated Aug. 12, 2019, 4 pages.
U.S. Appl. No. 16/427,054: Notice of Publication dated Nov. 21, 2019, 1 page.
U.S. Appl. No. 16/427,054: Non-Final Rejection dated Nov. 9, 2020, 367 pages.
U.S. Appl. No. 16/427,054: Response to Non-Final Rejection dated Feb. 8, 2021, 22 pages.
U.S. Appl. No. 16/427,054: Terminal Disclaimer dated Feb. 8, 2021, 5 pages.
U.S. Appl. No. 16/427,054: Final Office Action dated Mar. 25, 2021, 22 pages.
U.S. Appl. No. 11/320,538: Transmittal of New Application filed Dec. 27, 2005, 76 pages.
U.S. Appl. No. 11/320,538: Pre-Exam Formalities Notice dated Feb. 2, 2006, 2 pages.
U.S. Appl. No. 11/320,538: Applicant Response to Pre-Exam Formalities Notice filed Aug. 4, 2006, 36 pages.
U.S. Appl. No. 11/320,538: Non-Final Rejection dated Apr. 1, 2009, 27 pages.
U.S. Appl. No. 11/320,538: Amendment / Request for Reconsideration After Non-Final Rejection dated Jul. 1, 2009, 26 pages.
U.S. Appl. No. 11/320,538: Final Rejection dated Nov. 2, 2009, 29 pages.
U.S. Appl. No. 11/320,538: Amendment Submitted / Entered with Filing of CPA / RCE filed Jan. 4, 2010, 24 pages.

(56) References Cited

OTHER PUBLICATIONS

U.S. Appl. No. 11/320,538: Advisory Action dated Jan. 19, 2010, 4 pages.
U.S. Appl. No. 11/320,538: Request for Continued Examination filed Apr. 2, 2010, 29 pages.
U.S. Appl. No. 11/320,538: Non-Final Rejection dated Jun. 9, 2010, 24 pages.
U.S. Appl. No. 11/320,538: Final Rejection dated Dec. 22, 2010, 28 pages.
U.S. Appl. No. 11/320,538: Notice of Appeal Filed and Pre-Brief Conference Request filed May 23, 2011, 10 pages.
U.S. Appl. No. 11/320,538: Pre-Brief Appeal Conference Decision dated Jun. 30, 2011, 2 pages.
U.S. Appl. No. 11/320,538: Request for Continued Examination filed Dec. 23, 2011, 26 pages.
U.S. Appl. No. 11/320,538: Non-Final Rejection dated Dec. 19, 2012, 50 pages.
U.S. Appl. No. 11/320,538: Amendment / Request for Reconsideration After Non-Final Rejection filed Apr. 17, 2013, 25 pages.
U.S. Appl. No. 11/320,538: Notice of Allowance and Fees Due dated Aug. 1, 2013, 49 pages.
U.S. Appl. No. 11/320,538: Issue Fee Payment filed Nov. 1, 2013, 9 pages.
U.S. Appl. No. 11/320,538: Notice of Allowance and Fees Due dated Nov. 19, 2013, 46 pages.
U.S. Appl. No. 11/320,538: Issue Notification dated Dec. 4, 2013, 1 page.
U.S. Appl. No. 14/086,741, filed Nov. 21, 2013, 79 pages.
U.S. Appl. No. 14/086,741: Notice to File Missing Parts and Filing Receipt dated Dec. 12, 2013, 7 pages.
U.S. Appl. No. 14/086,741: Preliminary Amendment and Applicant Response to Pre-Exam Formalities Notice filed Jun. 12, 2014, 89 pages.
U.S. Appl. No. 14/086,741: Filing Receipt Jun. 17, 2014, 4 pages.
U.S. Appl. No. 14/086,741: Notice of Publication dated Sep. 25, 2014, 1 page.
U.S. Appl. No. 14/086,741: Terminal Disclaimer and Power of Attorney filed Sep. 29, 2014, 7 pages.
U.S. Appl. No. 14/086,741: Terminal Disclaimer Review Decision Sep. 30, 2014, 1 page.
U.S. Appl. No. 14/086,741: Notice of Allowance and Fees Due and Communication Re: Power of Attorney dated Oct. 3, 2014, 46 pages.
U.S. Appl. No. 14/086,741: Miscellaneous Communication to Applicant and List of References dated Nov. 26, 2014, 3 pages.
U.S. Appl. No. 14/086,741: Amendment after Notice of Allowance and Issue Fee Payment filed Jan. 5, 2015, 19 pages.
U.S. Appl. No. 14/086,741: Petition Auto-Grant Letter from EFS Jan. 7, 2015, 2 pages.
U.S. Appl. No. 14/086,741: Response to Amendment under Rule 312 filed Jan. 22, 2015, 2 pages.
U.S. Appl. No. 14/086,741: Notice of Allowance and Fees Due dated Mar. 16, 2015, 48 pages.
U.S. Appl. No. 14/086,741: Issue Notification dated Apr. 1, 2015, 1 page.
U.S. Appl. No. 14/596,154: Application and Declaration filed Jan. 13, 2015, 82 pages.
U.S. Appl. No. 14/596,154: Notice to File Missing Parts and Filing Receipt dated Jan. 27, 2015, 7 pages.
U.S. Appl. No. 14/596,154: Preliminary Amendment and Applicant Response to Pre-Exam Formalities Notice filed Mar. 27, 2015, 88 pages.
U.S. Appl. No. 14/596,154: Filing Receipt Apr. 2, 2015, 3 pages.
U.S. Appl. No. 14/596,154: e-Terminal Disclaimer filed and Approved Nov. 20, 2015, 7 pages.
U.S. Appl. No. 14/596,154: Non-Final Rejection dated Sep. 21, 2017, 121 pages.
U.S. Appl. No. 14/596,154: Amendment / Request for Reconsideration After Non-Final Rejection filed Dec. 21, 2017, 48 pages.
U.S. Appl. No. 14/596,154: Notice of Allowance and Fees Due dated May 2, 2018, 56 pages.
U.S. Appl. No. 14/596,154: Notice of Allowance and Fees Due dated May 21, 2018, 11 pages.
U.S. Appl. No. 14/596,154: Issue Fee Payment filed Jul. 27, 2018, 8 pages.
U.S. Appl. No. 14/596,154: List of References Aug. 8, 2018, 2 pages.
U.S. Appl. No. 14/596,154: Issue Notification dated Aug. 21, 2018, 1 page.
U.S. Appl. No. 16/710,731: Reissue Application filed Dec. 11, 2019, 91 pages.
U.S. Appl. No. 16/710,731: Filing Receipt dated Dec. 12, 2019, 5 pages.
U.S. Appl. No. 16/710,731: Request for Corrected Filing Receipt filed Feb. 19, 2020, 16 pages.
U.S. Appl. No. 16/710,731: Corrected Filing Receipt dated Feb. 24, 2020, 4 pages.
U.S. Appl. No. 16/710,731: Non-Final Rejection dated Nov. 24, 2020, 15 pages.
U.S. Appl. No. 16/710,731: Response to Non-Final Rejection dated Nov. 24, 2020, 21 pages.
U.S. Appl. No. 16/710,731: Response to Non-Final Rejection filed Mar. 23, 2021, 21 pages.
U.S. Appl. No. 16/710,731: Non-Final Rejection dated Apr. 21, 2021, 11 pages.
U.S. Appl. No. 16/048,113, filed Jul. 27, 2018, 86 pages.
U.S. Appl. No. 16/048,113: Filing Receipt and Notice to File Missing Parts dated Aug. 24, 2018, 6 pages.
U.S. Appl. No. 16/048,113: Notice of Publication dated Jan. 31, 2019, 1 page.
U.S. Appl. No. 16/048,113: Non-Final Rejection dated Oct. 2, 2020, 130 pages.
U.S. Appl. No. 16/048,113: Response to Non-Final Rejection dated Feb. 2, 2021, 22 pages.
U.S. Appl. No. 16/048,113: Terminal Disclaimer Oct. 2, 2020, 5 pages.
U.S. Appl. No. 16/048,113: Notice of Allowance/Allowability dated Apr. 6, 2021, 75 pages.
U.S. Appl. No. 16/048,113: Issue Fee Payment and 312 Response filed Jul. 6, 2021, 12 pages.
U.S. Appl. No. 11/361,500: Transmittal of New Application Feb. 23, 2006, 77 pages.
U.S. Appl. No. 11/361,500: Pre-Exam Formalities Notice dated Mar. 23, 2006, 2 pages.
U.S. Appl. No. 11/361,500: Applicant Response to Pre-Exam Formalities Notice filed Jul. 19, 2006, 27 pages.
U.S. Appl. No. 11/361,500: Notice of Publication dated Nov. 16, 2006, 1 page.
U.S. Appl. No. 11/361,500: Non-Final Rejection dated May 27, 2009, 27 pages.
U.S. Appl. No. 11/361,500: Amendment / Request for Reconsideration After Non-Final Rejection filed Aug. 27, 2009, 37 pages.
U.S. Appl. No. 11/361,500: Notice of Allowance and Fees dated Due Dec. 11, 2009, 134 pages.
U.S. Appl. No. 11/361,500: Issue Fee Payment and Amendment After Notice of Allowance filed Jan. 6, 2010, 26 pages.
U.S. Appl. No. 11/361,500: Response to Amendment Under Rule 312 dated Jan. 25, 2010, 7 pages.
U.S. Appl. No. 11/361,500: Issue Notification dated Feb. 24, 2010, 1 page.
U.S. Appl. No. 11/361,500: Filing Receipt and Notice to File Missing Parts dated Feb. 25, 2010, 5 pages.
U.S. Appl. No. 11/361,500: Applicant Response to Pre-Exam Formalities Notice filed Apr. 26, 2010, 13 pages.
U.S. Appl. No. 11/361,500: Filing Receipt May 4, 2010, 3 pages.
U.S. Appl. No. 11/361,500: Notice of Publication dated Aug. 12, 2010, 1 page.
U.S. Appl. No. 11/361,500: Non-Final Rejection dated Aug. 30, 2012, 31 pages.
U.S. Appl. No. 11/361,500: Amendment / Request for Reconsideration After Non-Final Rejection filed Nov. 20, 2012, 15 pages.

(56) References Cited

OTHER PUBLICATIONS

U.S. Appl. No. 11/361,500: Terminal Disclaimer filed Jan. 2, 2013, 5 pages.
U.S. Appl. No. 11/361,500: Terminal Disclaimer Review Decision Jan. 4, 2013, 1 page.
U.S. Appl. No. 11/361,500: Notice of Allowance and Fees Due dated Jan. 10, 2013, 144 pages.
U.S. Appl. No. 11/361,500: Issue Fee Payment Apr. 10, 2013, 8 pages.
U.S. Appl. No. 11/361,500: Issue Notification dated Apr. 24, 2013, 1 page.
U.S. Appl. No. 12/702,243: Application and Preliminary Amendment filed Feb. 8, 2010, 84 pages.
U.S. Appl. No. 12/702,243: Notice to File Missing Parts and Filing Receipt dated Feb. 25, 2010, 5 pages.
U.S. Appl. No. 12/702,243: Applicant Response to Pre-Exam Formalities Notice dated Apr. 26, 2010, 13 pages.
U.S. Appl. No. 12/702,243: Filing Receipt May 4, 2010, 3 pages.
U.S. Appl. No. 12/702,243: Notice of Publication dated Aug. 12, 2010, 1 page.
U.S. Appl. No. 12/702,243: Non-Final Rejection dated Aug. 30, 2012, 31 pages.
U.S. Appl. No. 12/702,243: Amendment / Request for Reconsideration After Non-Final Rejection filed Nov. 20, 2012, 15 pages.
U.S. Appl. No. 12/702,243: Terminal Disclaimer filed Jan. 2, 2013, 5 pages.
U.S. Appl. No. 12/702,243: Terminal Disclaimer Review Decision Jan. 4, 2013, 1 page.
U.S. Appl. No. 12/702,243: Notice of Allowance and Fees dated Due Jan. 10, 2013, 120 pages.
U.S. Appl. No. 12/702,243: Issue Fee Payment and Post-Allowance Communication filed Apr. 10, 2013, 8 pages.
U.S. Appl. No. 12/702,243: List of References Apr. 13, 2013, 4 pages.
U.S. Appl. No. 12/702,243: Issue Notification dated Apr. 24, 2013, 1 page.
U.S. Appl. No. 13/860,482: Application and Preliminary Amendment filed Apr. 10, 2013, 99 pages.
U.S. Appl. No. 13/860,482: Notice to File Missing Parts and Filing Receipt dated May 21, 2013, 6 pages.
U.S. Appl. No. 13/860,482: Applicant Response to Pre-Exam Formalities Notice filed Oct. 22, 2013, 7 pages.
U.S. Appl. No. 13/860,482: Filing Receipt and Fee Worksheet Oct. 28, 2013, 4 page.
U.S. Appl. No. 13/860,482: Notice of Publication dated Feb. 6, 2014, 1 page.
U.S. Appl. No. 13/860,482: Non-Final Rejection dated Jun. 9, 2014, 14 pages.
U.S. Appl. No. 13/860,482: Amendment / Request for Reconsideration After Non-Final Rejection and Terminal Disclaimer filed Sep. 8, 2014, 24 pages.
U.S. Appl. No. 13/860,482: Terminal Disclaimer Review Decision Sep. 9, 2014, 1 page.
U.S. Appl. No. 13/860,482: Terminal Disclaimer Filed Oct. 8, 2014, 4 pages.
U.S. Appl. No. 13/860,482: Terminal Disclaimer Review Decision Oct. 9, 2014, 1 page.
U.S. Appl. No. 13/860,482: Notice of Allowance and Fees Due dated Nov. 5, 2014, 95 pages.
U.S. Appl. No. 13/860,482: Issue Fee Payment and Amendment Made After Notice of Allowance filed Feb. 4, 2015, 8 pages.
U.S. Appl. No. 13/860,482: Issue Information Including Classification, Examiner, Name, Claim, Renumbering, etc. dated Feb. 6, 2015, 1 page.
U.S. Appl. No. 13/860,482: Issue Notification dated Mar. 4, 2015, 1 page.
U.S. Appl. No. 14/614,292: Application and Declaration filed Feb. 4, 2015, 82 pages.
U.S. Appl. No. 14/614,292: Notice to File Missing Parts and Filing Receipt dated Feb. 20, 2015, 6 pages.
U.S. Appl. No. 14/614,292: Applicant Response to Pre-Exam Formalities dated Notice Apr. 17, 2015, 34 pages.
U.S. Appl. No. 14/614,292: Filing Receipt and Fee Worksheet Apr. 24, 2015, 4 pages.
U.S. Appl. No. 14/614,292: Notice of Publication dated Aug. 6, 2015, 1 page.
U.S. Appl. No. 14/614,292: e-Terminal Disclaimer Filed and Approved Nov. 20, 2015, 7 pages.
U.S. Appl. No. 14/614,292: Non-Final Rejection dated May 19, 2016, 84 pages.
U.S. Appl. No. 14/614,292: Amendment / Request for Reconsideration After Non-Final Rejection filed Aug. 18, 2016, 23 pages.
U.S. Appl. No. 14/614,292: Notice of Allowance and Fees Due dated Sep. 21, 2016, 153 pages.
U.S. Appl. No. 14/614,292 : Issue Fee Payment and Amendment After Notice of Allowance filed Dec. 21, 2016, 8 pages.
U.S. Appl. No. 14/614,292: Issue Notification dated Jan. 18, 2017, 1 page.
U.S. Appl. No. 15/411,823: Application, Power of Attorney, Declaration and Preliminary Amendment filed Jan. 20, 2017, 116 pages.
U.S. Appl. No. 15/411,823: Filing Receipt and Fee Worksheet Jan. 31, 2017, 4 pages.
U.S. Appl. No. 15/411,823: Notice of Publication dated May 11, 2017, 1 page.
U.S. Appl. No. 15/411,823: Non-Final Rejection dated Jan. 25, 2018, 85 pages.
U.S. Appl. No. 15/411,823: e-Terminal Disclaimer Filed and Approved Apr. 24, 2018, 28 pages,
U.S. Appl. No. 15/411,823: Notice of Allowance and Fees Due filed Jul. 13, 2018, 101 pages.
U.S. Appl. No. 15/411,823: Issue Fee Payment filed and Miscellaneous Incoming Letter dated Oct. 15, 2018, 8 pages.
U.S. Appl. No. 15/411,823: Issue Notification dated Nov. 7, 2018, 1 page.
U.S. Appl. No. 16/164,430, filed Oct. 18, 2018, 84 pages.
U.S. Appl. No. 16/164,430: Notice to File Missing Parts and Filing Receipt dated Nov. 6, 2018, 7 pages.
U.S. Appl. No. 16/164,430: Response to Notice of Missing Parts filed Jan. 18, 2019, 37 pages.
U.S. Appl. No. 16/164,430: Updatd Filing Receipt Jan. 23, 2019, 5 pages.
U.S. Appl. No. 16/164,430: Notice of Publication dated May 2, 2019, 1 page.
U.S. Appl. No. 16/164,430: Non-Final Rejection dated Oct. 18, 2019, 122 pages.
U.S. Appl. No. 16/164,430: Non-final Office Action dated Oct. 18, 2019, 107 pages.
U.S. Appl. No. 16/164,430: Response to Non-Final Rejection filed Jan. 21, 2020, 15 pages.
U.S. Appl. No. 16/164,430: Notice of Allowance dated Mar. 6, 2020, 86 pages.
U.S. Appl. No. 16/164,430: Issue Fee Payment filed Jun. 8, 2020, 4 pages.
U.S. Appl. No. 16/164,430: Supplemental Notice of Allowability dated Jun. 16, 2020, 12 pages.
U.S. Appl. No. 16/164,430: Issue Notification dated Jun. 17, 2020, 1 page.
U.S. Appl. No. 16/164,430: Request for Certificate of Correction filed Sep. 3, 2020, 6 pages.
U.S. Appl. No. 16/164,430: Certificate of Correction Oct. 6, 2020, 1 page.
U.S. Appl. No. 16/898,134, filed Jun. 10, 2020, 84 pages.
U.S. Appl. No. 16/898,134: Filing Receipt and Notice to File Missing Parts dated Jun. 19, 2020, 8 pages.
U.S. Appl. No. 16/898,134: Preliminary Amendment and Response to Mising Parts filed Aug. 18, 2020, 39 pages.
U.S. Appl. No. 16/898,134: Updated Filing Receipt Aug. 21, 2020, 6 pages.
U.S. Appl. No. 16/898,134: Notice of Publication dated Nov. 27, 2020, 2 pages.
U.S. Appl. No. 16/898,134: Non-final Office Action dated Jun. 30, 2021, 57 pages.

(56) References Cited

OTHER PUBLICATIONS

U.S. Appl. No. 11/412,417: New Application filed Apr. 26, 2006, 96 pages.
U.S. Appl. No. 11/412,417: Pre-Exam Formalities Notice dated May 19, 2006, 2 pages.
U.S. Appl. No. 11/412,417: Applicant Response to Pre-Exam Formalities Notice filed Jul. 19, 2006, 14 pages.
U.S. Appl. No. 11/412,417: Non-Final Rejection dated Apr. 1, 2008, 53 pages.
U.S. Appl. No. 11/412,417: Amendment / Request for Reconsideration After Non-Final Rejection filed Aug. 1, 2008, 34 pages.
U.S. Appl. No. 11/412,417: Final Rejection dated Nov. 13, 2008, 40 pages.
U.S. Appl. No. 11/412,417: Request for Continued Examination and Amendment Submitted with Filing of Request for Continued Examination filed May 12, 2009, 36 pages.
U.S. Appl. No. 11/412,417: Non-Final Rejection dated Jun. 30, 2009, 141 pages.
U.S. Appl. No. 11/412,417: Amendment / Request for Reconsideration After Non-Final Rejection filed Oct. 30, 2009, 36 pages.
U.S. Appl. No. 11/412,417: Final Rejection dated Jan. 4, 2010, 43 pages.
U.S. Appl. No. 11/412,417: Request for Continued Examination filed May 4, 2010, 32 pages.
U.S. Appl. No. 11/412,417: Supplemental Remarks or Supplemental Amendment filed Jun. 22, 2010, 25 pages.
U.S. Appl. No. 11/412,417: Notice of Allowance and Fees Due dated Jul. 6, 2010, 23 pages.
U.S. Appl. No. 11/412,417: Request for Continued Examination filed Oct. 5, 2010, 4 pages.
U.S. Appl. No. 11/412,417: Notice of Allowance and Fees Due dated Oct. 26, 2010, 17 pages.
U.S. Appl. No. 11/412,417: Issue Fee Payment and Miscellaneous Incoming Letter filed Jan. 26, 2011, 3 pages.
U.S. Appl. No. 11/412,417: Issue Notification dated Feb. 9, 2011, 1 page.
U.S. Appl. No. 13/030,084: Application and Declaration filed Feb. 17, 2011, 105 pages.
U.S. Appl. No. 13/030,084: Notice to File Missing Parts dated Mar. 3, 2011, 6 pages.
U.S. Appl. No. 13/030,084: Applicant Response to Pre-Exam Formalities Notice filed Aug. 3, 2011, 29 pages.
U.S. Appl. No. 13/030,084: Filing Receipt Aug. 11, 2011, 4 pages.
U.S. Appl. No. 13/030,084: Non-Final Rejection dated Oct. 26, 2011, 39 pages.
U.S. Appl. No. 13/030,084: Notice of Publication dated Nov. 17, 2011, 1 page.
U.S. Appl. No. 13/030,084: Informal or Non-Responsive Amendment filed Jan. 26, 2012, 35 pages.
U.S. Appl. No. 13/030,084: Notice to Applicant Regarding a Non-Compliant or Non-Responsive Amendment dated Jan. 31, 2012, 4 pages.
U.S. Appl. No. 13/030,084: Amendment / Request for Reconsideration After Non-Final Rejection filed Feb. 9, 2012, 36 pages.
U.S. Appl. No. 13/030,084: Final Rejection dated Mar. 28, 2012, 62 pages.
U.S. Appl. No. 13/030,084: Response After Final Action filed Jun. 14, 2012, 90 pages.
U.S. Appl. No. 13/030,084: Advisory Action dated Jun. 26, 2012, 4 pages.
U.S. Appl. No. 13/030,084: Request for Continued Examination filed Jul. 23, 2012, 91 pages.
U.S. Appl. No. 13/030,084: Notice to Applicant Regarding a Non-Compliant or Non-Responsive Amendment dated Jul. 25, 2012, 2 pages.
U.S. Appl. No. 13/030,084: Amendment / Request for Reconsideration After Non-Final Rejection filed Jan. 2, 2013, 40 pages.
U.S. Appl. No. 13/030,084: Non-Final Rejection dated Apr. 30, 2013, 45 pages.
U.S. Appl. No. 13/030,084: Amendment / Request for Reconsideration After Non-Final Rejection dated Jul. 30, 2013, 30 pages.
U.S. Appl. No. 13/030,084: Non-Final Rejection dated Oct. 10, 2013, 50 pages.
U.S. Appl. No. 13/030,084: Amendment / Request for Reconsideration After Non-Final Rejection filed Jan. 2, 2014, 27 pages.
U.S. Appl. No. 13/030,084: Final Rejection dated Mar. 19, 2014, 48 pages.
U.S. Appl. No. 13/030,084: Amendment Submitted / Entered with Filing of CPA / Request for Continued Examination filed May 19, 2014, 41 pages.
U.S. Appl. No. 13/030,084: Advisory Action dated Jun. 6, 2014, 6 pages.
U.S. Appl. No. 13/030,084: Applicant Initiated Interview Summary dated Jul. 1, 2014, 3 pages.
U.S. Appl. No. 13/030,084: Request for Continued Examination filed Aug. 15, 2014, 31 pages.
U.S. Appl. No. 13/030,084: Non-Final Rejection dated Mar. 24, 2015, 45 pages.
U.S. Appl. No. 13/030,084: Amendment / Request for Reconsideration After Non-Final Rejection filed Jun. 24, 2015, 31 pages.
U.S. Appl. No. 13/030,084: e-Terminal Disclaimer filed and approved and Communication Re: Power of Attorney dated Sep. 10, 2015, 9 pages.
U.S. Appl. No. 13/030,084: Notice of Allowance and Fees Due dated Sep. 17, 2015, 46 pages.
U.S. Appl. No. 13/030,084: Post-Allowance Communication—Incoming dated Nov. 13, 2015, 4 pages.
U.S. Appl. No. 13/030,084: Miscellaneous Communication Applicant dated Nov. 30, 2015, 49 pages.
U.S. Appl. No. 13/030,084: Issue Fee Payment filed Dec. 10, 2015, 8 pages.
U.S. Appl. No. 13/030,084: Issue Notification dated Jan. 16, 2016, 1 page.
U.S. Appl. No. 14/968,429: Application filed Dec. 14, 2015, 119 pages.
U.S. Appl. No. 14/968,429: Filing Receipt and Notice to File Corrected Application Papers dated Jan. 4, 2016, 6 pages.
U.S. Appl. No. 14/968,429: Applicant Response to Pre-Exam Formalities Notice filed Jan. 14, 2016, 38 pages.
U.S. Appl. No. 14/968,429: Filing Receipt and Miscellaneous Communication to Applicant dated Jan. 21, 2016, 5 pages.
U.S. Appl. No. 14/968,429: Notice of Publication dated Apr. 28, 2016, 1 page.
U.S. Appl. No. 14/968,429: Non-Final Rejection dated May 15, 2017, 56 pages.
U.S. Appl. No. 14/968,429: Final Rejection dated Oct. 24, 2017, 11 pages.
U.S. Appl. No. 14/968,429: Response After Final Action and After Final Consideration Program Request filed Dec. 26, 2017, 31 pages.
U.S. Appl. No. 14/968,429: Advisory Action and After Final Consideration Program Decision dated Jan. 11, 2018, 7 pages.
U.S. Appl. No. 14/968,429: e-Terminal Disclaimer filed and Approved and Response After Final Action filed Feb. 7, 2018, 25 pages.
U.S. Appl. No. 14/968,429: Amendment After Final filed Feb. 26, 2018, 16 pages.
U.S. Appl. No. 14/968,429: Notice of Allowance and Fees Due dated Mar. 19, 2018, 47 pages.
U.S. Appl. No. 14/968,429: Amendment After Notice of Allowance and Issue Fee Payment filed May 29, 2018, 17 pages.
U.S. Appl. No. 14/968,429: Amendment After Notice of Allowance filed May 31, 2018, 14 pages.
U.S. Appl. No. 14/968,429: Amendment After Notice of Allowance filed Jun. 13, 2018, 14 pages.
U.S. Appl. No. 14/968,429: Response to Amendment Under Rule 312 dated Jul. 10, 2018, 5 pages.
U.S. Appl. No. 14/968,429: Response to Amendment Under Rule 312 dated Jul. 23, 2018, 3 pages.
U.S. Appl. No. 14/968,429: Issue Notification dated Aug. 1, 2018, 1 page.
U.S. Appl. No. 14/968,429: Request for Certificate of Correction filed Oct. 12, 2018, 6 pages.

(56) References Cited

OTHER PUBLICATIONS

U.S. Appl. No. 14/968,429: Certificate of Correction Nov. 20, 2018, 1 page.
U.S. Appl. No. 16/048,061, filed Jul. 27, 2018, 109 pages.
U.S. Appl. No. 16/048,061: Notice to File Missing Parts and Filing Receipt dated Aug. 13, 2018, 7 pages.
U.S. Appl. No. 16/048,061: Applicant Response to Pre-Exam Formalities Notice filed Oct. 12, 2018, 45 pages.
U.S. Appl. No. 16/048,061: Filing Receipt Oct. 16, 2018, 5 pages.
U.S. Appl. No. 16/048,061: Request for Corrected Filing Receipt filed Oct. 31, 2018, 8 pages.
U.S. Appl. No. 16/048,061: Filing Receipt Nov. 5, 2018, 4 pages.
U.S. Appl. No. 16/048,061: Notice of Publication dated Jan. 24, 2019, 1 page.
U.S. Appl. No. 16/048,061: Non-Final Rejection dated Sep. 25, 2020, 68 pages.
U.S. Appl. No. 16/048,061: Response to Non-Final Rejection filed Jan. 25, 2021, 17 pages.
U.S. Appl. No. 16/048,061: Terminal Disclaimer filed Jan. 25, 2021, 6 pages.
U.S. Appl. No. 16/048,061: Notice of Allowance/Allowability dated Apr. 9, 2021, 33 pages.
U.S. Appl. No. 16/048,061: Issue Fee Payment and 312 Response filed Jul. 9, 2021, 19 pages.
U.S. Appl. No. 16/048,061: eTerminal Disclaimer filed Jul. 9, 2021, 3 pages.
U.S. Appl. No. 16/164,535, filed Oct. 18, 2018, 122 pages.
U.S. Appl. No. 16/164,535: Notice to File Corrected Application Papers and Filing Receipt dated Nov. 7, 2018, 7 pages.
U.S. Appl. No. 16/164,535: Applicant Response to Pre-Exam Formalities Notice filed Jan. 7, 2019, 27 pages.
U.S. Appl. No. 16/164,535: Updated Filing Receipt Jan. 11, 2019, 5 pages.
U.S. Appl. No. 16/164,535: Notice of Publication dated Apr. 25, 2019, 1 page.
U.S. Appl. No. 16/164,535: Non-Final Rejection dated Nov. 24, 2020, 76 pages.
U.S. Appl. No. 16/164,535: Response to Non-Final Rejection filed Feb. 19, 2021, 17 pages.
U.S. Appl. No. 16/164,535: Terminal Disclaimer filed Feb. 19, 2021, 6 pages.
U.S. Appl. No. 16/164,535: Notice of Allowance/Allowability dated Feb. 19, 2021, 6 pages.
U.S. Appl. No. 16/164,535: Request for Continued Examination and Amendment filed Jun. 17, 2021, 58 pages.
U.S. Appl. No. 16/164,535: Notice of Allowance / Allowability and Examiner-Initialed SB08 Listing dated Jul. 8, 2021, 20 pages.
U.S. Appl. No. 11/480,094, filed Jun. 29, 2006, 125 pages.
U.S. Appl. No. 11/480,094: Pre-Exam Formalities Notice dated Aug. 2, 2006, 2 pages.
U.S. Appl. No. 11/480,094: Applicant Response to Pre-Exam Formalities Notice filed Nov. 2, 2006, 32 pages.
U.S. Appl. No. 11/480,094: Filing Receipt Dec. 7, 2006, 3 pages.
U.S. Appl. No. 11/480,094: Non-Final Rejection dated Nov. 7, 2008, 28 pages.
U.S. Appl. No. 11/480,094: Amendment / Request for Reconsideration After Non-Final Rejection filed May 7, 2009, 37 pages.
U.S. Appl. No. 11/480,094: Final Rejection dated Jul. 28, 2009, 16 pages.
U.S. Appl. No. 11/480,094: Request for Continued Examination filed Dec. 28, 2009, 39 pages.
U.S. Appl. No. 11/480,094: Non-Final Rejection dated Dec. 15, 2010, 33 pages.
U.S. Appl. No. 11/480,094: Amendment / Request for Reconsideration After Non-Final Rejection filed May 16, 2011, 34 pages.
U.S. Appl. No. 11/480,094: Final Rejection dated Aug. 1, 2011, 26 pages.
U.S. Appl. No. 11/480,094: Response After Final Action filed Nov. 1, 2011, 35 pages.
U.S. Appl. No. 11/480,094: Advisory Action dated Nov. 14, 2011, 3 pages.
U.S. Appl. No. 11/480,094: Notice of Appeal Filed Nov. 28, 2011, 5 pages.
U.S. Appl. No. 11/480,094: Abandonment dated Jul. 31, 2012, 2 pages.
Fluri, "Change Distilling: Tree Differencing for Fine-Grained Source Code Change Extraction", IEEE pp. 725-743 (2007).
Sahinalp, "Distance Based Indexing for String Proximity Search", IEEE, pp. 125-136 (2003).
Vion-Dury, "Experimenting with the Circus Language for XML Modeling and Transformation", ACM pp. 82-87 (2002).
Zanibbi, "Recognizing Mathematical Expressions Using Tree Transformation," IEEE, pp. 1455-1467 (2002).
Zhang, "B ed-Tree: An All-Purpose Index Structure for String Similarity Search Based on Edit Distance", ACM, pp. 915-926 (2010).
U.S. Appl. No. 16/209,872: Notice of Allowance/Allowability dated Jul. 13, 2021, 12 pages.
U.S. Appl. No. 16/209,872: Issue Fee Payment and 312 Response filed Oct. 11, 2021, 14 pages.
U.S. Appl. No. 16/820,457, Supplemental Preliminary Amendment filed Jul. 30, 2021, 17 pages.
U.S. Appl. No. 17/158,804: Supplemental Preliminary Amendment filed Jul. 30, 2021, 14 pages.
U.S. Appl. No. 17/381,142: Patent Application and Preliminary Amendment filed Jul. 20, 2021, 146 pages.
U.S. Appl. No. 17/381,142: Filing Receipt dated Aug. 3, 2021, 4 pages.
U.S. Appl. No. 16/459,930: Response to Non-final Office Action filed Oct. 12, 2021, 18 pages.
U.S. Appl. No. 16/513,021: Response to Non-final Office Action and Terminal Disclaimer filed Sep. 28, 2021, 36 pages.
U.S. Appl. No. 16/513,021: Final Office Action dated Nov. 2, 2021, 37 pages.
U.S. Appl. No. 15/464,205: Request for Continued Examination and 312 Response filed Aug. 26, 2021, 13 pages.
U.S. Appl. No. 15/464,205: Notice of Allowance/Allowability dated Sep. 9, 2021, 5 pages.
U.S. Appl. No. 15/464,205: Notice of Allowance/Allowability dated Oct. 29, 2021, 105 pages.
U.S. Appl. No. 16/427,054: Request for Continued Examination filed Aug. 25, 2021, 3 pages.
U.S. Appl. No. 16/710,731: Response to Non-Final Rejection filed Sep. 15, 2021, 24 pages.
U.S. Appl. No. 16/710,731: Final Office Action dated Nov. 2, 2021, 39 pages.
U.S. Appl. No. 16/048,113: Issue Notification dated Aug. 4, 2021, 1 page.
U.S. Appl. No. 17/396,488, filed Aug. 6, 2021, 84 pages.
U.S. Appl. No. 17/396,488: Filing Receipt and Notice of Missing Parts dated Aug. 19, 2021, 7 pages.
U.S. Appl. No. 17/396,488: Response to Notice of Missing Parts and Preliminary Amendment filed Nov. 3, 2021, 95 pages.
U.S. Appl. No. 16/898,134: Response to Non-final Office Action and Terminal Disclaimer filed Jul. 30, 2021, 30 pages.
U.S. Appl. No. 16/898,134: Notice of Allowance/Allowability dated Sep. 22, 2021, 8 pages.
U.S. Appl. No. 16/898,134: Supplemental Notice of Allowability dated Oct. 14, 2021, 23 pages.
U.S. Appl. No. 16/898,134: Supplemental Notice of Allowability dated Oct. 20, 2021, 23 pages.
U.S. Appl. No. 16/048,061: Issue Notification dated Aug. 4, 2021, 1 page.
U.S. Appl. No. 16/164,535: Issue Fee Payment and 312 Response filed Oct. 8, 2021, 17pages.
U.S. Appl. No. 17/378,119, filed Jul. 16, 2021, 125 pages.
U.S. Appl. No. 17/378,119: Filing Receipt dated Jul. 29, 2021, 4 pages.
U.S. Appl. No. 17/378,119: Notice to File Corrected Application Papers dated Jul. 29, 2021, 2 pages.

(56) References Cited

OTHER PUBLICATIONS

U.S. Appl. No. 17/378,119: Response to Notice to File Corrected Application Papers dated Nov. 3, 2021, 27 pages.

* cited by examiner

900

| Index | Binary Edge-Labelled Strings | Binary Edge-Labelled Trees |
|---|---|---|
| 0. | λ | 0 |
| 1. | < > | 1 |
| 2. | < 0 > | $\#_0 1 1$ |
| 3. | < 1 > | $\#_1 1 1$ |
| 4. | < 0, 0 > | $\#_0 1 \#_0 1 1$ |
| 5. | < 0, 1 > | $\#_0 \#_0 1 1 1$ |
| 6. | < 1, 0 > | $\#_1 1 \#_0 1 1$ |
| 7. | < 1, 1 > | $\#_1 \#_0 1 1 1$ |
| 8. | < 0, 0, 0 > | $\#_0 1 \#_0 1 \#_0 1 1$ |
| 9. | < 0, 0, 1 > | $\#_1 1 \#_1 1 1$ |
| 10. | < 0, 1, 0 > | $\#_0 \#_0 1 1 \#_0 1 1$ |
| 11. | < 0, 1, 1 > | $\#_0 \#_1 1 1 1$ |
| 12. | < 1, 0, 0 > | $\#_1 1 \#_0 1 \#_0 1 1$ |
| 13. | < 1, 0, 1 > | $\#_1 \#_1 1 1 1$ |
| 14. | < 1, 1, 0 > | $\#_1 \#_0 1 1 1 \#_0 1 1$ |
| 15. | < 1, 1, 1 > | $\#_0 \#_0 1 1 \#_1 1 1$ |

[1] The Greek lower-case symbol lambda denotes the empty string.

ENUMERATION OF TREES FROM FINITE NUMBER OF NODES

RELATED APPLICATION

This disclosure claims priority pursuant to 35 USC 119(e) from U.S. Provisional Patent Application Ser. No. 60/632,203, filed on Nov. 30, 2004, by Schiffmann, et al., titled, "ENUMERATION OF TREES FROM FINITE NUMBER OF NODES," assigned to the assignee of the presently claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 6 is a table illustrating one embodiment of a linear notation for representing a graphical depiction of a hierarchical set of data;

DETAILED DESCRIPTION

Figure 1:
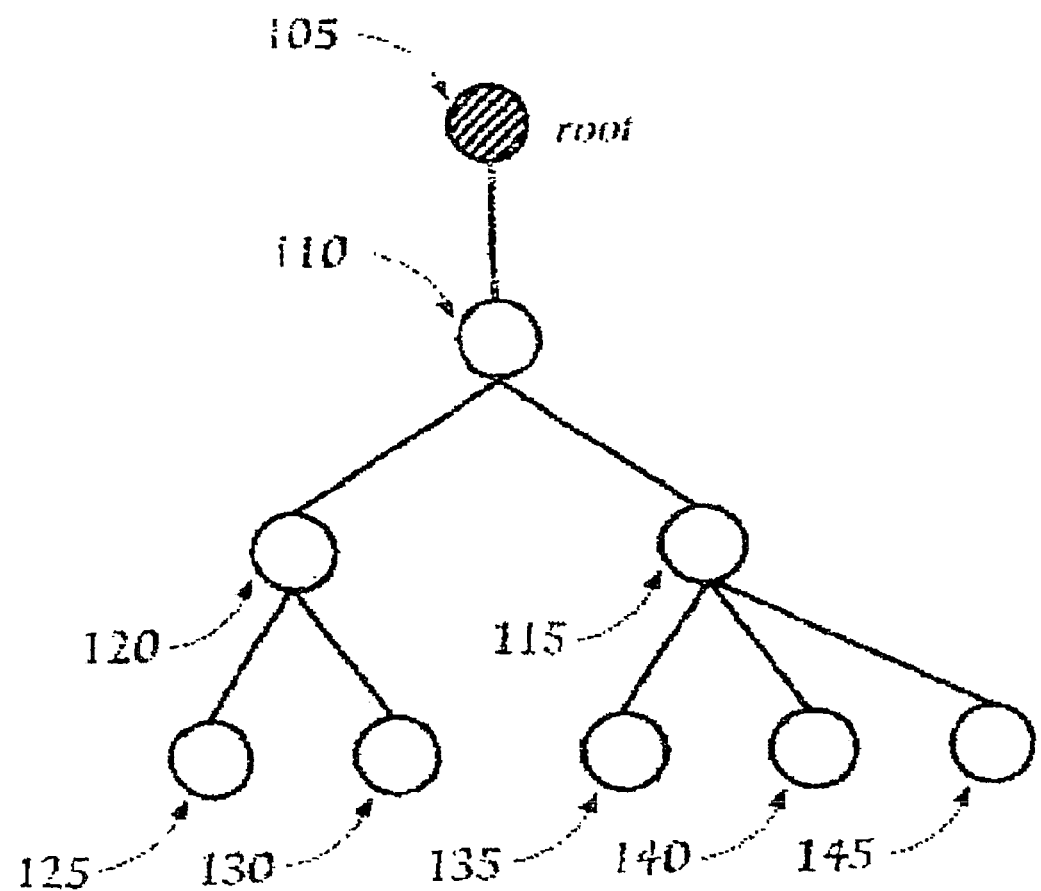
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
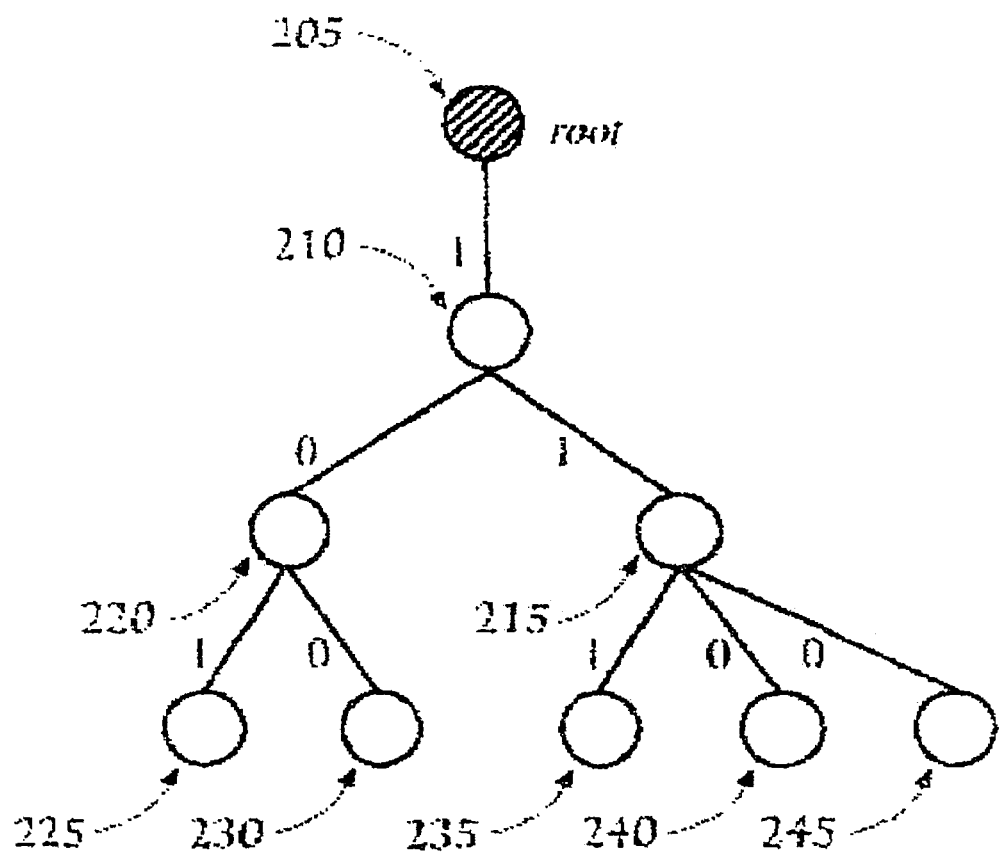
FIG. 2 is a schematic diagram illustrating one embodiment of a binary edge labeled tree (BELT)
Figure 3:
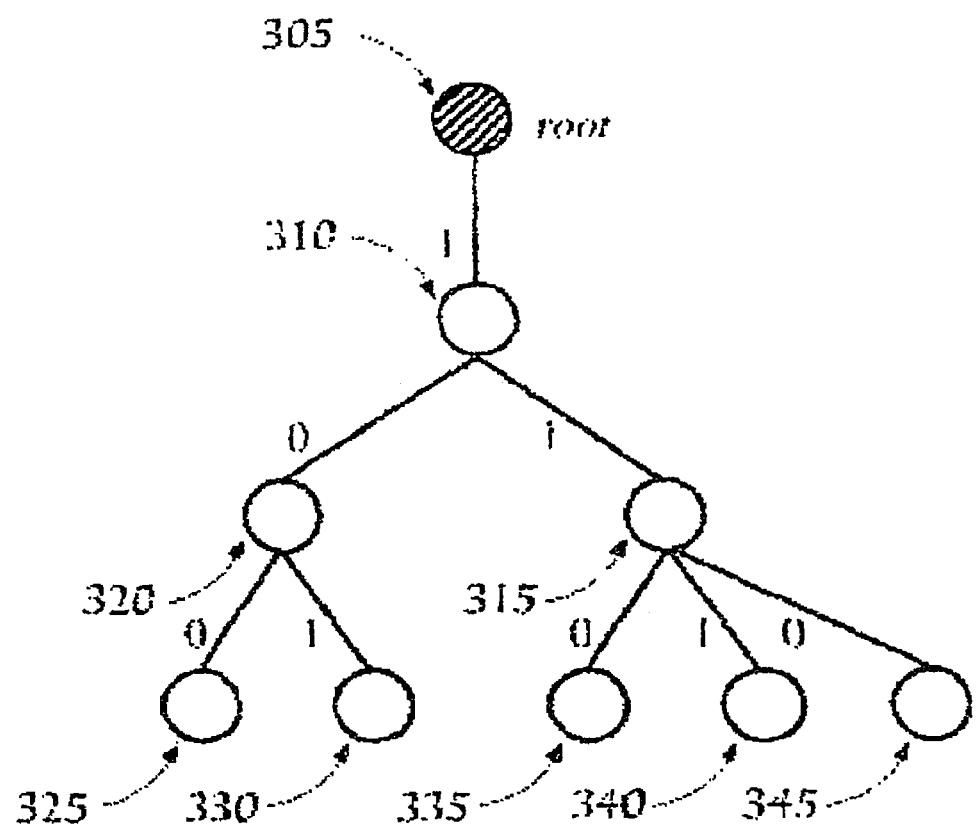
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of data may be found in U.S. Provisional Patent Application No. 60/543,371, filed on Feb. 9, 2004, by J. J. LeTourneau, titled, "Manipulating Sets of Hierarchical Data," assigned to the assignee of the presently claimed subject matter with reference to FIGS. 4-7 therein.

Figure 4:
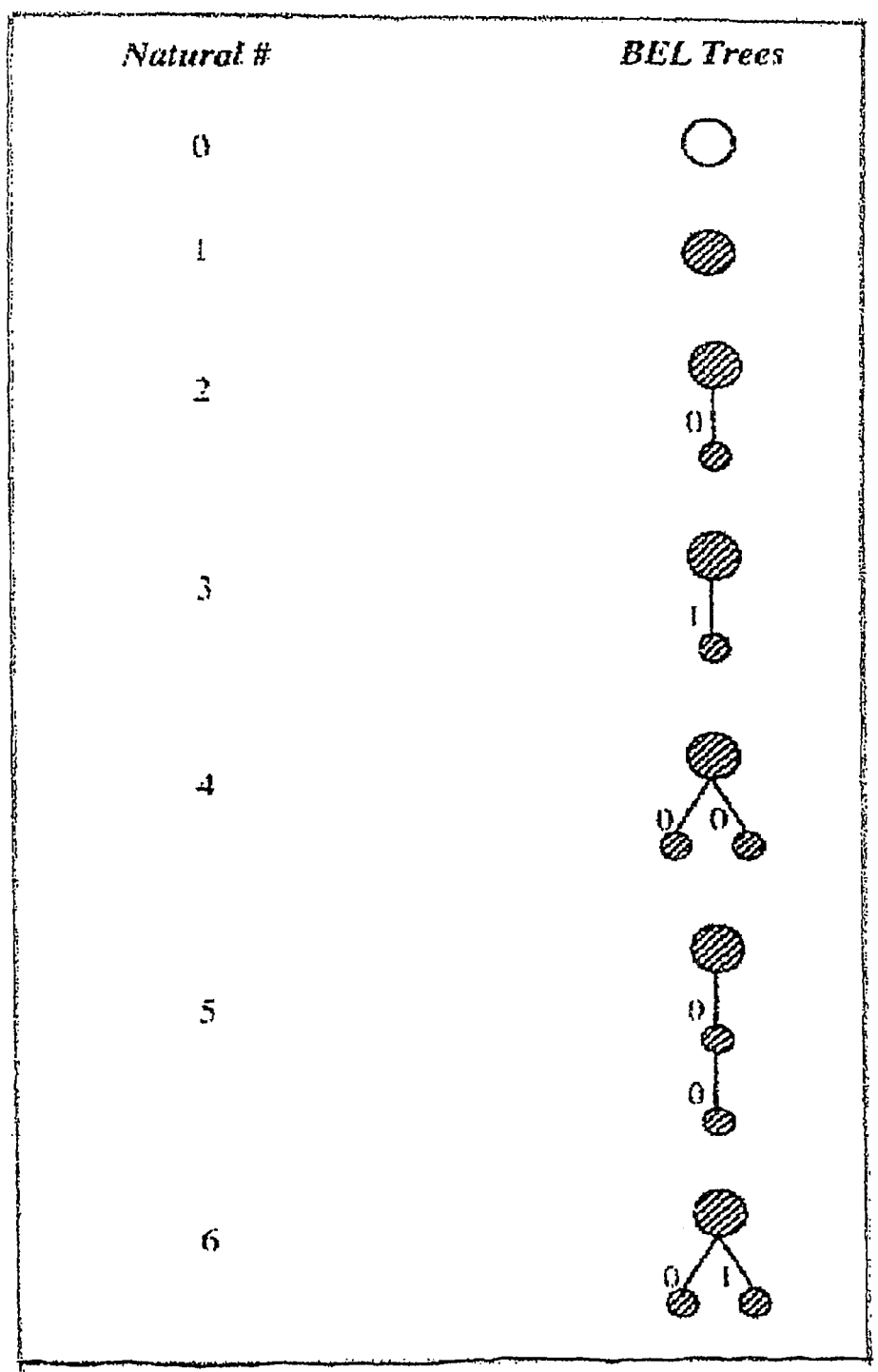
FIG. 4 is a table illustrating a particular embodiment of an association between natural numerals and BELTs.

Binary edge labeled trees may also be enumerated. Thus, for this particular embodiment, although the claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the one and has a graphical representation of a single node. For higher positive natural numerals, however, this embodiment of a method of enumerating a set of trees comprises positioning a tree at location k, k being a positive greater than three, where k is the product of u and v, u and v comprising positive s greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example, in FIG. 4, as described in more detail below.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 4 (circle). Likewise, the one node tree, which holds no data, is associated with the one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with the zero. Likewise, the one node tree root comprises a single node and is associated with the one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three.

Figure 5:
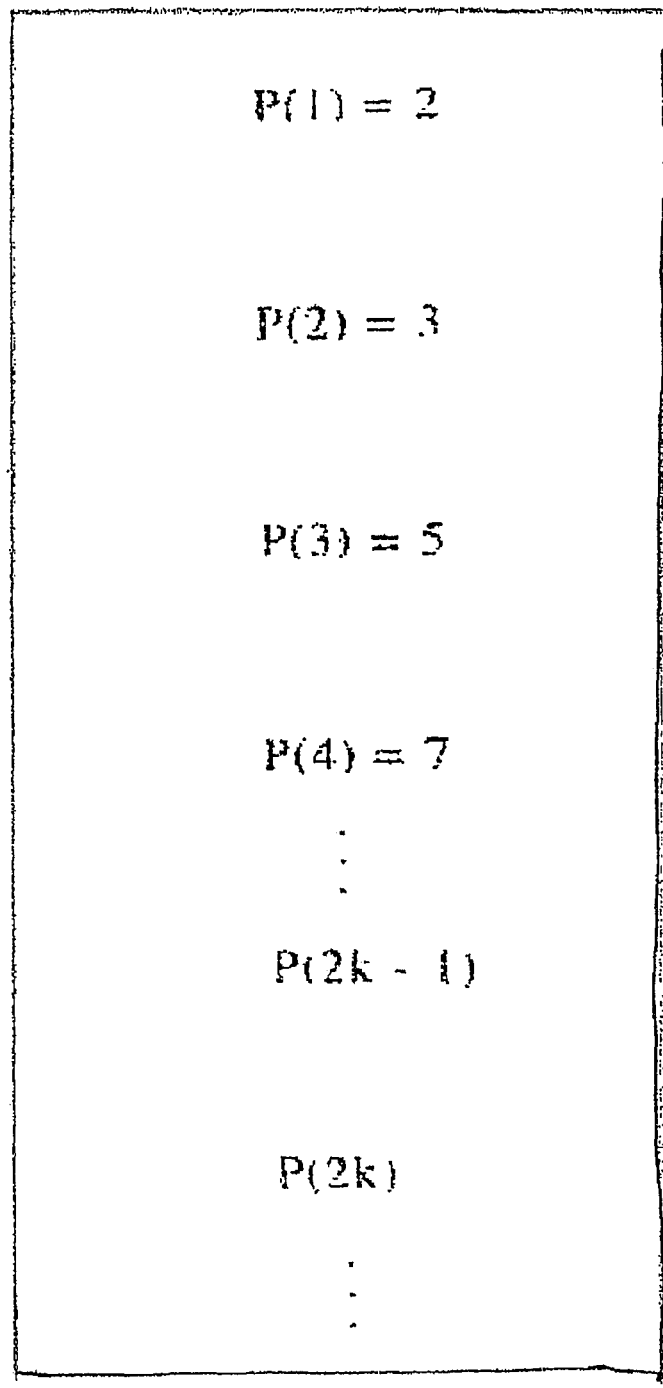
FIG. 5 is a table illustrating a portion of the Kleene enumeration of non-composite numerals.

This follows from FIG. 5 since P(2*1)=P(2)=3. Likewise, the tree at position five is the zero-push of the tree at position 2. Again, this follows from FIG. 5 since P(2*2−1)=P(3)=5.

In this context, the approach just described may be referred to as vectorizing non-composite numerals. In the embodiment just described, this was accomplished in pairs, although, of course, the claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 5.

In the previously described enumeration of binary edged labeled trees, a mechanism may be employed to reduce or convert complex manipulations of hierarchical data to multiplication of natural numerals. For example, if it is desired to combine, or merge at their roots, two trees of hierarchical data, a complex task both computationally and graphically, instead, for this particular embodiment, the two trees may be converted to numerical data by using the previously described association embodiment between binary edge labeled trees and natural numerals. The resulting numerical data from the prior conversion may then be multiplied, and the resulting product may then be converted to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and the claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be converted to a piece of numerical data, such as by using the previously described association embodiment. This data may then be factored into two pieces of numerical data whose product produces the previously mentioned piece of numerical data. These two pieces of numerical data may then be converted to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve converting the trees to numerical data, as previously described, using an association embodiment. The numerical data may then be ordered and the numerical data may then be converted back to binary edge labeled trees using the previously described association embodiment, or an alternate association embodiment, for example.

It is noted that there may be any one of a number of different ways of converting from numerals or numerical data values to a binary edge labeled tree or from a binary string to a binary edge labeled tree, and vice-versa. Nonetheless, a convenient method for doing so with this particular embodiment includes storing a table providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 7, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 7:
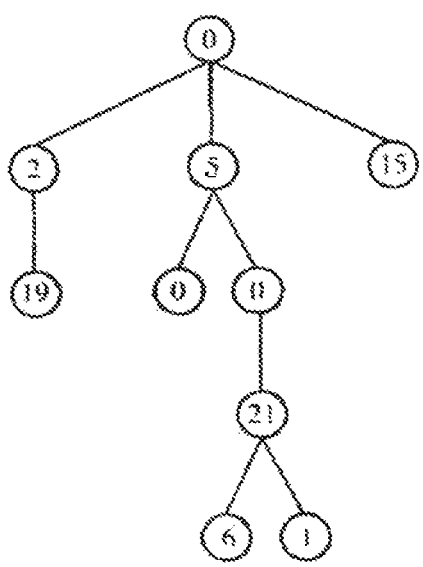
FIG. 7 is a schematic diagram of an embodiment of a node labeled tree.
Figure 8:
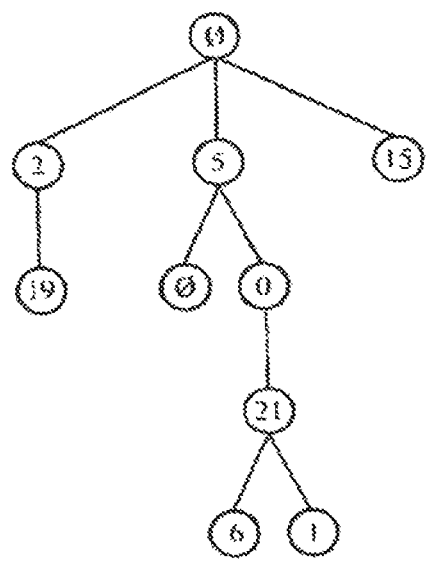
FIG. 8 is a schematic diagram illustrating another embodiment of a node labeled tree.

As previously noted, the claimed subject matter is not limited in scope to this particular example, however, as illustrated in more detail hereinafter, the tree illustrated in FIG. 7 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 1100, is illustrated in FIG. 7, comprises a node labeled tree rather than an edge labeled tree. Without belaboring the present discussion, a process of converting a node labeled tree such as that illustrated in FIG. 7 to a BELT may be found in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 11-16 therein.

In another embodiment, however, a particular tree may include null types or, more particularly, some node values denoted by the empty set. This is illustrated, for example, by the tree in FIG. 13, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 17-22 therein.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described above, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

FIG. 6 is a table that illustrates one particular embodiment of employing symbols, concatenated along one spatial dimension, here from left to right, by convention, to represent such a data hierarchy. The table includes four columns. The first column denotes natural numerals. The second column denotes binary strings. The third column denotes a one dimensional arrangement of symbols employed to represent the binary edge labeled trees for that particular position. Of course, as previously described in connection with prior embodiments, the claimed subject matter is not limited in scope to binary strings or binary edge labeled trees. Thus, in alternative embodiments, any tree may be represented with symbols organized in a one dimensional arrangement, as is demonstrated with this particular embodiment.

According to an embodiment, a finite number of trees may be enumerated from a finite number of nodes. For each tree enumerated from the finite number of nodes, a natural numeral may be associated with the enumerated tree based, at least in part, on an association between trees and natural numerals. For example, a set of fully configured, unordered trees may be enumerated from a finite number of nodes. The enumerated trees may then be represented by a corresponding set of natural numerals.

For this particular embodiment, a tree may be expressed as one or more "subtrees" coupled at the root node of the tree. A subtree is coupled to the root node of the tree by an edge and independently has properties of a tree, except that the subtree is part of a larger tree. For example, here, a subtree comprises at least a "root" node coupled by an edge to a root node of the tree. Additional nodes and edges may be coupled to the root node of the subtree. While a subtree may be coupled to a root node of a tree by an edge, the size and shape of the subtree may express information like that of a tree having the same size and shape as the subtree. The subtrees coupled together at the root node of a tree may be referred to as "subtree children" of the root node where a subtree may be referred to as a "subtree child" of the tree in this embodiment.

Figure 9:
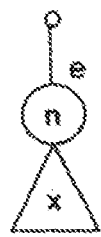
FIG. 9 is a schematic diagram illustrating a generalized representation of an embodiment of one or more subtrees according to an embodiment.

FIG. 9 is a schematic diagram illustrating a representation an embodiment of one or more subtrees connected via an edge having a label "e" with a subtree root node having a label "n." A value associated with the one or more subtrees may be represented by "x" which may represent information expressed as a natural numeral as illustrated above with reference to FIG. 4. However, this is merely an example of a representation of a subtree and the claimed subject matter is not limited in this respect. Accordingly, the value of the tree shown in FIG. 9 may be expressed as a push of the subtree having the value x. A push operation on the subtree may be represented in relation (1) as follows:

$$<j,k>\text{-push}(x) = P[kx+j-k+(2-r)], \text{ if } j<k \text{ and } k>0 \quad (1)$$

where:

$P(m)$=Kleene enumeration function for generating a sequence of non-composite numbers illustrated with reference to FIG. 5;

k=total number of values possible for a label;

j=actual computed label index value;

x=value of "pushed" subtree with edge "e" and root label "n";

r=defined value of tree system root/singleton node (either 0 or 1).

It should be noted that "j" is a function of the specific values of "e" (the specific edge label) and "n" (the specific node label). It should be understood that while the push operation of relation (1) is suitable for performing specific embodiments described herein, this push operation is merely an example of how a push operation may be performed on a subtree and the claimed subject matter is not limited in this respect.

In addition to applying the push operation to a single tree or subtree having a value x, the push operation may be applied to multiple tree or subtree elements of a set in relation (2) as follows:

$$<j,k>\text{-push}[\{a,b,c\}] = \{<j,k>\text{-push}(a)\} U\{<j,k>\text{-push}(b)\} U\{<j,k>\text{-push}(c)\} \quad (2)$$

where a, b and c are numerical representations of tree or subtree elements in the pushed set. The result of the operation of relation (2) may be referred to as a "pushed set" of tree or subtree elements.

Figure 10A:
FIGS. 10a, 10b, 11a and 11b are schematic diagrams illustrating applications of one embodiment of a push operation according to an embodiment.
Figure 10B:

FIGS. 10a, 10b, 11a and 11b illustrate applications of the push operation of relation (1) to specific subtrees. FIG. 10a shows a BELT having a value of "2". As such, x=2, k=2 and r=1. FIG. 10b illustrates the result of a push of the tree in FIG. 10a by an edge having a label zero (i.e., a zero-push). The value of j for this push operation is zero. Accordingly, the push operation provides a numeral associated with the pushed BELT as follows:

$$<j,k>\text{-push}(x) = P[2*2+0-2+2-1] = P[3] = 5.$$

Figure 11A:
Figure 11B:

FIG. 11a shows a structure-only tree (i.e., a tree with unlabeled elements) with two nodes having a value of x=2. As such, k=1 (since there are no labels) and r=1. FIG. 11b illustrates the result of a push of the tree in FIG. 11a by an unlabeled edge. The value of j is zero since there are no labels. Accordingly, the push operation determines a numeral associated with the pushed unlabeled tree as follows:

$$<j,k>\text{-push}(x) = P[1*2+0-1+2-1] = P[2] = 3.$$

A number of subtrees coupled to a root node of a tree may be configured from one or more "subtree slots." In this embodiment, a subtree slot represents a possible location of a subtree coupled to the root node of a larger tree. For a tree enumerated from a finite number N of nodes, a first node may serve as a root node while the remaining N−1 nodes may be configured into subtrees coupled to the root node. Up to N−1 subtrees may be formed from the remaining N−1 nodes (where each subtree contains a single node coupled to the root node by an edge). Accordingly, N−1 subtree slots may be identified for the set of trees enumerated from N nodes.

For any particular enumerated tree, according to an embodiment, an "arrangement of subtree slots" sets forth an unordered set of subtree slots having a subtree of at least one node. In enumerating a tree from N nodes, for example, one arrangement of subtree slots having a subtree in each of N−1 subtree slots yields a tree having a single node in each of N−1 subtree slots coupled to the root node by an edge. In another arrangement of subtree slots for a tree enumerated from N nodes, for example, a single subtree slot may contain all N−1 nodes. However, these are merely examples of arrangements of subtree slots and that other arrangements may be possible.

A subtree slot in an arrangement of subtree slots may have one or more nodes according to one or more "allocations of nodes" among the subtree slots defining a number of nodes in the subtree slot of the arrangement. In other words, such an allocation of nodes for an arrangement of subtree slots (i.e., the number of subtree slots having at least one node) sets forth the number nodes being allocated to each subtree slot. The nodes allocated to a subtree slot (e.g., according to an allocation of nodes among subtrees) may be set out in one or more possible, unordered configurations of a subtree where a possible configuration may represent a set of data and/or other information in a hierarchy of data using properties of a tree. In a particular embodiment, a configuration of a subtree may comprise a finite, rooted, connected, unordered acyclic graph as illustrated with reference to FIGS. 1-8.

According to an embodiment, a finite number of possible trees or subtrees may be enumerated from a finite number of N nodes. For any tree (or subtree) with N such nodes, there are N−1 available arrangements of subtree children. That is, for a tree (or subtree) with N nodes there may be any arrangement of zero to N−1 subtree children coupled to a root node. Accordingly, an arrangement of subtree children may define up to N−1 subtree slots that may be coupled or merged at a root node of the tree. For any particular arrangement of subtree children (e.g., represented as a count of the number of subtree slots with at least one node coupled to a root node) an allocation of nodes may be expressed as an unordered set containing N−1 elements where an element of the unordered set defines 0 to N−1 nodes for a corresponding subtree slot. An element of the unordered set may represent a count (ranging from 0 to N−1) of a number of nodes being allocated to the corresponding subtree slot. The sum of the counts represented by the elements may then equal N−1.

For any particular allocation of nodes among one or more subtree slots in an arrangement of subtree slots, there may be one or more possible "fully configured trees" defining a relationship among the allocated nodes using each of the allocated nodes. Such a fully configured tree may represent hierarchical data in a finite, rooted, connected, unordered, acyclic graph. Similarly, for an allocation of nodes to a subtree slot, the fully configured tree may comprise a corresponding subtree child representing hierarchical data in a finite, rooted, connected, unordered, acyclic graph. Notation "{FTs: N}" provides a shorthand notation for this particular embodiment to indicate the set of all fully configured trees that may possibly be configured from exactly N nodes under a given set of conditions (e.g., parameters characterizing the type of tree such as k, j, and r as described above in connection with the push operation of relation (1)) Of course, this is merely an example of how a set of fully configured trees from exactly N nodes may be characterized and the claimed subject matter is not limited to this particular approach.

Figure 12:
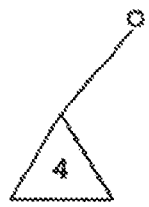
FIGS. 12 through 16 are schematic diagrams illustrating allocations of five nodes among subtree slots for trees having five nodes according to an embodiment.
Figure 13:
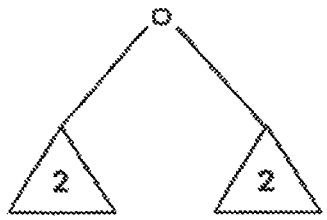
Figure 14:
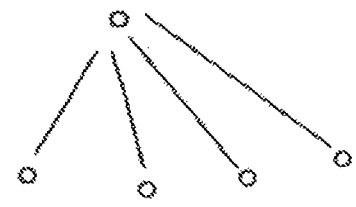
Figure 15:
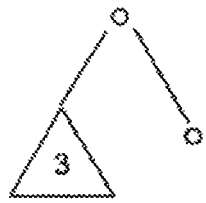
Figure 16:
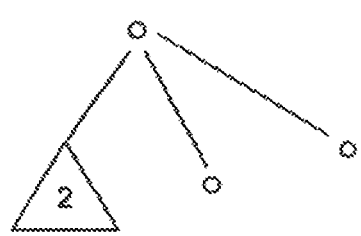

However, continuing with this example, as illustrated in FIGS. 12 through 16, for example, a tree with five nodes may have one to four subtrees where each subtree includes at least one of the five nodes. FIG. 12 shows a single subtree with four nodes, FIGS. 13 and 15 two subtrees, FIG. 16 shows three subtrees and FIG. 14 shows four subtrees.

For any particular arrangement of subtrees with a finite number of nodes, the arrangement may be characterized as having one or more possible allocations of the nodes among the subtrees in the arrangement. Table 1 below illustrates five allocations of five nodes among subtrees among arrangements of one to four subtree slots.

TABLE 1

Allocation of Nodes ($A_i$) Among Subtree Slots

| Allocation Number (i) | Subtree Slots (m) | | | |
|---|---|---|---|---|
| | 0 | 1 | 2 | 3 |
| 0 | 4 | 0 | 0 | 0 |
| 1 | 3 | 1 | 0 | 0 |
| 2 | 2 | 2 | 0 | 0 |
| 3 | 2 | 1 | 1 | 0 |
| 4 | 1 | 1 | 1 | 1 |

For this embodiment, an allocation defines a set of unordered elements. Thus, it should be understood that the ordering of allocations of specific quantities of nodes to particular subtree slots (numbered 0 to 3) outlined in Table 1 is arbitrary and that there are other ways to sequence the allocation of nodes among subtree slots. For this particular example, allocation 0 indicates the allocation of four nodes to a single subtree slot 4. The allocation merely represents the allocation of four nodes to a single subtree slot, irrespective of the particularly numbered subtree slot. Accordingly, duplicate entries of four nodes being allocated to either of subtree slot 1, 2 or 3 are not represented in Table 1. Similarly, allocation 2 of this particular example indicates the allocation of two nodes to subtree slot 0 and two nodes to subtree slot 1. This allocation merely represents the allocation of two nodes to a first subtree slot and two nodes to a second, different, subtree slot. Accordingly, duplicate entries of two nodes being allocated to each of slots 2 and 3, among others, are not represented in Table 1.

According to one embodiment, a merger operation discussed above (for combining trees at their root nodes to provide a graphical and numerical expression of the resulting merged tree) may be expanded to create a set merger operation to include a merger among trees in different sets of trees. Here, a member tree of a first set merges with a member tree of a second set to provide a third, merged set containing the merged trees as elements, for all members of both sets. Regarding the representation of the trees as natural numerals, the set merger operation to merge sets X and Y may be expressed as follows:

$$X \times Y = \{x_1, x_2, x_3, \ldots, x_n\} \times \{y_1, y_2, y_3, \ldots, y_m\} = = \{x_1{}^*y_1, x_1{}^*y_2, x_1{}^*y_3, \ldots, x_1{}^*y_m\} U\{x_2{}^*y_1, x_2{}^*y_2, x_2{}^*y_3, \ldots, x_1{}^*y_m\} U\{x_3{}^*y_2, x_3{}^*y_3, x_2{}^*y_3, x_3{}^*y_3, \ldots, x_3{}^*y_m\} U \ldots U\{x_n{}^*y_1, x_n{}^*y_2, x_n{}^*y_3, \ldots, x_n{}^*y_m\} \quad (3)$$

where:

$x_1, x_2, x_3, \ldots x_n$ are the natural numerals representing trees in set X; and $y_1, y_2, y_3, \ldots y_m$ are the natural numerals representing trees in set Y;

Using the set merger operation illustrated at relation (3), for this particular embodiment, the merger of sets {FTs: N} and {FTs: M}, representing all trees which may be enumerated from N and M nodes, respectively, provides a set of trees enumerating all trees formed by the merger of any tree in {FTs: N} with any tree in {FTs: M}.

Figure 17:
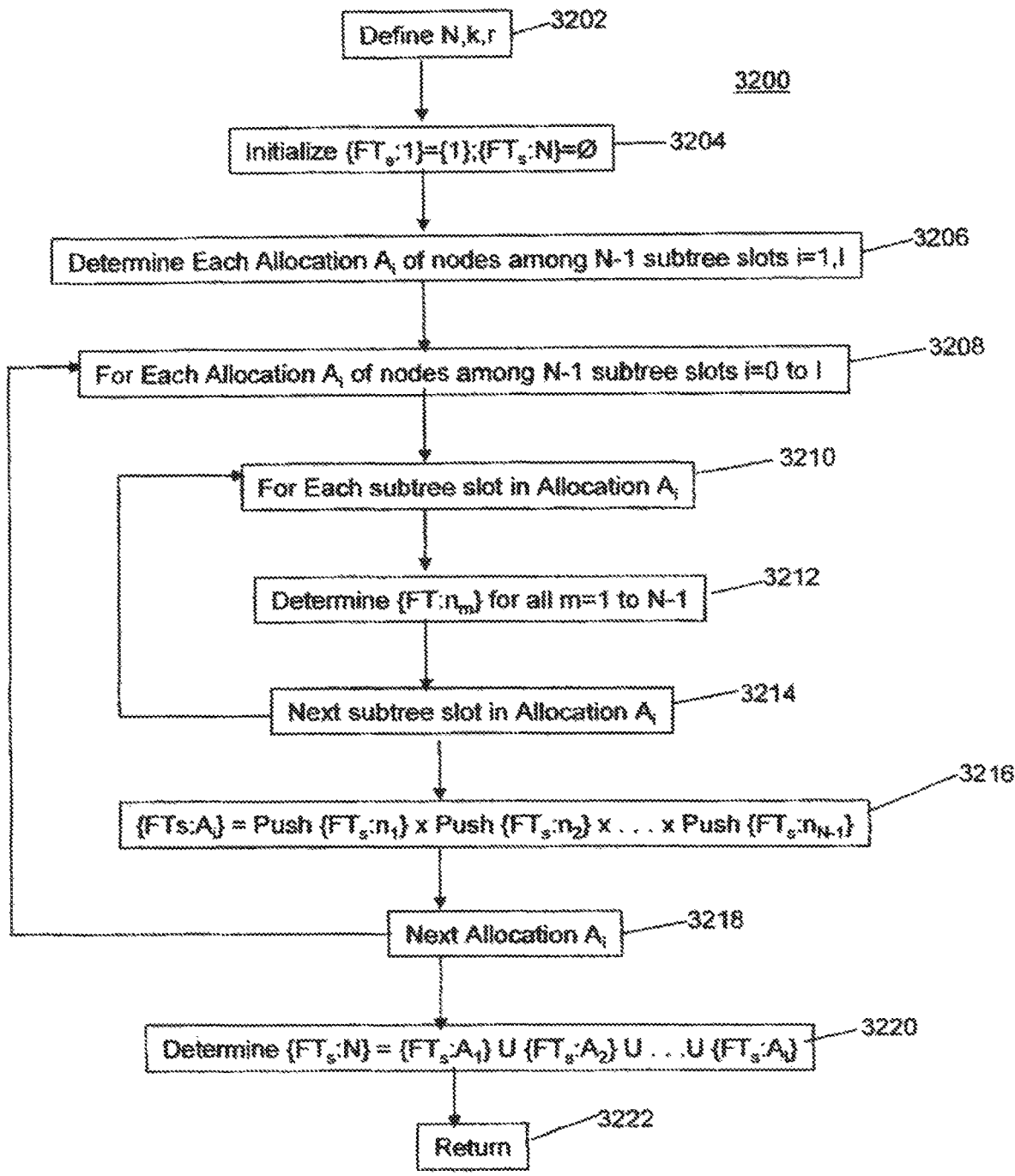
FIG. 17 is a flow diagram illustrating a process to enumerate all trees which are configurable from a finite number of nodes according to an embodiment.

FIG. 17 is a flow diagram illustrating an embodiment of a process 3200 for enumerating trees which may possibly be configured from an N number of nodes {FTs: N} (under a given set of conditions) and determining a corresponding unique natural numerals for representing the particular enumerated trees. The process 3200 may be implemented as a computer program or subroutine expressed as machine-readable instructions which are executable by a processor. However, the claimed subject matter is not limited in scope in this respect.

Block 3202 defines parameters indicating the size and type of trees that are to be enumerated. N determines the number of nodes in the enumerated trees. The parameters r and k determine the defined value of the enumerated tree system and total number of values possible for a label as indicated for the push operation of relation (1). Block 3204 initializes full tree set {FTs: 1}={1} to represent a natural numeral for a single root node. As discussed below, in this particular example, the enumerated trees are generated from applying a push operation of relation (1) to the single root node. It should be understood, however, that the single root node may be associated with a different natural numeral and the claimed subject matter is not limited in this respect. Block 3204 also initializes full tree set {FTs: N}=∅ to indicate a set that initially contains no elements to which elements are to be added through the subsequent execution of blocks 3206 through 3220.

Block 3206 determines an allocation $A_i$ of nodes among up to N−1 subtree slots as illustrated in the example of Table 1 above. In the example of Table 1, allocation $A_i$ for i=0 to 4 represents an allocation of four nodes among up to four subtrees. For allocations $A_i$, a loop defined by blocks 3208 through 3218 determines a set containing trees that may be enumerated for the allocation A (denoted as "{FTs: $A_i$}") and an associated natural numeral for the particular enumerated tree in {FTs: $A_i$}. A subtree slot m (where m=0 to N−1) in $A_i$ includes a number of nodes $n_m$ (from 0 to N−1). For a subtree slot in $A_i$, a loop defined by blocks 3210 through 3214 enumerates the set of all fully configured trees that may be configured from $n_m$ nodes {FTs: $n_m$}. Block 3212 may determine {FTs: $n_m$} by recursively executing the described process 3200 using the argument of $n_m$ as N in block 3202 of the recursively executed process 3200 (while maintaining the parameters k and r in block 3202 of the recursively executed process 3200).

Block 3216 determines the set {FTs: $A_i$} based, at least in part, upon the sets {FTs: $n_m$}, m=0 to N−1, determined in the loop of blocks 3210 through 3214. For a set {FTs: $n_m$}, block 3216 determines the push of this set according to the push operation of relation (2). As discussed above with reference to FIG. 9, a result of the push operation of relation (1) may depend on particular information associated with edge or node labels coupling the pushed subtree to a root node. In the case of a BELT, for example, the pushed subtree may be coupled to the root node by an edge labeled one or zero. Thus, in this particular example, to enumerate all trees resulting from a pushed binary edge labeled subtree, the push operation of relation (1) may be applied with j=0 (e.g., a zero-push) to enumerate a first resulting tree and with j=1 (e.g., a one-push) to enumerate a second resulting tree. Similarly, in the application of the push operation of relation (2) to a set of tree elements, the resulting enumerated pushed tree element may depend on particular information associated with edge or node labels coupling the pushed tree element to a root node. Thus, in this particular example, to enumerate all trees resulting from the application of push operation of relation (2) to a set of tree elements, block 3216 provides a union of j-push{FTs: $n_m$) sets for all possible values of j (e.g., for all j=0 to k). In the case of enumerating all BELTs from N nodes, for example, the operation "Push{FTs: $n_m$}" as shown in block 3216 refers to the union of zero-push{FTs: $n_m$} and one-pushFTs: $n_m$}. For the enumeration of trees with edge labels having more than two possible values, however, the operation "Push{FTs: $n_m$}" may refer to the union of more than two such pushed sets (i.e., a union of pushed sets for each possible value for j). Block 3216 then merges the pushed sets {FTs: $n_m$} using the set merger operation as shown in relation (3). Block 3220 then determines {FTs: N} as an unordered combination of the trees enumerated for all allocations $A_i$ of N−1 nodes determined at block 3216. In this particular example, {FTs: N} is determined as the union of the sets {FTs: $A_i$} determined at blocks 3208 through 3218.

An example of enumerating a tree from a finite number of nodes and determining a natural numeral for these trees in connection with process 3200 is illustrated with reference to FIGS. 18 through 25 in which the number of nodes for each enumerated tree is N=4. In this particular example, the enumerated trees will be BELTs, defining, for this particular embodiment, the initial conditions to include k=2 and r=1 in the push operation of relation (2). However, this is merely an example of a tree that may have N nodes and the presently illustrated embodiment may be applied to the enumeration of differently labeled trees. For example, the presently illustrated example may be extended to non-BELT trees by selecting different values for "k" and r for the push operation of relation (2). However, a push operation other than that of relation (2) may be employed depending on the particular embodiment.

In an initial operation, {FTs: 4}=Ø. In a base operation, {FTs: 1}={1}. A distribution list for {FTs: 4} provides possible allocations of N (here, four) nodes among up to N−1 (here, three) subtree slots is shown in Table 2 below (as determined at block 3206):

TABLE 2

Allocation of N-1 (Three) Nodes Among up to N-1 Subtree Slots

| Allocation | Subtree Slots | | |
|---|---|---|---|
| Number | 0 | 1 | 2 |
| 0 | 3 | 0 | 0 |
| 1 | 2 | 1 | 0 |
| 2 | 1 | 1 | 1 |

In the allocations of three nodes among subtree slots of Table 2, an allocation may allocate to a subtree slot one, two or all three nodes. Thus, for any of these subtree slots, the process 3200 may enumerate sets of fully configured subtrees for these allocations of one, two or all three nodes to a subtree slot as {FTs: 1} (determined as {1} in the base operation), {FTs: 2} and {FTs: 3}, respectively. Block 3212 may recursively determine values for these sets. For {FTs: 3}, a distribution list setting forth possible allocations of three nodes among two subtree slots is shown in Table 3 below:

TABLE 3

Allocation of Two Nodes Among Two Subtree Slots

| Allocation | Subtree Slots | |
|---|---|---|
| Number | 0 | 1 |
| 0 | 2 | 0 |
| 1 | 1 | 1 |

Figure 18:
FIG. 18 is a schematic diagram illustrating a distribution of one unique allocation of a single node depending from a root node.

For {FTs: 2}, there is one unique allocation of a single node depending from a root node in a single subtree slot and provides a subtree as shown in FIG. 18. The push operation is then applied to determine the elements of {FTs: 2} Since the possible subtree structures are BELTs (here, with k=1), {FTs: 2} is expressed as the union of a zero-push and one-push values as follows:

$$\{<j=0,k=1>\text{-push}[\{1\}]\} U \{<j=1,k=1>\text{-push}[\{1\}]\}$$

$$=\{<j=0,k=1>\text{-push}(1)\} U \{<j=1,k=1>\text{-push}(1)\}$$

$$=\{P(1) U P(2)\}=\{2,3\}$$

Figure 19:
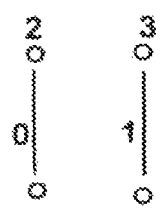
FIG. 19 is a schematic diagram illustrating BELTs that may be configured from two nodes.

These enumerated trees in {FTs: 2} are shown in FIG. 19. Since there is only one allocation of nodes to a single subtree slot for {FTs: 2}, there is no merger operation for determining the elements of {FTs: 2}.

Figure 20:
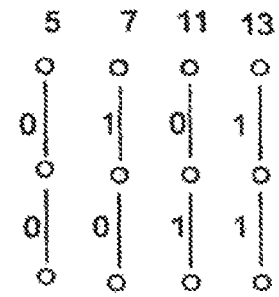
FIGS. 20 through 22 are schematic diagrams illustrating BELTs that may be configured from three nodes.

To determine the elements of {FTs: 3}, a first component of elements is determined from the allocation of two nodes to a single subtree slot (as shown in allocation 0 of Table 3) and a second component of elements is determined from the allocation of a single node to two subtree slots (as shown in allocation 0 of Table 3). Regarding the first component of {FTs: 3}, these two nodes allocated to a single subtree slot may be formed in four different binary edge labeled strings as illustrated in FIG. 20. These binary edge labeled strings are, in effect, either a zero-push or one-push of the trees enumerated in {FTs: 2}={2, 3}. As such, the set of values for these trees may be enumerated as follows:

$$\{<j=0,k=1>\text{-push}[\{2,3\}]\} U \{<j=1,k=1>\text{-push}[\{2,3\}]\}$$

$$\{<j=0,k=1>\text{-push}(2)\} U \{<j=1,k=1>\text{-push}(2)\} U$$

$$\{<j=0,k=1>\text{-push}(3)\} U \{<j=1,k=1>\text{-push}(3)\}$$

$$=(5,7,11,13)$$

Figure 21:
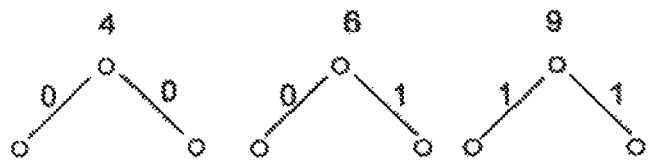

The second, remaining component of elements of {FTs: 3}, may be represented in three different BELTs as illustrated in FIG. 21. As such, the set of values for these trees may be enumerated by performing a set merger operation of {FT: 2} (as shown in FIG. 19) with itself as follows (block 3216):

$$\{FT:2\} \times \{FT:2\}=\{2,3\} \times \{2,3\}=\{2*2,2*3,3*3\}=\{4,6, 9\}$$

Figure 22:
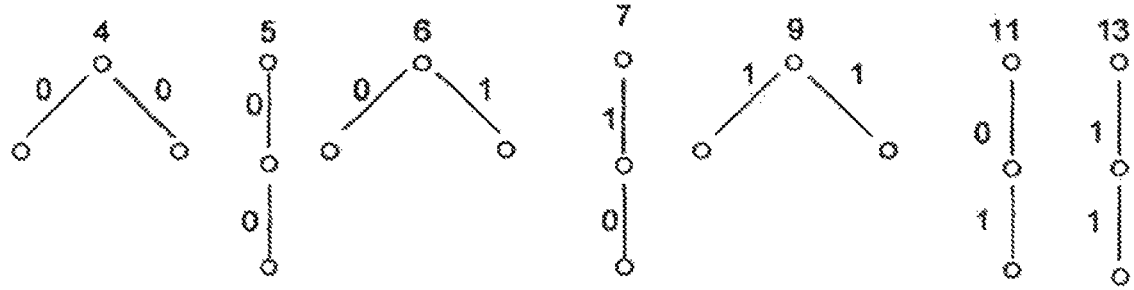
Figure 23:
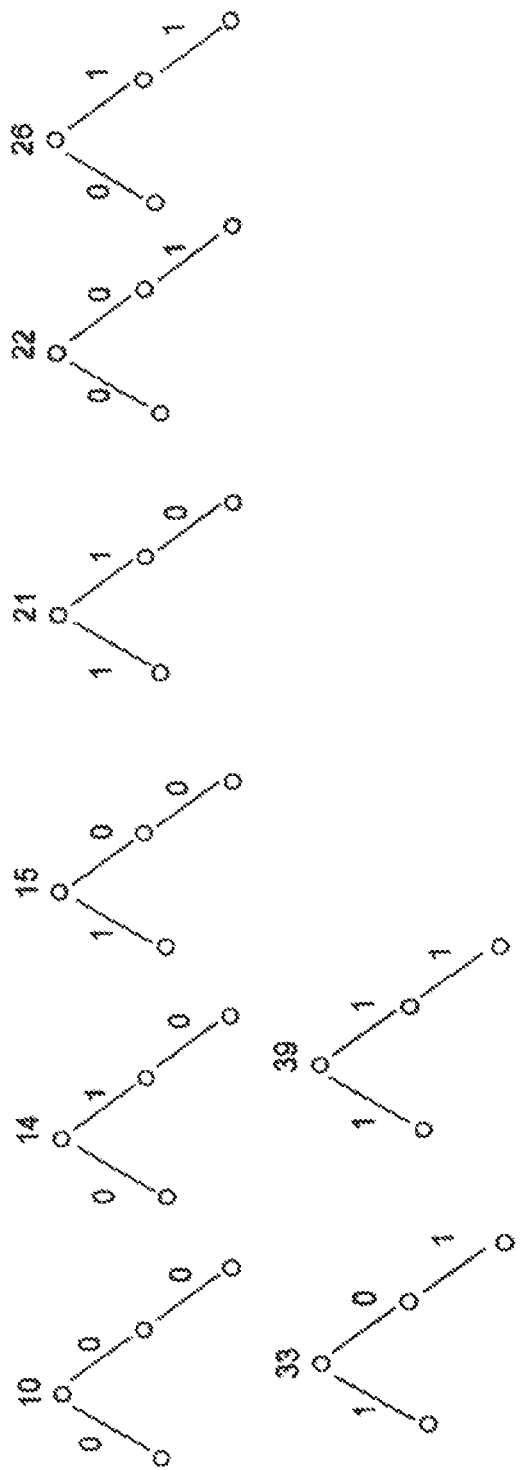
FIGS. 23 through 25 are schematic diagrams illustrating BELTs that may be configured from four nodes.
Figure 24:
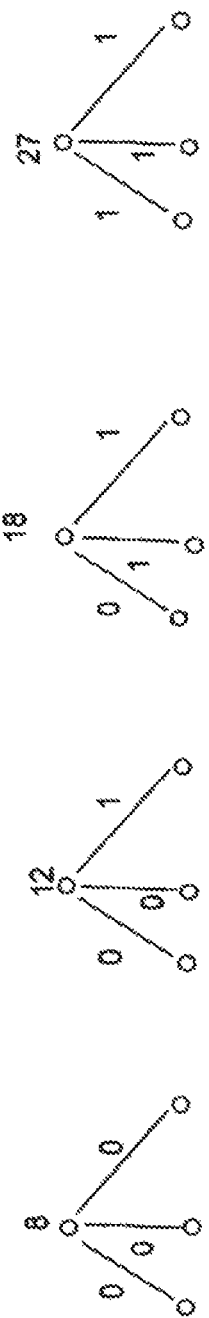
Figure 25:
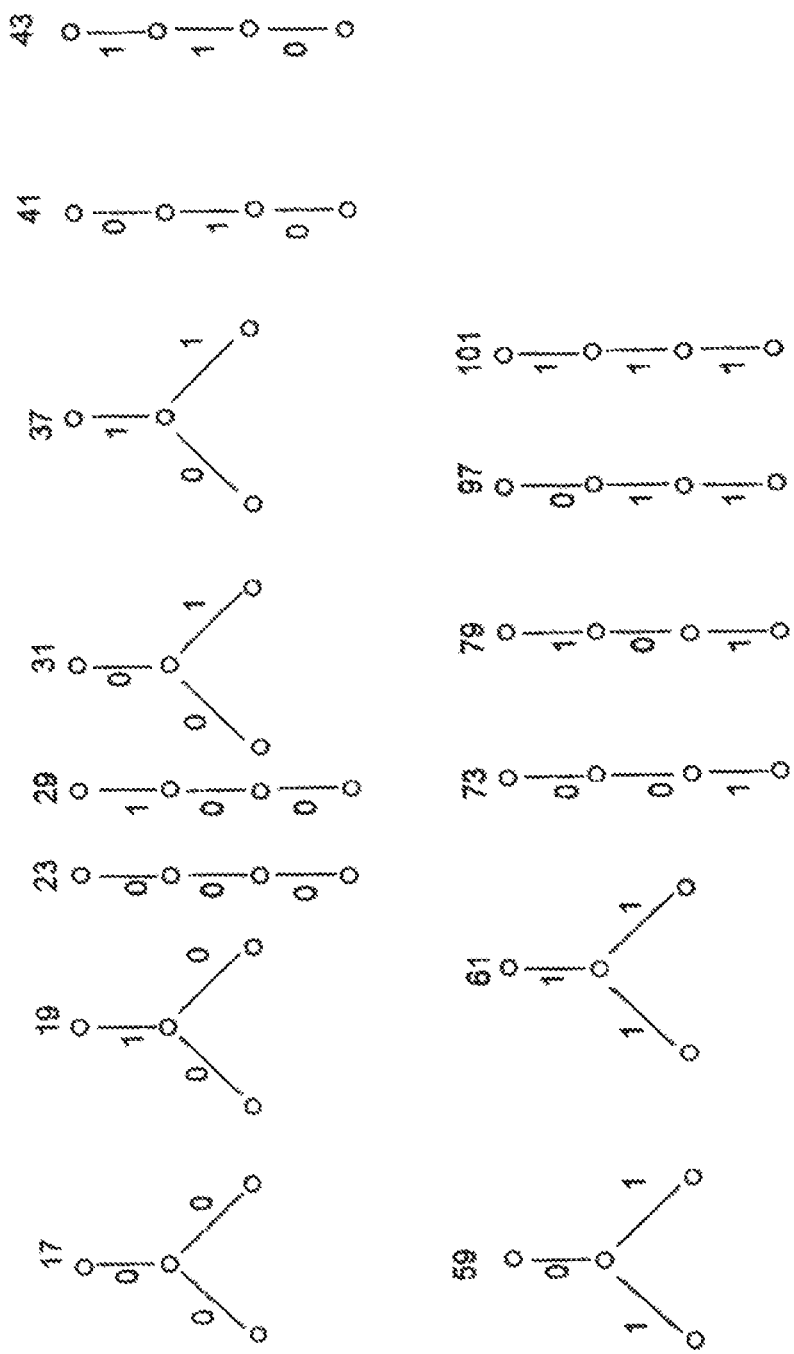

Accordingly, the union of the elements from first and second components of {FT: 3} (as derived above from the allocations 0 and 1 in Table 3) provides {FTs: 3}={4, 5, 6, 7, 9, 11, 13}. As shown in FIG. 22, each of these elements correspond with a unique subtree in {FTs: 3} and is associated with a corresponding natural numeral.

To determine the elements of {FTs: 4}, a first component of the elements is determined from the allocation of three nodes a single subtree slot (as shown in allocation 0 of Table 2), a second component of the elements is determined from the allocation of two nodes to a first subtree slot and one node to a second subtree slot (as shown in allocation 1 of Table 2) and a third component of the elements is determined from the allocation of a single node to three subtree slots (as shown in allocation 2 of Table 2). {FTs: 4} comprises the union of these three components.

The elements of the first component of {FTs: 4}, derived from the allocation of three nodes allocated to a single subtree slot, comprises, in effect, a union of a zero-push and one-push of {FTs: 3} (={4, 5, 6, 7, 9, 11, 13} as derived above and graphically illustrated in FIG. 22). These elements of the first component of {FTs: 4} are depicted graphically in FIG. 25 and are enumerated as follows:

$\{<j=0,k=1>\text{-push}[\{FTs{:}3\}]\}U\{<j=1,k=1>\text{-push}[\{FTs{:}3\}]\}$ $=\{<j=0,k=1>\text{-push}[\{4,5,6,7,9,11,13\}]\}U\{<j=1,k=1>\text{-push}[\{4,5,6,7,9,11,13\}]\}$ $=\{<j=0,k=1>\text{-push}(4)\}U\{<j=1,k=1>\text{-push}(4)\}U$ $\{<j=0,k=1>\text{-push}(5)\}U\{<j=1,k=1>\text{-push}(5)\}U$ $\{<j=0,k=1>\text{-push}(6)\}U\{<j=1,k=1>\text{-push}(6)\}U$ $\{<j=0,k=1>\text{-push}(7)\}U\{<j=1,k=1>\text{-push}(7)\}U$ $\{<j=0,k=1>\text{-push}(9)\}U\{<j=1,k=1>\text{-push}(9)\}U$ $\{<j=0,k=1>\text{-push}(11)\}U\{<j=1,k=1>\text{-push}(11)\}U$ $\{<j=0,k=1>\text{-push}(13)\}U\{<j=1,k=1>\text{-push}(13)\}$ $=\{17,19,23,29,31,37,41,43,59,61,73,79,97,101\}.$ The elements of the second component of {FTs: 4} are derived from the allocation of two nodes to a first subtree slot and a single node to a second subtree slot. These elements comprise, in effect, a set merger of {zero-push[{FTs: 2}] U one-push[{FTs: 2}]}(graphically illustrated in FIG. 20) and {zero-push[{FTs: 1}] U one-push[{FTs: 1}])}(graphically illustrated in FIG. 19). The elements from the resulting set merger operation are graphically illustrated in FIG. 23 and the corresponding numbers representing the resulting elements are determined as follows (block 3216):

$\{<j=0,k=1>\text{-push}[\{FTs{:}2\}]U<j=1,k=1>\text{-push}[\{FTs{:}2\}]\}\times$ $\{<j=0,k=1>\text{-push}[\{FTs{:}1\}]U<j=1,k=1>\text{-push}[\{FTs{:}1\}]\}$ $=\{<j=0,k=1>\text{-push}[\{2,3\}]U<j=1,k=1>\text{-push}[\{2,3\}]\}\times$ $\{<j=0,k=1>\text{-push}[\{1\}]U<j=1,k=1>\text{-push}[\{1\}]\}$ $=\{5,7,11,13\}\times\{2,3\}$ $=\{10,14,15,21,22,26,33,39\}$ The elements of the third component of the elements of {FTs: 4} are derived from the allocation of a single node to each of three subtree slots. These elements are, in effect, a set merger operation of {zero-push[{FTs: 1}] U one-push [{FTs: 1}]} (as graphically illustrated in FIG. 19) with itself twice. The elements from the resulting set merger operation are graphically illustrated in FIG. 24 and the corresponding numerals representing the elements are determined as follows (block 3216):

$\{<j=0,k=1>\text{-push}[\{FTs{:}1\}]U<j=1,k=1>\text{-push}[\{FTs{:}1\}]\}\times$ $\{<j=0,k=1>\text{-push}[\{FTs{:}1\}]U<j=1,k=1>\text{-push}[\{FTs{:}1\}]\}\times$ $\{<j=0,k=1>\text{-push}[\{FTs{:}1\}]U<j=1,k=1>\text{-push}[\{FTs{:}1\}]\}$ $=\{2,3\}\times[\{2,3\}\times\{2,3\}]=\{2,3\}\times\{4,6,9\}$ $=\{8,12,18,27\}$ The union of the first, second and third components of the elements of {FTs: 4}, separately derived from allocations 0, 1 and 3 of three nodes among subtree slots (block 3220), is provided as follows:

$\{FTs{:}4\}=\{17,19,23,29,31,37,41,43,59,61,73,79,97,101\}U$ $\{10,14,15,21,22,26,33,39\}U\{8,12,18,27\}$ $=\{8,10,12,14,15,17,18,19,21,22,23,26,27,29,31,33,37,39,41,43,59,61,73,79,97,101\}.$

While the above illustrated example is a specific case of enumerating BELTs from four nodes, it should be understood that the process 3200 is general enough to enumerate trees for any finite number of nodes N. Also, while the illustrated example is specifically directed to enumerating BELTs, the claimed subject matter is not limited to this specific example.

According to an embodiment, the technique described above may have many applications in the management and/or manipulation of hierarchical data. The ability to enumerate possible fully configured trees from a finite number of nodes may be applied to any one of several database management applications. In one example, with a priori knowledge of a size and type of tree representing hierarchical data in a cache memory, for example, a cache process may anticipate the extent of requests for retrieval of hierarchical data represented by a tree.

In another application, pattern matching may be used as a form of answering queries. Using the above described technique for enumerating possible trees from a finite number of nodes, possible tree patterns may be efficiently generated in advance of receipt of a query to be matched with one of the generated tree patterns. Here, for example, a set of enumerated trees may be generated prior to a query to anticipate all potential hierarchical relationships for a given set of data. The query may then be mapped and matched with all possible tree structures with a given number of nodes. By anticipating all potential hierarchical relationships in advance of the query, the query may be answered more quickly. Of course, these are merely examples and the claimed subject matter is not limited to these examples.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of generating complex two-dimensional graphical hierarchies for more convenient processing and/or storage, a complex two-dimensional graphical hierarchy being in a form of a tree hierarchy, the method comprising:
   accessing instructions from one or more physical memory devices for execution by one or more processors;
   executing instructions accessed from the one or more physical memory devices by the one or more processors;
   storing, in the at least one of the physical memory devices, signal values resulting from having executed the instructions on the one or more processors, wherein the one or more physical memory devices also store a database or a portion thereof;
   wherein the accessed instructions to transform the database, or the portion thereof, to one or more tree hierarchies; and
   wherein executing the accessed instructions further comprises:
   generating at least some tree hierarchy structures and associated tree label values;
   determining, for the at least some tree hierarchy structures and the associated tree label values that were generated, symbol values associated therewith;
   storing, in the at least one of the physical memory devices, the symbol values; and
   for respective ones of the at least some tree hierarchy structures and the associated tree label values,
   identifying subtree hierarchies coupled to a root node.

2. The method of claim 1, wherein the symbol values comprise numerical values, the method further comprising:
   associating the generated at least some tree hierarchy structures and the associated tree label values with the numerical values.

3. The method of claim 2, wherein a numerical value is associated with a tree hierarchy structure and the associated tree label values of the at least some tree hierarchy structures and the associated tree label values are based, at least in part, upon numerical values associated with particular subtree hierarchies generated from the tree hierarchy structure.

4. The method of claim 2, further comprising: comparing a numerical value representing a tree hierarchy structure and associated tree label values to other numerical values stored in the database, or the portion thereof, in the one or more physical memory devices to detect a presence of the numerical value, wherein a correspondence between the numerical value and at least one of the other numerical values in the database, or the portion thereof, is indicative of a presence of content in electronic content corresponding to the at least one of the other numerical values stored in the database, or the portion thereof, and is indicative of one or more locations thereof in the database, or the portion thereof.

5. The method of claim 1, wherein the symbol values comprise numerical values, and the method further comprising:
   identifying the at least some generated tree hierarchy structures and associated tree label values as respectively being a composite of subtree hierarchies according to an arrangement of subtree hierarchies, the subtree hierarchies in the composite of subtree hierarchies respectively being associated with the numerical values based, at least in part, upon an association, and wherein the numerical values associated with the at least some tree hierarchy structures and the associated tree label values comprises a combination of the numerical values associated with the subtree hierarchies in the composite of subtree hierarchies.

6. The method of claim 1, further comprising: comparing a symbol value representing a tree hierarchy structure and associated tree label values to other symbol values stored in the database, or the portion thereof, in the one or more physical memory devices to detect a presence of the symbol value, wherein a correspondence between the symbol value and at least one of the other symbol values in the database, or the portion thereof, is indicative of a presence of content in electronic content corresponding to the at least one of the other symbol values stored in the database, or the portion thereof, and is indicative of one or more locations thereof in the database, or the portion thereof.

7. An apparatus to generate a complex two-dimensional graphical hierarchy for more convenient processing and/or storage, a complex two-dimensional graphical hierarchy being in a form of a tree hierarchy, the apparatus comprising:
   means for accessing instructions from one or more physical memory devices for execution by one or more processors;
   means for executing instructions accessed from the one or more physical memory devices by the one or more processors;
   means for storing, in at least one of the physical memory devices, signal values resulting from having executed the instructions on the one or more processors, wherein the one or more physical memory devices also store a database, or a portion thereof;

wherein the accessed instructions to transform the database, or the portion thereof, to tree hierarchies; and wherein the means for executing the accessed instructions comprises:

means for generating at least some tree hierarchy structures and associated tree label values;

means for determining, for the at least some tree hierarchy structures and the associated tree label values that were generated, symbol values associated therewith; and means for storing, in the at least one of the physical memory devices, the symbol values, wherein the means for generating the at least some tree hierarchy structures and the associated tree label values comprises for respective ones of the at least some tree hierarchy structures and the associated tree label values:

means for identifying subtree hierarchies coupled to a root node.

8. The apparatus of claim 7, the symbol values comprising numerical values and the apparatus further comprising:

means for associating the generated at least some tree hierarchy structures and the associated tree label values with the numerical values.

9. The apparatus of claim 8, wherein a numerical value is associated with a tree hierarchy structure and the associated tree label values of the at least some tree hierarchy structures and the associated tree label values are based, at least in part, upon numerical values associated with at least some subtree hierarchies generated from the at least some tree hierarchy structures.

10. The apparatus of claim 7, the symbol values comprising numerical values and the apparatus further comprising:

means for identifying the at least some generated tree hierarchy structures and the associated tree label values as respectively being a composite of subtree hierarchies according to an arrangement of subtree hierarchies, the subtree hierarchies, in the composite of subtree hierarchies, respectively being associated with the numerical values based, at least in part, upon an association, and wherein a numerical value associated with the tree hierarchy and associated tree label values comprises a combination of the numerical values associated with the subtree hierarchies in the composite of subtree hierarchies.

11. The apparatus of claim 7, further comprising a means for comparing a symbol value representing a tree hierarchy structure and associated tree label values to other symbol values, stored in the database, or the portion thereof, in the one or more physical memory devices to detect a presence of the symbol value, wherein a correspondence between the symbol value and at least one of other symbol values in the database, or the portion thereof, is indicative of a presence of content in electronic content corresponding to the at least one of the other symbol values stored in the database, or the portion thereof, and is indicative of one or more locations thereof in the database, or the portion thereof.

12. The apparatus of claim 7, further comprising: means for comparing a numerical value representing a tree hierarchy structure and associated tree label values to other numerical values stored in the database, or the portion thereof, in the one or more physical memory devices to detect a presence of the numerical value, wherein a correspondence between the numerical values and at least one of the other numerical values in the database, or the portion thereof, is indicative of a presence of content in electronic content corresponding to the at least one of the other numerical values stored in the database, or the portion thereof, and is indicative of one or more locations thereof in the database, or the portion thereof.

13. An apparatus comprising:

one or more processors coupled to one or more physical memory devices to store executable instructions and to store binary digital signal quantities as physical memory states, wherein the executable instructions being accessible from the physical memory devices for execution by one or more processors; and the one or more processors being able to store in at least one of the physical memory devices, the binary digital signal quantities, if any, that are to result from execution of the instructions on the one or more processors, wherein the one or more physical memory devices also store a database or a portion thereof and wherein the executable instructions being accessible from the physical memory devices to transform the database, or portion thereof, to one or more tree hierarchies; and wherein the executable instructions further to:

generate at least some tree hierarchy structures and associated tree label values;

determine, for the at least some tree hierarchy structures and the associated tree label values that were generated, symbol values to be associated therewith;

store, in the at least one of the physical memory devices, the symbol values; and for respective ones of the at least some tree hierarchy structures and the associated tree label values, identify subtree hierarchies to be coupled to a root node.

14. The apparatus of claim 13, wherein the symbol values to comprise numerical values and the executable instructions further to:

associate the to be generated at least some tree hierarchy structures and associated tree label values with the numerical values.

15. The apparatus of claim 14, wherein a numerical value is associated with a tree hierarchy structure and the associated tree label values of the at least some tree hierarchy structures and the associated tree label values are to be based, at least in part, upon numerical values which is associated with at least some subtree hierarchies being generated from the tree hierarchy structure.

16. The apparatus of claim 14, wherein the tree hierarchy generation instructions to further comprise executable instructions to compare a numerical value representing a tree hierarchy structure and associated tree label values to other numerical values stored in the database, or the portion thereof, in the one or more physical memory devices to detect a presence of the numerical value, wherein a correspondence between the numerical values and at least one of the other numerical values in the database, or the portion thereof, is indicative of a presence of content in electronic content corresponding to the at least one of the other numerical values stored in the database, or the portion thereof, and is indicative of one or more locations thereof in the database, or the portion thereof.

17. The apparatus of claim 13, wherein the symbol values to comprise numerical values and the executable instructions further to:

identify the at least some generated tree hierarchy structures and the associated tree label values as respectively being a composite of subtree hierarchies according to arrangements of subtree hierarchies, the subtree hierarchies in the composite of subtree hierarchies respectively being associated with the numerical values to be based, at least in part, upon an association, and wherein the numerical values to be associated with the at least some tree hierarchy structures and associated tree label values to comprise a combination of the numerical values to be associated with the subtree hierarchies in the composite of subtree hierarchies.

18. The apparatus of claim 13, wherein the tree hierarchy generation instructions to further comprise executable instructions to compare a symbol value representing a tree hierarchy structure and associated tree label values to other symbol values stored in the database, or the portion thereof, in the one or more physical memory devices to detect a presence of the symbol value, wherein a correspondence between the symbol values and at least one of the other symbol values in the database, or the portion thereof, is to be indicative of a presence of content in electronic content corresponding to the at least one of the other symbol values stored in the database, or the portion thereof, and is to be indicative of one or more locations thereof in the database, or the portion thereof.

19. An article comprising:
a non-transitory storage medium comprising instructions stored thereon, wherein the instructions being accessible from the non-transitory storage medium stored as physical memory states on one or more physical memory devices, the one or more physical memory devices to be coupled to one or more processors able to execute the instructions stored as physical memory states, the one or more physical memory devices also able to store binary digital signals quantities, if any, as physical memory states, that are to result from execution of the instructions on the one or more processors, wherein the one or more physical memory devices also store a database, or a portion thereof;
wherein the executable instructions to transform the database, or the portion thereof, to one or more tree hierarchies; and
wherein tree hierarchy transformation instructions further to:
generate at least some tree hierarchy structures and associated tree label values;
determine, for the at least some tree hierarchy structures and the associated tree label values that were generated, symbol values to be associated therewith;
store, in the at least one of the physical memory devices, the symbol values; and
for respective ones of the at least some tree hierarchy structures and the associated tree label values,
identify subtree hierarchies to be coupled to a root node.

20. The article of claim 19, the symbol values to comprise numerical values and the instructions being further executable by the one or more processors to:
associate the to be generated at least some hierarchy structures and associated tree label values with the numerical values.

21. The article of claim 20, wherein a numerical value to be associated with a tree hierarchy structure and associated tree label values of the at least some tree hierarchy structures and associated tree label values are to be based, at least in part, upon numerical values to be associated with particular subtree hierarchies to be generated from the tree hierarchy structure.

22. The article of claim 20, wherein the tree hierarchy generation instructions to further comprise executable instructions to compare a numerical value representing a tree hierarchy structure and associated tree label values to other numerical values stored in the database, or the portion thereof, in the one or more physical memory devices to detect a presence of the numerical value, wherein a correspondence between the numerical value and at least one of the other numerical values in the database, or the portion thereof, is indicative of a presence of content in electronic content corresponding to the at least one of the other numerical values stored in the database, or the portion thereof, and is indicative of one or more locations thereof in the database, or the portion thereof.

23. The article of claim 19, wherein the symbol values comprise numerical values and the instructions being further executable by the one or more processors to:
identify the at least some generated tree hierarchy structures and the associated tree label values as respectively being a composite of subtree hierarchies to be according to an arrangement of subtree hierarchies, the subtree hierarchies in the composite of subtree hierarchies respectively to be associated with the numerical values based, at least in part, upon an association, and wherein the numerical values to be associated with the at least some tree hierarchy structures and associated tree label values to comprise a combination of the numerical values to be associated with the subtree hierarchies in the composite of subtree hierarchies.

24. The article of claim 19, wherein the tree hierarchy generation instructions to further comprise executable instructions to compare a symbol value representing a tree hierarchy structure and associated tree label values to other symbol values stored in the database, or the portion thereof, in the one or more physical memory devices to detect a presence of the symbol value, wherein a correspondence between the symbol value and at least one of the other symbol values in the database, or the portion thereof, is to be indicative of a presence of content in electronic content corresponding to the at least one of the other symbol values stored in the database and is to be indicative of one or more locations thereof in the database, or the portion thereof.

* * * * *